(12) United States Patent
Edge

(10) Patent No.: US 9,462,448 B2
(45) Date of Patent: Oct. 4, 2016

(54) ADAPTIVE POSITIONING REFERENCE SIGNAL (PRS) FOR INDOOR LOCATION

(71) Applicant: QUALCOMM Incorporated, San Diego, CA (US)

(72) Inventor: Stephen William Edge, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/683,229

(22) Filed: Apr. 10, 2015

(65) Prior Publication Data
US 2015/0296359 A1    Oct. 15, 2015

Related U.S. Application Data

(60) Provisional application No. 61/979,243, filed on Apr. 14, 2014.

(51) Int. Cl.
| | |
|---|---|
| *H04M 11/04* | (2006.01) |
| *H04W 4/22* | (2009.01) |
| *H04W 4/02* | (2009.01) |
| *H04W 72/04* | (2009.01) |
| *H04W 64/00* | (2009.01) |
| *H04W 76/00* | (2009.01) |
| H04W 88/08 | (2009.01) |

(52) U.S. Cl.
CPC ............... *H04W 4/22* (2013.01); *H04W 4/02* (2013.01); *H04W 64/00* (2013.01); *H04W 72/048* (2013.01); *H04W 76/007* (2013.01); H04W 88/08 (2013.01)

(58) Field of Classification Search
CPC ....... H04W 4/02; H04W 4/22; H04W 64/00; H04W 72/048; H04W 88/08

USPC .............. 455/404.2, 561, 412.1–414.2, 455/418–422.1, 456.1–457, 436, 444, 455/41.1–41.2, 435.3
See application file for complete search history.

(56) References Cited

U.S. PATENT DOCUMENTS

| 8,600,398 B2 | 12/2013 | Siomina et al. |
|---|---|---|
| 2011/0176499 A1 | 7/2011 | Siomina et al. |

(Continued)

FOREIGN PATENT DOCUMENTS

| SE | WO 2014025302 A1 * | 2/2014 | .......... G01S 5/0205 |
|---|---|---|---|
| WO | 2014017965 A2 | 1/2014 | |
| WO | 2014025302 A1 | 2/2014 | |

OTHER PUBLICATIONS

International Search Report and Written Opinion—PCT/US2015/025574—ISA/EPO—Dec. 23, 2015.

*Primary Examiner* — Babar Sarwar
(74) *Attorney, Agent, or Firm* — Muncy, Geissler, Olds & Lowe, P.C.

(57) ABSTRACT

Methods and systems for adapting positioning reference signal (PRS) transmissions are disclosed. A server receives a request to support an emergency call associated with a user equipment (UE) and sends a first PRS schedule to a first base station, the first PRS schedule configured to enable the first base station to switch to a first emergency PRS mode and to transmit PRS signals according to the first PRS schedule. The base station establishes a PRS schedule, switches to an emergency PRS mode, and transmits PRS signals in accordance with the PRS schedule. A UE initiates an emergency call, receives positioning assistance data from a server, performs terrestrial radio location positioning measurements based on the received positioning assistance data, and provides the terrestrial radio location positioning measurements or a location computed from these measurements to the server.

38 Claims, 28 Drawing Sheets

(56) References Cited

U.S. PATENT DOCUMENTS

| | | |
|---|---|---|
| 2012/0020302 A1 | 1/2012 | Xiao |
| 2012/0083278 A1 | 4/2012 | Kazmi et al. |
| 2012/0252487 A1 | 10/2012 | Siomina et al. |
| 2012/0270572 A1 | 10/2012 | Siomina et al. |
| 2013/0190006 A1 | 7/2013 | Kazmi et al. |

* cited by examiner

PRS overhead percentage (LTE BW 10 MHz) – FDD

| PRS BW / $N_{PRS}$ | 1 | 2 | 4 | 6 |
|---|---|---|---|---|
| 1.4 MHz | 0.0875 | 0.175 | 0.350 | 0.525 |
| 3.0 MHz | 0.1875 | 0.375 | 0.750 | 1.125 |
| 5.0 MHz | 0.3125 | 0.625 | 1.250 | 1.875 |
| 10.0 MHz | 0.625 | 1.250 | 2.500 | 3.750 |

*FIG. 6A*

PRS overhead percentage (LTE BW 20 MHz) – FDD

| PRS BW / $N_{PRS}$ | 1 | 2 | 4 | 6 |
|---|---|---|---|---|
| 1.4 MHz | 0.0438 | 0.0875 | 0.1750 | 0.2625 |
| 3.0 MHz | 0.0938 | 0.1875 | 0.3750 | 0.5625 |
| 5.0 MHz | 0.1563 | 0.3125 | 0.6250 | 0.9375 |
| 10.0 MHz | 0.3125 | 0.6250 | 1.2500 | 1.8750 |
| 15.0 MHz | 0.4688 | 0.9375 | 1.8750 | 2.8125 |
| 20.0 MHz | 0.6250 | 1.2500 | 2.5000 | 3.7500 |

*FIG. 6B*

```
PRS-Info ::= SEQUENCE {
    prs-Bandwidth              ENUMERATED { n6, n15, n25, n50, n75, n100, ... },
    prs-ConfigurationIndex     INTEGER (0..4095),
    numDL-Frames               ENUMERATED {sf-1, sf-2, sf-4, sf-6, ...},
    ...,
    prs-MutingInfo-r9          CHOICE {
        po2-r9                     BIT STRING (SIZE(2)),
        po4-r9                     BIT STRING (SIZE(4)),
        po8-r9                     BIT STRING (SIZE(8)),
        po16-r9                    BIT STRING (SIZE(16)),
        ...
    }                                                              OPTIONAL,    -- Need OP
    indoorMode-r13             SEQUENCE {
        numDL-Frames-r13           ENUMERATED {sf-2, sf-4, sf-6, sf-8, sf-10, sf-12, sf-all, ...},
        scheduling-r13             CHOICE {
            po2-r13                    BIT STRING (SIZE(2)),
            po4-r13                    BIT STRING (SIZE(4)),
            po8-r13                    BIT STRING (SIZE(8)),
            po16-r13                   BIT STRING (SIZE(16)),
            ...
        }
    }                                                              OPTIONAL
}
```

FIG. 9

ADAPTIVE POSITIONING REFERENCE SIGNAL (PRS) FOR INDOOR LOCATION

CROSS-REFERENCE TO RELATED APPLICATIONS

The present Application for Patent claims the benefit of U.S. Provisional Application No. 61/979,243, entitled "ADAPTIVE POSITIONING REFERENCE SIGNAL (PRS) FOR INDOOR LOCATION," filed Apr. 14, 2014, assigned to the assignee hereof, and expressly incorporated herein by reference in its entirety.

BACKGROUND

1. Field of the Disclosure

Aspects of the disclosure are related to adaptive positioning reference signal (PRS) for indoor location of a mobile device or terminal.

2. Description of the Related Art

Wireless communication systems have developed through various generations, including a first-generation analog wireless phone service (1G), a second-generation (2G) digital wireless phone service (including interim 2.5G networks) and third-generation (3G) and fourth-generation (4G) high speed data/Internet-capable wireless services.

More recently, Long Term Evolution (LTE) has been developed by the $3^{rd}$ Generation Partnership Project (3GPP) as a radio access network technology for wireless communication of high-speed data and packetized voice for mobile phones and other mobile terminals. LTE has evolved from the Global System for Mobile Communications (GSM) system and from derivatives of GSM, such as Enhanced Data rates for GSM Evolution (EDGE), Universal Mobile Telecommunications System (UMTS), and High-Speed Packet Access (HSPA).

In North America, wireless communications systems, such as LTE, use a solution for Enhanced 911, or E911, that links emergency callers with the appropriate public resources. The solution attempts to automatically associate the caller, i.e., the caller's user equipment (UE), with a specific location, such as a physical address or geographic coordinates. Automatically locating the caller with high accuracy (e.g., with a distance error of 50 meters or less) and providing the location to a Public Safety Answering Point (PSAP) can increase the speed with which the public safety side can locate the required resources during emergencies, especially where the caller may be unable to communicate his/her location (e.g. does not know the location or is unable to speak adequately).

To locate a UE geographically, there are several approaches. One is to use some form of terrestrial radio location based on measurements made by a UE of signals transmitted by wireless network base stations and access points (APs) and/or based on measurements made by network elements (e.g., base stations and/or APs) of signals transmitted by the UE. Another approach is to use a Global Positioning System (GPS) receiver or Global Navigation Satellite System (GNSS) receiver built into the UE itself. Terrestrial radio location in a cellular telephony system may use measurements made by a UE of transmission timing differences between pairs of base stations or APs and may employ trilateration or multilateration techniques to determine the position of the UE based on two, or more commonly three or more, timing difference measurements.

One such terrestrial radio location method that is applicable to measurements of LTE base stations (referred to as eNodeBs or eNBs) and that is standardized by 3GPP in 3GPP Technical Specifications (TSs) 36.211, 36.305, and 36.355 is Observed Time Difference of Arrival (OTDOA). OTDOA is a multilateration method in which the UE measures the time difference between specific signals from several eNodeBs and either computes a location itself from these measurements or reports the measured time differences to an Enhanced Serving Mobile Location Center (E-SMLC) or to a Secure User Plane Location (SUPL) Location Platform (SLP), which then computes the UE's location. In either case, the measured time differences and knowledge of the eNodeBs' locations and relative transmission timing are used to calculate the UE's position.

Determination of an accurate location of a UE indoors may often be challenging. For example, signals from GPS or other GNSS satellites (e.g., for the Galileo, Glonass or Beidou GNSS systems) are usually attenuated and subject to multipath and are then often difficult for a UE to acquire and accurately measure when the UE is indoors. Signals transmitted from network base stations (e.g., LTE eNBs) may be received and measured by a UE in the case of a serving base station or other nearby base station but are typically also difficult for a UE to acquire and measure from a sufficient number of base stations to enable accurate location when a UE is indoors.

There is thus a benefit to enhancing positioning methods such as OTDOA to enable more accurate location indoors. Furthermore, any enhancements in indoor positioning accuracy for a method such as OTDOA may be used not only to accurately locate a UE that is making an E911 call but may also be used to locate a UE accurately for other purposes, for example, to locate a lost child, track a valuable asset (e.g. a car or truck) or guide a user to some indoor or outdoor destination. Therefore, the embodiments and examples described herein to improve location accuracy for a UE that is indoors or in a difficult outdoor environment such as a dense urban area may be used to locate the UE in the case of an emergency call or for other reasons.

SUMMARY

The following presents a simplified summary relating to one or more aspects and/or embodiments associated with the mechanisms disclosed herein to adapting positioning reference signal (PRS) transmissions. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

A method for adapting PRS transmissions of one or more base stations includes receiving a request to support an emergency call associated with a user equipment (UE) and sending a first PRS schedule to a first base station, the first PRS schedule configured to enable the first base station to switch to a first emergency PRS mode and to transmit PRS signals according to the first PRS schedule.

A method for positioning a UE using an emergency PRS mode of at least one cell of at least one base station includes initiating, by the UE, an emergency call, receiving, by the UE, positioning assistance data from a server, the positioning assistance data including an emergency PRS mode schedule for the at least one cell of at least one base station, the emergency PRS mode schedule comprising one or more parameters indicating additional PRS positioning occasions for a cell, additional bandwidth, a higher frequency of PRS positioning occasions, different PRS coding compared to a non-emergency PRS mode schedule, a start time, stop time and/or duration, performing, by the UE, terrestrial radio location positioning measurements based on the received positioning assistance data, and providing, by the UE, the terrestrial radio location positioning measurements or a location computed from the terrestrial radio location positioning measurements to the server.

A method for adapting PRS transmissions of a base station includes establishing, at the base station, a PRS schedule, switching, at the base station, to an emergency PRS mode, and transmitting, at the base station, PRS signals in accordance with the PRS schedule.

An apparatus for adapting PRS transmissions of one or more base stations includes a transceiver configured to receive a request to support an emergency call associated with a UE and to send a first PRS schedule to a first base station, the first PRS schedule configured to enable the first base station to switch to a first emergency PRS mode and to transmit PRS signals according to the first PRS schedule.

An apparatus for positioning a UE using an emergency PRS mode of at least one cell of at least one base station includes a transceiver of a UE configured to initiate an emergency call, to receive positioning assistance data from a server, the positioning assistance data including an emergency PRS mode schedule for the at least one cell of at least one base station, the emergency PRS mode schedule comprising one or more parameters indicating additional PRS positioning occasions for a cell, additional bandwidth, a higher frequency of PRS positioning occasions, different PRS coding compared to a non-emergency PRS mode schedule, a start time, stop time and/or duration, to perform terrestrial radio location positioning measurements based on the received positioning assistance data, and to provide the terrestrial radio location positioning measurements or a location computed from the terrestrial radio location positioning measurements to the server.

An apparatus for adapting PRS transmissions of a base station includes a processor of a base station configured to establish a PRS schedule and to switch to an emergency PRS mode, and a transceiver of the base station configured to transmit PRS signals in accordance with the PRS schedule.

An apparatus for adapting PRS transmissions of one or more base stations includes means for receiving a request to support an emergency call associated with a UE and means for sending a first PRS schedule to a first base station, the first PRS schedule configured to enable the first base station to switch to a first emergency PRS mode and to transmit PRS signals according to the first PRS schedule.

An apparatus for positioning a UE using an emergency PRS mode of at least one cell of at least one base station includes means for initiating, by the UE, an emergency call, means for receiving, by the UE, positioning assistance data from a server, the positioning assistance data including an emergency PRS mode schedule for the at least one cell of at least one base station, the emergency PRS mode schedule comprising one or more parameters indicating additional PRS positioning occasions for a cell, additional bandwidth, a higher frequency of PRS positioning occasions, different PRS coding compared to a non-emergency PRS mode schedule, a start time, stop time and/or duration, means for performing, by the UE, terrestrial radio location positioning measurements based on the received positioning assistance data, and means for providing, by the UE, the terrestrial radio location positioning measurements or a location computed from the terrestrial radio location positioning measurements to the server.

An apparatus for adapting PRS transmissions of a base station includes means for establishing, at the base station, a PRS schedule, means for switching, at the base station, to an emergency PRS mode, and means for transmitting, at the base station, PRS signals in accordance with the PRS schedule.

A non-transitory computer-readable medium for adapting PRS transmissions of one or more base stations includes at least one instruction to receive a request to support an emergency call associated with a UE and at least one instruction to send a first PRS schedule to a first base station, the first PRS schedule configured to enable the first base station to switch to a first emergency PRS mode and to transmit PRS signals according to the first PRS schedule.

A non-transitory computer-readable medium for positioning a UE using an emergency PRS mode of at least one cell of at least one base station includes at least one instruction to initiate, by the UE, an emergency call, at least one instruction to receive, by the UE, positioning assistance data from a server, the positioning assistance data including an emergency PRS mode schedule for the at least one cell of at least one base station, the emergency PRS mode schedule comprising one or more parameters indicating additional PRS positioning occasions for a cell, additional bandwidth, a higher frequency of PRS positioning occasions, different PRS coding compared to a non-emergency PRS mode schedule, a start time, stop time and/or duration, at least one instruction to perform, by the UE, terrestrial radio location positioning measurements based on the received positioning assistance data, and at least one instruction to provide, by the UE, the terrestrial radio location positioning measurements or a location computed from the terrestrial radio location positioning measurements to the server.

A non-transitory computer-readable medium for adapting PRS transmissions of a base station includes at least one instruction to establish, at the base station, a PRS schedule, at least one instruction to switch, at the base station, to an emergency PRS mode, and at least one instruction to transmit, at the base station, PRS signals in accordance with the PRS schedule.

Other objects and advantages associated with the mechanisms disclosed herein will be apparent to those skilled in the art based on the accompanying drawings and detailed description.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and are as follows.

FIGS. 6A and 6B illustrate PRS overhead examples with a bandwidth of 10 MHz and a bandwidth of 20 MHz, respectively.

FIG. 9 is a listing of exemplary code illustrating adaptive PRS scheduling support by the LTE positioning protocol (LPP).

DETAILED DESCRIPTION

Figure 1:
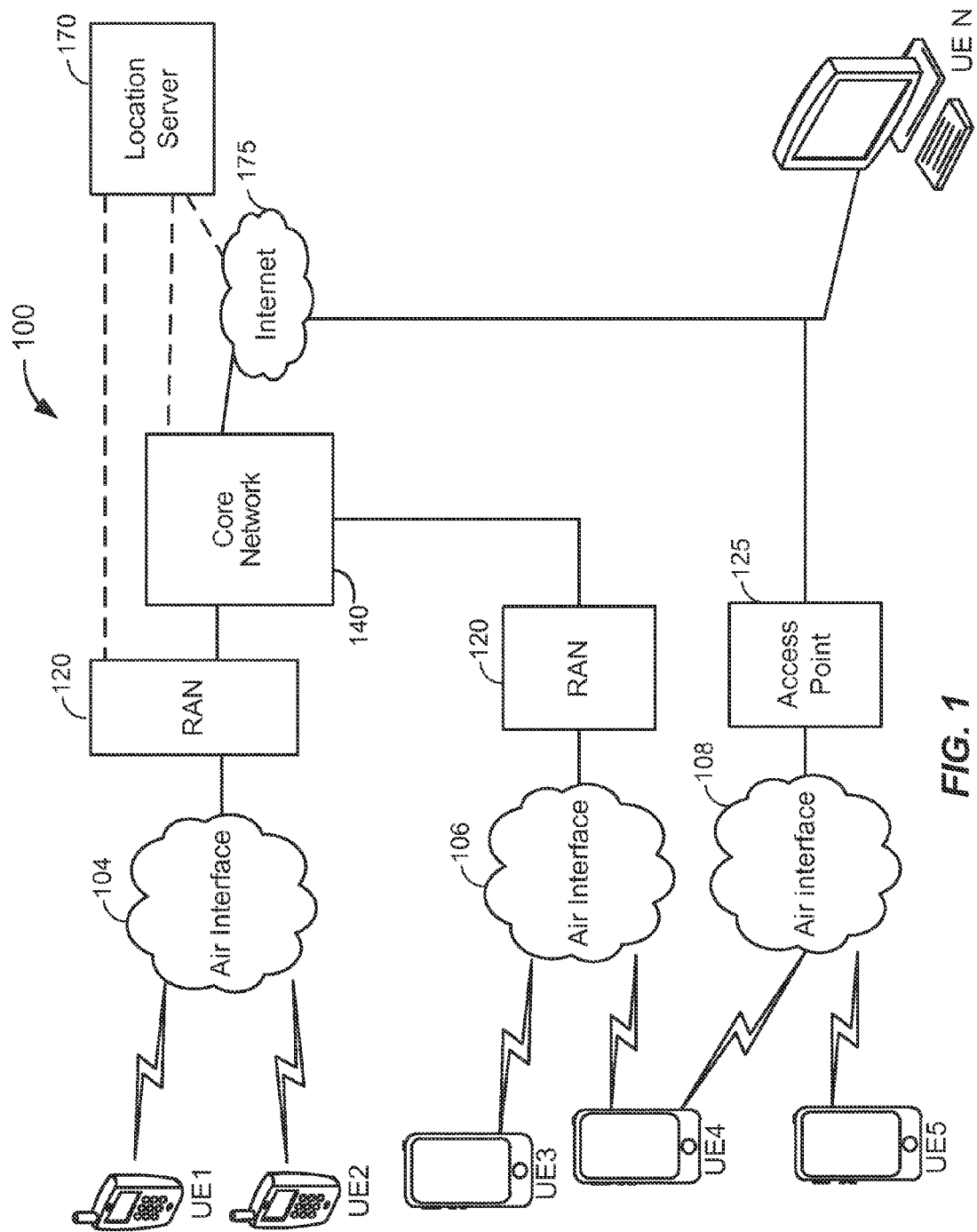
FIG. 1 illustrates a high-level system architecture of a wireless communications system in accordance with an aspect of the disclosure.

The disclosure is related to adapting positioning reference signal (PRS) transmissions. In an embodiment, a server receives a request to support an emergency call associated with a user equipment (UE) and sends a first PRS schedule to a first base station, the first PRS schedule configured to enable the first base station to switch to a first emergency PRS mode and to transmit PRS signals according to the first PRS schedule. In an embodiment, a base station establishes a PRS schedule, switches to an emergency PRS mode, and transmits PRS signals in accordance with the PRS schedule.

In an embodiment, a UE using an emergency PRS mode of at least one cell of at least one base station initiates an emergency call, receives positioning assistance data from the server, the positioning assistance data including an emergency PRS mode schedule for the at least one cell of at least one base station, the emergency PRS mode schedule comprising one or more parameters indicating additional PRS positioning occasions for a cell, additional bandwidth, a higher frequency of PRS positioning occasions, different PRS coding compared to a non-emergency PRS mode schedule, a start time, stop time and/or duration, performs terrestrial radio location positioning measurements based on the received positioning assistance data, and provides the terrestrial radio location positioning measurements or a location computed from the terrestrial radio location positioning measurements to the server.

These and other aspects of the disclosure are disclosed in the following description and related drawings directed to specific aspects of the disclosure. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

A number of different entities including physical hardware entities, logical functions, network elements and mobile devices are exemplified herein within the various drawings and are identified in the drawings and in the associated description using numeric labels. The convention employed herein is generally (though not always) to identify like entities in different drawings using the same numeric label. In such cases, it is to be understood that any entity exemplified in a particular drawing that has the same numeric label as certain other entities in other drawings may correspond to any or all of these other entities and may share the properties, capabilities and functional behaviors described herein for these other entities without necessarily any explicit statement to this effect. As an example, the different UEs 302 shown in FIGS. 3A, 3B, 3C, 3E, 4A, 4B, 11 and 12B may each correspond to one or more of the other UEs 302 and/or may each share the same properties. In addition, where two entities A and B in different drawings and with different numeric labels are stated to potentially correspond to one another, then it is to be understood that all entities with the same numeric label as entity A may correspond to and/or share the same properties as any one or more of all entities with the same numeric label as entity B.

The following table provides a list of abbreviations used in this disclosure:

TABLE 1

| Abbreviations | |
|---|---|
| A-GNSS | Assisted GNSS |
| AP | Access Point |
| ASN.1 | Abstract Syntax Notation One |
| BGCF | Breakout Gateway Control Function |
| BW | Bandwidth |
| CS | Circuit Switched |
| DSCP | Differentiated services code point |
| ECID | Enhanced Cell ID |
| E-CSCF | Emergency Call Session Control Function |
| ELP | EPC LCS Protocol |
| eMBMS | Evolved MBMS |
| eNB | Evolved Node B (eNodeB) |
| EPC | Evolved Packet Core |
| EPS | Evolved Packet System |
| ES | Emergency Services |
| ESInet | Emergency Services IP network |
| E-SLP | Emergency Services SLP |
| E-SMLC | Enhanced Serving Mobile Location Center |
| FDD | Frequency Division Duplex |
| GMLC | Gateway Mobile Location Center |
| GNSS | Global Navigation Satellite System |
| HSS | Home Subscriber Server |
| IBCF | Interconnection Border Control Function |
| IMEI | International Mobile Equipment Identity |
| IMS | Internet Protocol (IP) Multimedia Subsystem |
| IMSI | International Mobile Subscriber Identity |
| IP | Internet Protocol |
| LCS | Location Services |
| LCS-AP | LCS Application Protocol |
| LPP | LTE Positioning Protocol |
| LPPa | LTE Positioning Protocol A |
| LPPe | LPP Extensions |
| LRF | Location Retrieval Function |
| LS | Location Service |
| LTE | Long Term Evolution |
| LTE-U | LTE Unlicensed |
| MBMS | Multimedia Broadcast Multicast Service |
| MGCF | Media Gateway Control Function |
| MIB | Master Information Block |
| MME | Mobility Management Entity |
| NAS | Non-Access Stratum |
| OFDM | Orthogonal Frequency Division Multiplexing |
| OTDOA | Observed Time Difference Of Arrival |
| PDG | PDN Gateway |
| PCRF | Policy and Charging Rules Function |
| P-CSCF | Proxy Call Session Control Function |
| PDE | Position Determining Entity |
| PDN | Packet Data Network |
| PRS | Positioning Reference Signal |
| PS | Packet Switched |
| PSAP | Public Safety Answering Point |
| QCI | QoS Class Identifier |
| QoS | Quality of Service |
| RAN | Radio Access Network |
| RDF | Routing Determination Function |
| RRC | Radio Resource Control |
| RRLP | Radio Resource LCS Protocol |
| RSTD | Reference Signal Time Difference |
| S1 AP | S1 Application Protocol |
| SAS | Standalone SMLC |

TABLE 1-continued

| Abbreviations | |
|---|---|
| S-CSCF | Serving Call Session Control Function |
| SFN | System Frame Number |
| SGW | Serving Gateway |
| SIB | System Information Block |
| SLP | SUPL Location Platform |
| SMLC | Serving Mobile Location Center |
| SPS | Satellite Positioning System |
| SS | Supplementary Services |
| SUPL | Secure User Plane Location |
| TBS | Terrestrial Beacon System, |
| TCP | Transmission Control Protocol |
| TDD | Time Division Duplex |
| TS | Technical Specification |
| UE | User Equipment |
| UDP | User Datagram Protocol |
| ULP | User Plane Location Protocol |
| WAN | Wide Area Network |
| WLAN | Wireless Local Area Network |

A client device, referred to herein as a user equipment (UE), may be mobile or stationary, and may communicate with a radio access network (RAN). As used herein, the term "UE" may be referred to interchangeably as an "access terminal" or "AT", a "wireless device", a "subscriber device", a "mobile device", a "subscriber terminal", a "subscriber station", a "user terminal" or UT, a "mobile terminal", a "mobile station", a SUPL enabled terminal (SET), a target device, a target UE, and variations thereof. A UE may be a cell phone, smart phone, laptop, tablet, asset tag, PDA or any other device that is enabled to communicate wirelessly with other UEs and/or other entities via direct means and/or via one or more networks or one or more network elements. Generally, UEs can communicate with a core network via the RAN, and through the core network (or sometimes through the RAN) the UEs can be connected with external networks such as the Internet. The RAN may support wireless communication from UEs using cellular based radio technologies such as GSM, UMTS and LTE as defined by 3GPP or cdma2000 as defined by the $3^{rd}$ Generation Partnership Project 2 (3GPP2). A UE may employ other mechanisms of connecting to the core network and/or the Internet such as over wired access networks, WiFi networks (e.g., based on IEEE 802.11, etc.), Bluetooth® networks and so on. UEs can be embodied by any of a number of types of devices including but not limited to PC cards, compact flash devices, external or internal modems, wireless or wireline phones, and so on. A communication link through which UEs can send signals to the RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates a high-level system architecture of a wireless communications system 100 in accordance with an aspect of the disclosure. The wireless communications system 100 contains UEs 1 . . . N. The UEs 1 . . . N can include cellular telephones, personal digital assistant (PDAs), pagers, a laptop computer, a desktop computer, and so on. For example, in FIG. 1, UEs 1 . . . 2 are illustrated as cellular calling phones, UEs 3 . . . 5 are illustrated as cellular touchscreen phones or smart phones, and UE N is illustrated as a desktop computer or PC.

Referring to FIG. 1, UEs 1 . . . N are configured to communicate with an access network (e.g., the RAN 120, an access point 125, etc.) over a physical communications interface or layer, shown in FIG. 1 as air interfaces 104, 106, 108 and/or a direct wired connection. The air interfaces 104 and 106 can comply with a given cellular communications protocol (e.g., Code Division Multiple Access (CDMA), Enhanced Voice Data Optimized (EVDO), Enhanced High Rate Packet Data (eHRPD), GSM, EDGE, Wideband CDMA (WCDMA), LTE, LTE-U, etc.), while the air interface 108 can comply with a wireless local area network (WLAN) protocol (e.g., IEEE 802.11 or Bluetooth). The RAN 120 (shown in FIG. 1 as comprising two separate portions associated with air interfaces 104 and 106, respectively) includes a plurality of access points that serve UEs over air interfaces, such as the air interfaces 104 and 106. The access points in the RAN 120 can be referred to as access nodes or ANs, access points or APs, base stations or BSs, Node Bs, eNodeBs, and so on. These access points can be terrestrial access points (or ground stations), or satellite access points. The RAN 120 is configured to connect to a core network 140 that can perform a variety of functions, including connecting circuit switched (CS) calls and/or packet switched (PS) connections between UEs served by the RAN 120 and other UEs served by the RAN 120 or a different RAN altogether, and can also mediate an exchange of PS data with external networks such as Internet 175. The Internet 175 includes a number of routing agents and processing agents (not shown in FIG. 1 for the sake of convenience). In FIG. 1, UE N is shown as connecting to the Internet 175 directly (i.e., separate from the core network 140, such as over an Ethernet connection of WiFi or 802.11-based network). The Internet 175 can thereby function to connect PS data communications between UE N and UEs 1 . . . N–1 via the core network 140. Also shown in FIG. 1 is the access point 125 that is separate from the RAN 120. The access point 125 may be connected to the Internet 175 independent of the core network 140 (e.g., via an optical communication system such as FiOS, a cable modem, etc.). The air interface 108 may serve UE 4 or UE 5 over a local wireless connection, such as IEEE 802.11 in an example.

Referring to FIG. 1, a location server 170 is shown as connected to the Internet 175, the core network 140 or the RAN 120 or to any two or all three of these. The location server 170 can be implemented as a plurality of structurally separate servers, or alternately may correspond to a single server. As will be described below in more detail, the location server 170 may be configured to support one or more positioning services for UEs that can communicate with the location server 170 via the RAN 120, the core network 140 and/or the Internet 175.

Figure 2:
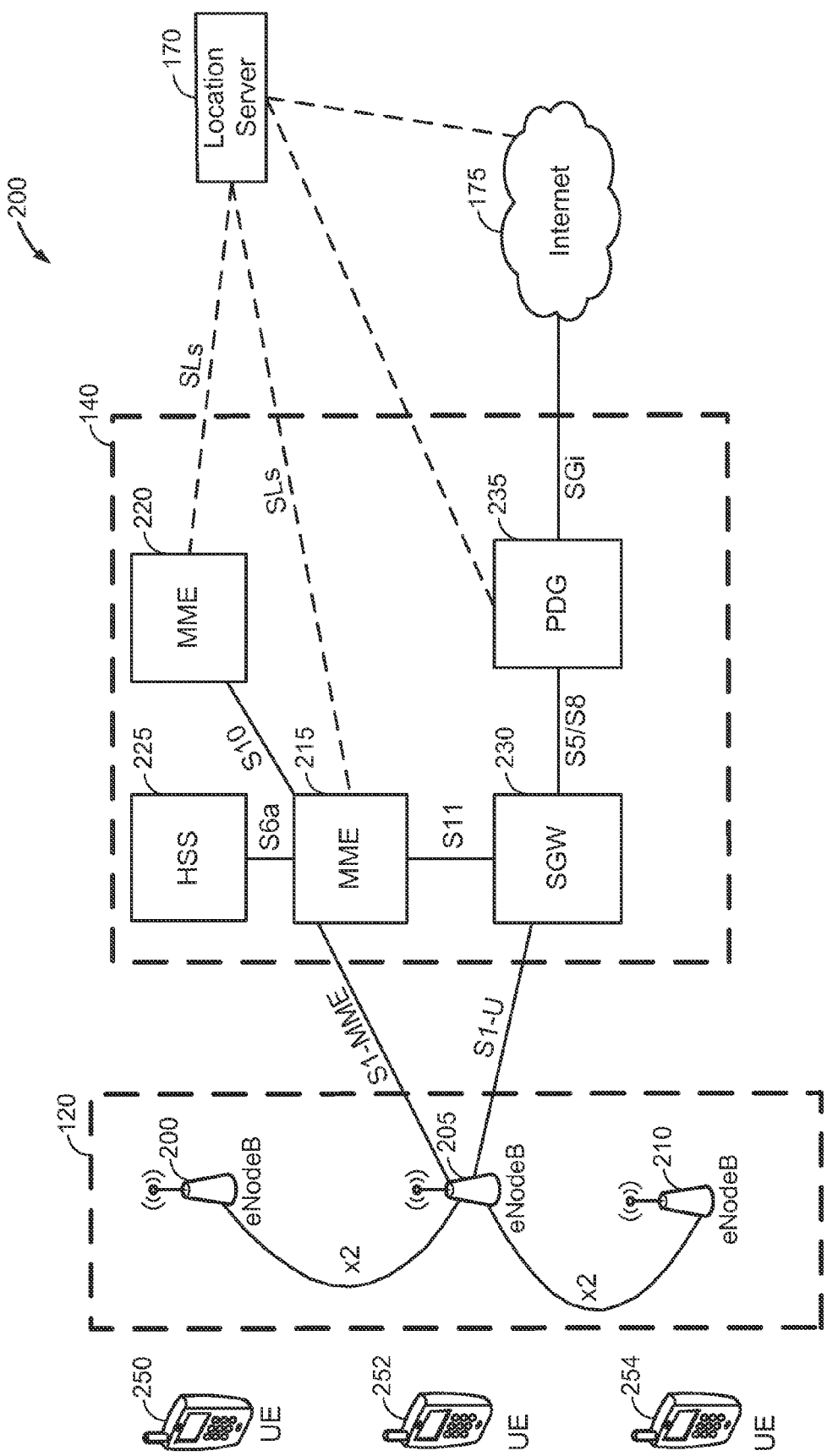
FIG. 2 illustrates an example configuration of a radio access network (RAN) and a packet-switched portion of the core network that is based on an Evolved Packet System (EPS) or Long Term Evolution (LTE) network in accordance with an aspect of the disclosure.

FIG. 2 illustrates an example configuration of the RAN 120 and a packet-switched portion of the core network 140 based on an Evolved Packet System (EPS) or LTE network, in accordance with an aspect of the disclosure. Referring to FIG. 2, the RAN 120 in the EPS/LTE network is configured with a plurality of Evolved Node Bs (eNodeBs or eNBs) 200, 205 and 210. In FIG. 2, the core network 140 includes a plurality of Mobility Management Entities (MMEs) 215 and 220, a Home Subscriber Server (HSS) 225, a Serving Gateway (SGW) 230 and a Packet Data Network Gateway (PDG) 235. Network interfaces between these components, the RAN 120, the location server 170 and the Internet 175 are illustrated in FIG. 2 and are defined in Table 2 (below) as follows:

TABLE 2

EPS/LTE Core Network Connection Definitions

| Network Interface | Description |
| --- | --- |
| S1-MME | Reference point for the control plane protocol between RAN 120 and MME 215. |
| S1-U | Reference point between RAN 120 and SGW 230 for the per bearer user plane tunneling and inter-eNodeB path switching during handover. |
| S5 | Provides user plane tunneling and tunnel management between SGW 230 and PDG 235. It is used for SGW relocation due to UE mobility and if the SGW 230 needs to connect to a non-collocated PDG for the required PDN connectivity. |
| S6a | Enables transfer of subscription and authentication data for authenticating/authorizing user access to the evolved system (Authentication, Authorization, and Accounting [AAA] interface) between MME 215 and HSS 225. |
| S8 | Inter-PLMN reference point providing user and control plane between the SGW 230 in a Visited Public Land Mobile Network (VPLMN) and the PDG 235 in a Home Public Land Mobile Network (HPLMN). S8 is the inter-PLMN variant of S5. |
| S10 | Reference point between MMEs 215 and 220 for MME relocation and MME to MME information transfer. |
| S11 | Reference point between MME 215 and SGW 230. |
| SGi | Reference point between the PDG 235 and a packet data network, shown in FIG. 2 as the Internet 175. The Packet data network may be an operator external public or private packet data network or an intra-operator packet data network (e.g., for provision of IMS services). |
| SLs | Interface between an MME and the location server 170 in the event that location server 170 is or contains an E-SMLC |
| X2 | Reference point between two different eNodeBs used for UE handoffs. |

A high-level description of the components shown in FIG. 2 will now be described. However, these components are each well-known in the art from various 3GPP Technical Specifications (TSs), and the description contained herein is not intended to be an exhaustive description of all functionalities performed by these components.

Referring to FIG. 2, the eNBs 200, 205 and 210 are configured to provide LTE radio access to UEs (e.g. any of UEs 250, 252 and 254) and to provide signaling and voice/data connectivity between any UE and elements in core network 140 such as MME 215 and SGW 230. The eNBs 200, 205 and 210 may also be configured to broadcast a positioning reference signal (PRS) to nearby UEs to enable any UE to make measurements of PRS timing differences between pairs of eNBs and thereby enable a location estimate of the UE to be obtained by the UE itself or by a location server (e.g. location server 170) to which the timing difference measurements may be sent using OTDOA positioning, as previously described. The term location estimate is used herein to refer to an estimate of a location for a UE (e.g. any of UEs 250, 252 and 254) which may be geographic (e.g. may comprise a latitude, longitude and possibly altitude) or may be civic (e.g. may comprise a street address, building designation or precise point or area within or nearby to a building or street address such as a particular entrance to a building, a particular room or suite in a building or a landmark such as a town square). A location estimate may also be referred to as a location, a position, a fix, a position fix, a location fix, a position estimate, a fix estimate or by some other term. The means of obtaining a location estimate may be referred to generically as positioning, locating or position fixing; a particular solution for obtaining a location estimate may be referred to as a location solution; and a particular method for obtaining a location estimate as part of a location solution may be referred to as a position method.

Referring to FIG. 2, the MMEs 215 and 220 are configured to support network attachment of UEs (e.g. UEs 250, 252, 254), mobility of UEs and bearer assignment to UEs. MME functions include: Non-Access Stratum (NAS) signaling to UEs, NAS signaling security, mobility management for inter- and intra-technology handovers of UEs, PDG and SGW selection, and MME selection for UE handovers with MME change.

Referring to FIG. 2, the SGW 230 is the gateway that terminates the interface toward the RAN 120. For each UE attached to the core network 140 for an EPS-based system, at a given point of time, there may be a single SGW. The functions of the SGW 230 include: mobility anchor point, packet routing and forwarding, and transport level packet marking in the uplink and the downlink (e.g. setting the DiffServ Code Point (DSCP) based on a QoS Class Identifier (QCI) of an associated EPS bearer).

Referring to FIG. 2, the PDG 235 is the gateway that terminates the SGi interface toward the Packet Data Network (PDN), e.g., the Internet 175. If a UE is accessing multiple PDNs, there may be more than one PDG for that UE. PDG functions include: packet filtering (e.g. using deep packet inspection), UE IP address allocation, transport level packet marking in the uplink and downlink (e.g. setting the DSCP based on the QCI of an associated EPS bearer), accounting for inter operator charging, uplink (UL) and downlink (DL) bearer binding, UL and DL rate enforcement and service level rate enforcement, and UL bearer binding. The PDG 235 may provide PDN connectivity to both GSM/EDGE Radio Access Network (GERAN)/UTRAN only UEs and E-UTRAN-capable UEs using any of E-UTRAN, GERAN, or UTRAN. The PDG 235 may provide PDN connectivity to E-UTRAN capable UEs using E-UTRAN only over the S5/S8 interface.

In FIG. 2, the location server 170 is shown as connected to one or more of the Internet 175, the PDG 235, MME 220 and MME 215. The connections to MME 215 and MME 220 are applicable when location server 170 is or contains an E-SMLC. The connections to the Internet 175 and to the PDG 235 are applicable when location server 170 is or contains an SLP. Location server 170 may be used (i) to obtain a location for any of UEs 250, 252 and 254 (e.g. from signal measurements obtained and transferred by any of UEs 250, 252 and 254) and/or (ii) to provide assistance data to any of UEs 250, 252 and 254 to enable any of UEs 250, 252 and 254 to acquire and measure signals (e.g. signals from one or more of eNBs 200, 205 and 210) and, in some cases, compute a location from these signal measurements. Examples of assistance data can be orbital and timing data for GPS or other GNSS satellites when GPS or GNSS positioning is used or information concerning downlink transmission from eNBs nearby to a UE (e.g. any of eNBs 200, 205 and 210) when OTDOA is used for positioning.

It should be noted that core network 140, RAN 120 and location server 170 in FIG. 2 may correspond, respectively, to core network 140, RAN 120 and location server 170 in FIG. 1. In addition, UEs 250, 252 and 254 in FIG. 2 may each correspond to any of UEs 1 to N in FIG. 1.

As discussed above, to locate a UE geographically, there are several approaches. This disclosure is directed to the OTDOA positioning method, available in LTE. OTDOA is a multilateration method in which the UE measures the time difference between specific signals (e.g. PRS signals) from different pairs of eNodeBs and either reports these time differences to a location server, such as an E-SMLC or SLP, or computes a location itself from these time differences. The location computation can be based on the measured time differences and knowledge of the eNodeBs' locations and relative transmission timing (e.g., regarding whether eNBs are accurately synchronized or whether each eNB transmits with some known time difference relative to other eNBs). When a UE obtains a location estimate itself using OTDOA measured time differences, the necessary additional data (e.g. eNodeBs' locations and relative transmission timing) may be provided to the UE by a location server (e.g. location server 170 in FIG. 2). In some implementations, a location estimate for a UE may be obtained (e.g. by the UE itself or by a location server) from OTDOA measured time differences and from other measurements made by the UE (e.g. measurements of signal timing from GPS or other GNSS satellites). In these implementations, known as hybrid positioning, the OTDOA measurements may contribute towards obtaining a UE location estimate but may not wholly determine the location estimate.

Figure 3A:
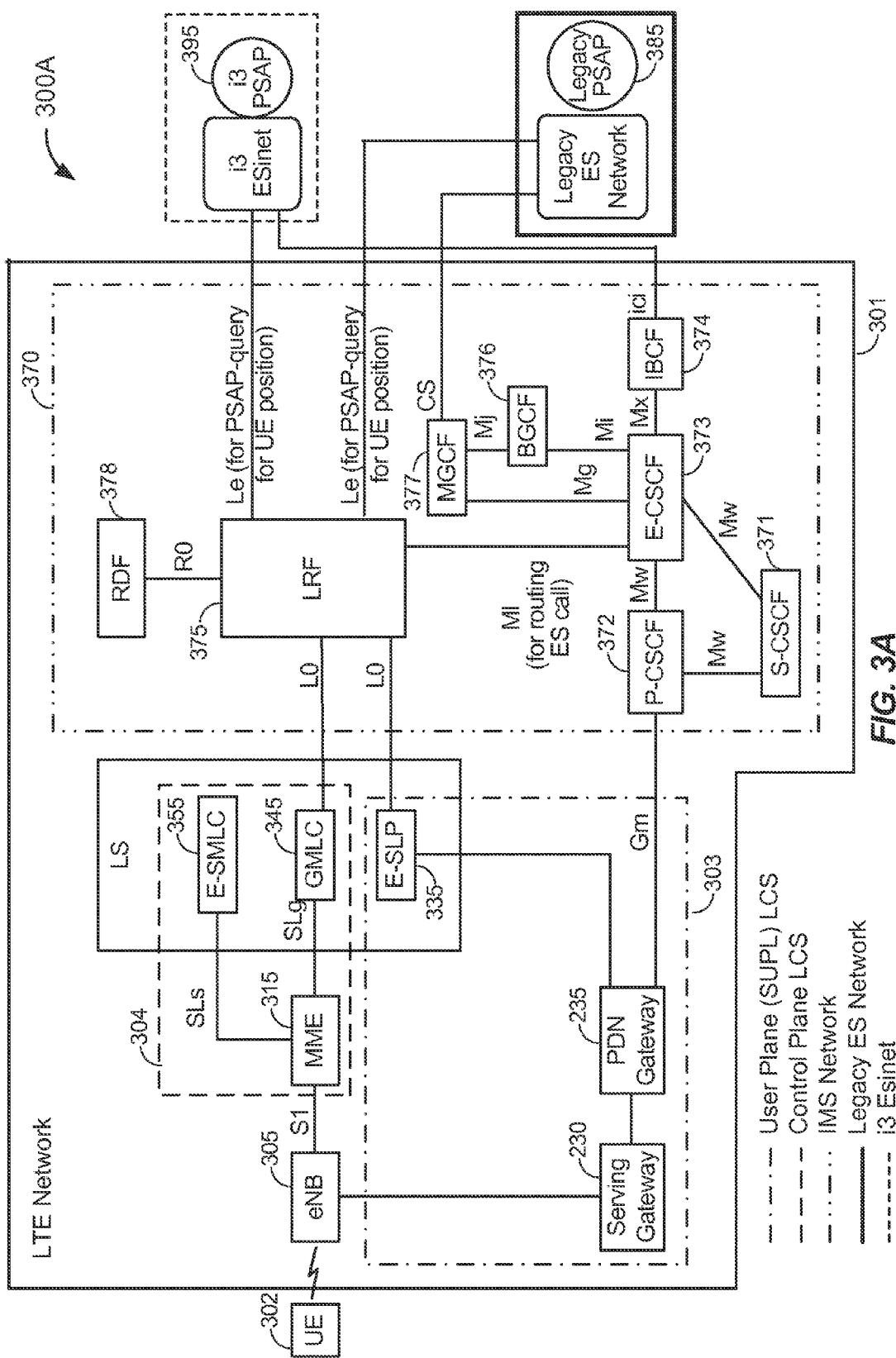
FIG. 3A illustrates an exemplary system architecture for E911 location in an LTE network.
Figure 3B:
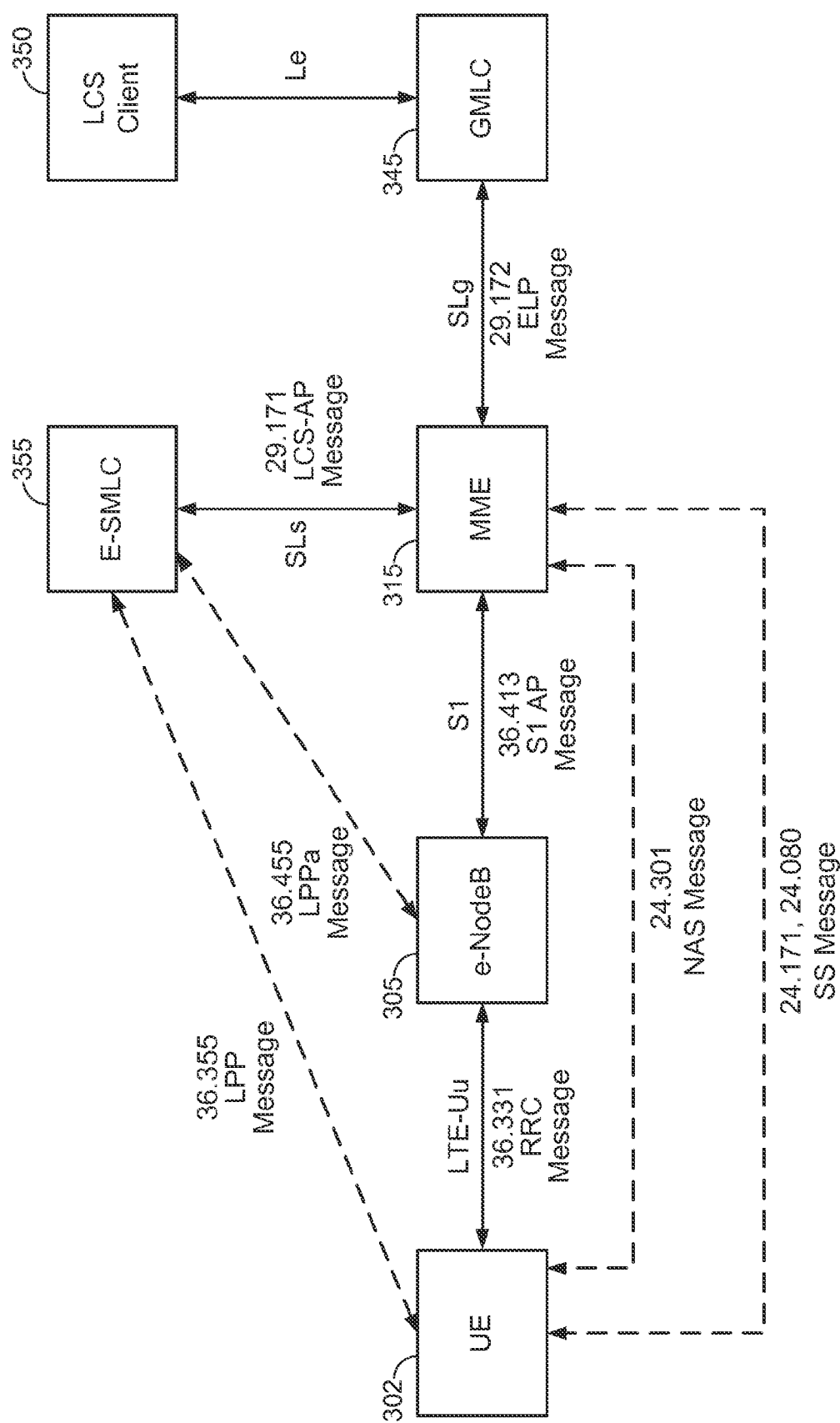
FIG. 3B illustrates exemplary control plane elements of the system architecture for E911 location in the LTE network illustrated in FIG. 3A.

FIG. 3A illustrates an exemplary system architecture 300A for obtaining a location estimate for a UE served by an LTE network 301 where the UE is establishing or has already established an E911 call. FIG. 3B illustrates exemplary control plane elements of the LTE network 301 shown in FIG. 3A that may be used for E911 location services. More specifically, FIG. 3B illustrates the various protocols that may be used and the associated types of messages that may be transmitted between the various network elements in the case that a control plane location solution is used.

In a control plane location solution, a location server (e.g., location server 170 in FIGS. 1 and 2 or E-SMLC 355 in FIGS. 3A and 3B) is accessed by other elements including UEs via signaling interfaces and signaling protocols in a network which typically include existing signaling interfaces and existing protocols as well as new protocols and interfaces dedicated to location support. All signaling related to the location of a UE is then explicitly transported as signaling on all interfaces. In the case of LTE access, the control plane location solution is defined in 3GPP TSs 23.271 and 36.305.

In a user plane location solution, such as the SUPL solution defined by the Open Mobile Alliance (OMA), a UE and location server communicate by exchanging data from the perspective of the network, such as via IP or TCP/IP. In the case of the SUPL solution, location server 170 in FIGS. 1 and 2 would be an SLP and E-SLP 335 in FIG. 3A would be used for location rather than E-SMLC 355. In some cases, a network may employ both a control plane location solution and a user plane location solution such as SUPL. In that case, both E-SMLC 355 and E-SLP 335 may be present in FIG. 3A and these servers may be combined (e.g., in the same physical entity) or connected to one another in order to allow both solutions to be used to locate a UE.

FIG. 3A illustrates both the control plane location elements, i.e., Gateway Mobile Location Center (GMLC) 345, MME 315 (which may be the same as either of MMEs 215 and 220 in FIG. 2), and E-SMLC 355, and the alternative user plane (e.g., SUPL) location element, i.e., the E-SLP 335, that may be used to determine the location of UE 302 when the user of UE 302 instigates an E911 call. The eNodeB 305 may be the same as any of eNodeBs 200, 205 and 210 in FIG. 2.

FIG. 3A also illustrates other components, including network elements and subsystems of the LTE network 301, that may be used to support establishment of an E911 call over LTE from a UE such as UE 302 and location support for the E911 call. The components that may be used to support user plane location are shown enclosed in the dashed box 303 in FIG. 3A and comprise the E-SLP 335 as already mentioned, the PDN Gateway (PDG) 235 (which may correspond to PDG 235 in FIG. 2) and the Serving Gateway (SGW) 230 (which may correspond to SGW 230 in FIG. 2). PDG 235 and SGW 230 may transfer location related signaling (e.g. SUPL messages) between UE 302 and E-SLP 335 in the form of data (e.g. IP or TCP/IP data packets). The components that may be used to support control plane location are shown enclosed in the dashed box 304 in FIG. 3A and comprise the MME 315, the GMLC 345 and the E-SMLC 355, as already mentioned. Components comprising an IMS for the LTE network 301 are shown enclosed in the dashed box 370 in FIG. 3A and comprise the S-CSCF 371, the P-CSCF 372, the E-CSCF 373, the IBCF 374, the LRF 375, the BGCF 376, the MGCF 377, and the RDF 378. The IMS may be used to establish and later release an E911 call by supporting the SIP signaling with the UE (e.g. UE 302) needed to establish and later release the E911 call and either the SIP signaling with the PSAP side in the case that the PSAP side supports SIP (e.g. in the case that the E911 call is routed to the i3 PSAP 395) or CS associated signaling with the PSAP side in the case that the PSAP side supports CS calls (e.g. in the case that the E911 call is routed to the legacy PSAP 385). E911 call establishment and release details relevant to the system architecture 300A are specified further in a number of publicly available standards including 3GPP TS 23.167, the Alliance for Telecommunications Industry Solutions (ATIS) standard ATIS-0700015 and the National Emergency Number Association (NENA) i3 solution (e.g. "Detailed Functional and Interface Specification for the NENA i3 Solution—Stage 3").

In the case of a UE 302 making an E911 call over LTE, any of the elements shown in FIG. 3A may be involved in establishing and maintaining the call and/or in helping locate the UE 302, with the exception of elements specifically used for just control plane location or just user plane SUPL location, but not both. For control plane location, MME 315, GMLC 345, and E-SMLC 355 may be used to help locate UE 302 but not E-SLP 335. Conversely for user plane SUPL location, E-SLP 335 may be used to help locate UE 302 but not MME 315, GMLC 345, or E-SMLC 355. It will be appreciated that the various location solutions provide connectivity through the LRF 375 to the PSAP (either a legacy PSAP 385 or a NENA i3 capable PSAP 395). The LRF 375 is the common network element in the IMS for LTE network 301 that is able to request and receive a location estimate for UE 302 from either E-SLP 335 when user plane location is used or from GMLC 345 when control plane location is used. LRF 375 may then provide the location estimate for UE 302 to a PSAP (e.g. legacy PSAP 385 or i3 PSAP 395) when requested by the PSAP.

Referring to FIG. 3B, which as remarked shows network elements in the LTE network 301 in FIG. 3A that support control plane location, the dashed lines indicate protocols, associated message types and relevant 3GPP TSs (referenced by TS number) for positioning interaction between pairs of entities that communicate with one another but are not directly connected to one another and the solid lines indicate protocols, message types, interface designations and relevant 3GPP TSs (referenced by TS number) for communication links used for positioning between directly connected communicating entities. For example, the E-SMLC 355 and the eNodeB 305 employ the LPPa positioning protocol (shown as a dashed line in FIG. 3B) that is defined in 3GPP 36.455 and in which the E-SMLC may request and obtain measurements made by eNodeB 305 of UE 302 by exchanging LPPa messages with eNB 305. The messages for the LPPa protocol are physically transferred over (i) the SLs interface (shown as a solid line in FIG. 3B) between the E-SMLC 355 and the MME 315 using the LCS-AP protocol defined in 3GPP TS 29.171 and (ii) over the S1 interface (also shown as a solid line in FIG. 3B) between the MME 315 and the eNodeB 305 using the S1 AP protocol defined in 3GPP TS 36.413. The MME 315 also communicates with the GLMC 345 over the SLg interface and the GMLC 345 communicates with an LCS client 350 (which may be a PSAP such as legacy PSAP 385 or i3 PSAP 395) over an Le interface.

Similarly, the E-SMLC 355 and UE 302 may employ the LPP positioning protocol (shown as a dashed line in FIG. 3B) that is defined in 3GPP TS 36.355 and in which the E-SMLC 355 may (i) request and obtain measurements (e.g., OTDOA measurements) made by UE 302 of signals transmitted by eNodeB 305 and other eNBs and/or (ii) provide assistance data to UE 302 (e.g., assistance data for OTDOA). Messages for the LPP protocol are physically transferred over the SLs interface between the E-SMLC 355 and the MME 315, over the S1 interface between the MME 315 and the eNodeB 305, and over the LTE Uu air interface between the eNodeB 305 and UE 302 (all shown as solid lines in FIG. 3B). In some implementations, an additional LPP Extensions (LPPe) message may be embedded in some or all LPP messages to provide information for additional position methods including extensions to OTDOA. The LPPe protocol is defined by OMA and when used in combination with LPP may be referred to as LPP/LPPe.

During an OTDOA positioning procedure, the E-SMLC 355 may request OTDOA measurements from the UE 302 through the LPP layer. The requested measurements may be a set of Reference Signal Time Difference (RSTD) measurements. Together with or prior to this request, the E-SMLC 355 may send the UE 302 assistance data, which may include a list of eNodeBs (such as eNodeB 305) and parameters defining a Positioning Reference Signal (PRS) transmitted by each eNB to support OTDOA, including the bandwidth (BW), number of LTE time slots, periodicity, etc. for the PRS signal. The LPP request and assistance data applicable to OTDOA are described in more detail below.

UE 302 then performs the requested OTDOA measurements during a given period of time (e.g. up to 30 seconds in the case of an E911 call). These measurements consist of measuring the exact time differences between the PRS signals received by UE 302 from different eNodeBs (or from different cells in the case that a common eNB support two cells measured by UE 302). The UE 302 then reports these measured time differences to the E-SMLC 355 together with an estimate of the measurement quality for each measurement (e.g. which may be an estimate of the measurement error in each time difference measurement). Using these time difference estimates and the knowledge of the eNodeBs' positions and any transmit time offsets, the E-SMLC 355 estimates the position of the UE 302. In some implementations of OTDOA (e.g. when OTDOA is supported using LPP combined with LPPe), a UE 302 may not only make OTDOA time difference measurements but may also compute a location estimate from these measurements if E-SMLC 355 has provided LPP/LPPe assistance data to UE 302 comprising the eNodeBs' positions and any transmit time offsets.

A similar procedure is possible for use of OTDOA when a SUPL user plane location solution is used instead of a control plane solution. In this case, an SLP (e.g., E-SLP 335 in FIG. 3A) and a UE (e.g., UE 302) exchange LPP messages (or combined LPP/LPPe messages) embedded inside SUPL messages (e.g., SUPL POS messages) that may be transferred between the SLP and UE using TCP/IP. The LPP (or LPP/LPPe) message exchange in the case of SUPL may be the same as or similar to the LPP (or LPP/LPP) message exchange in the case of a control plane solution (e.g., the same sequence of LPP or LPP/LPPe messages may be transferred) and only the method of transport may differ.

Figure 3C:
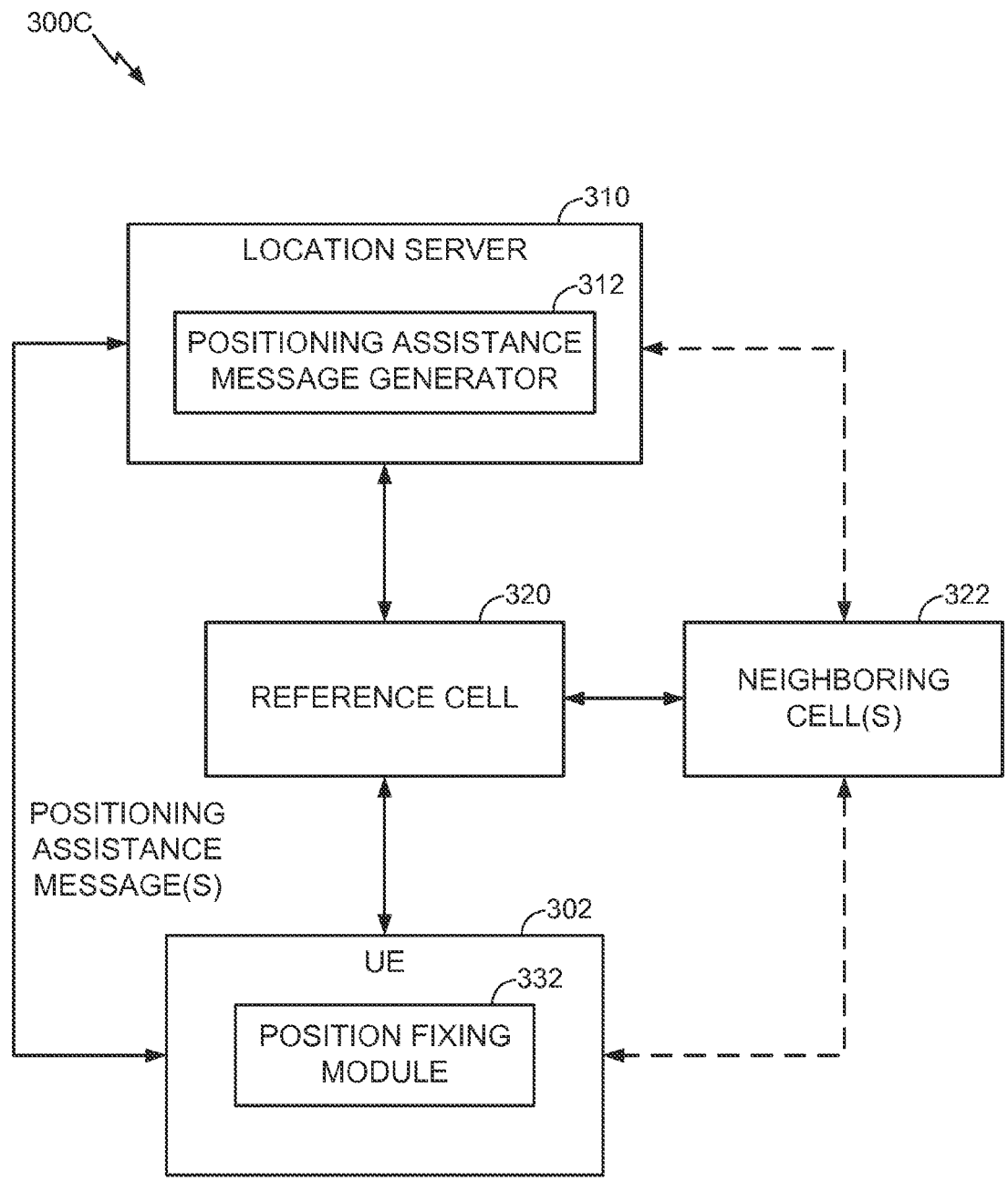
FIG. 3C illustrates an exemplary system for conducting adaptive network-assisted positioning according to an aspect of the disclosure.
Figure 3D:
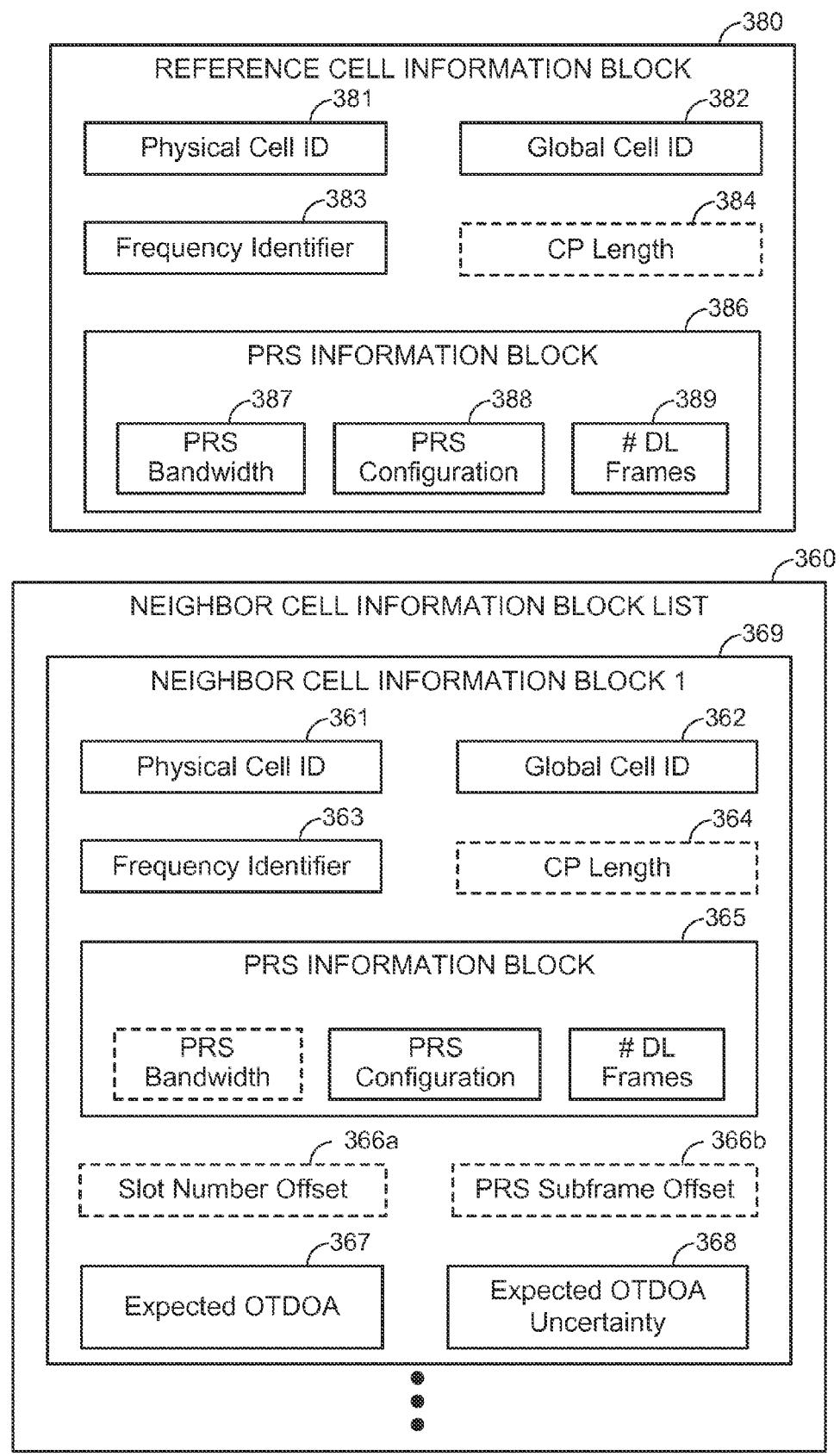
FIG. 3D illustrates Observed Time Difference of Arrival (OTDOA) assistance data messages according to an aspect of the disclosure.
Figure 3E:
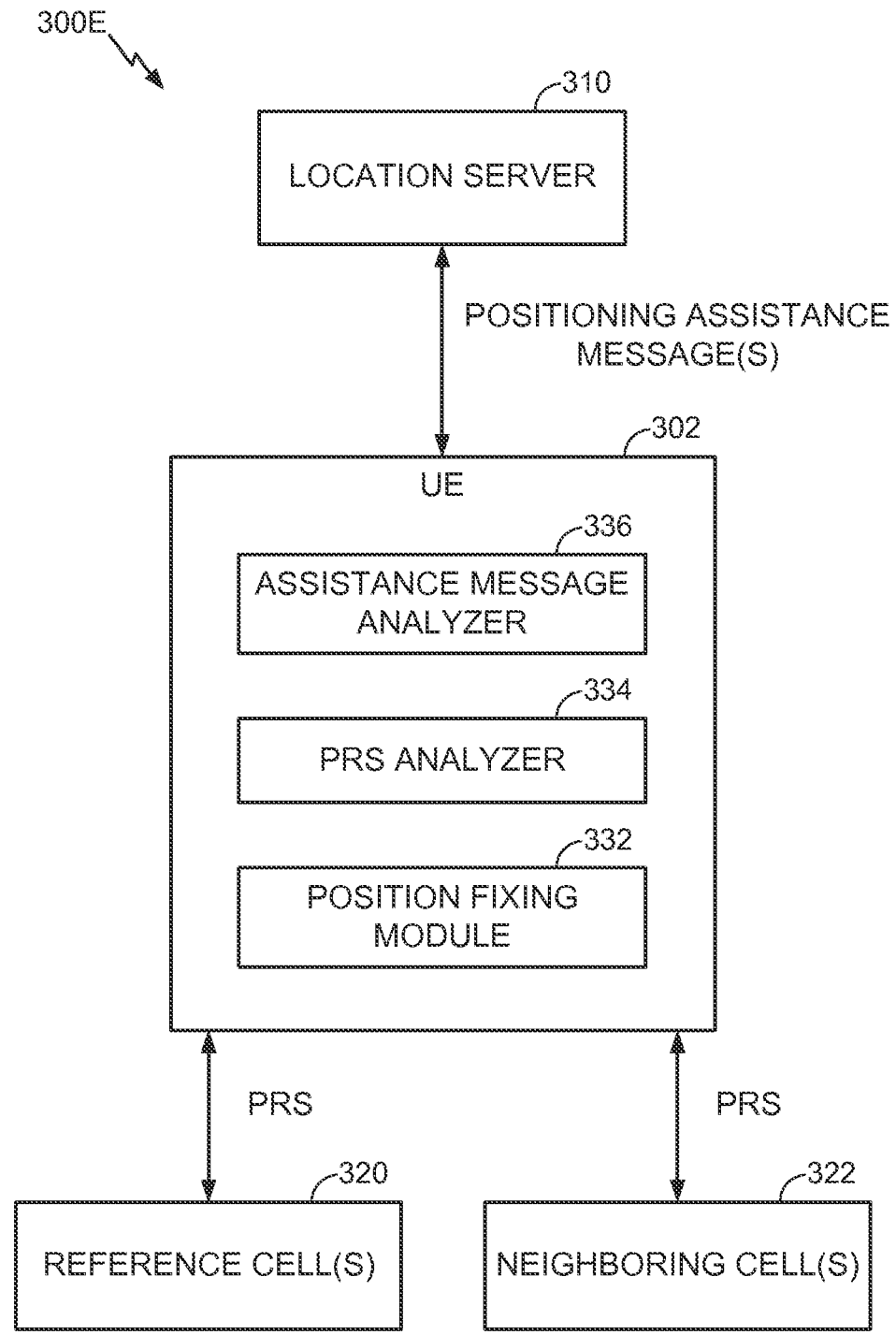
FIG. 3E illustrates an exemplary system for facilitating position fixing based on positioning assistance data according to an aspect of the disclosure.

FIGS. 3C-3E illustrate exemplary structural details of various network elements shown in FIGS. 3A and 3B and may apply in the case that OTDOA positioning is used with dynamic adaptation of PRS signaling from one or more eNBs whose PRS signals are measured by a UE. Dynamic adaptation of PRS signaling refers to temporarily changing the quality of PRS signaling (e.g. temporarily increasing the PRS bandwidth, PRS repetition rate and/or PRS transmission power) within a particular cell in order to: (i) improve the accuracy of OTDOA measurement of the PRS signal by a UE; (ii) increase the distance and/or amount of building penetration for which the PRS signal can be received and measured by a UE and/or (iii) reduce the level of interference by the PRS signal in the case of an eNB close to a UE with PRS signals received by the UE from other more distant eNBs. Adaptation of PRS signals may be scheduled at an eNB for one or more cells supported by the eNB by a location server. More details of adaptive PRS scheduling are provided later herein. Referring to FIG. 3C, an exemplary system 300C for conducting network-assisted positioning, wherein adaptive PRS scheduling may be used, is illustrated. System 300C can include one or more network cells (which may correspond to cells of eNodeBs 200, 205 and 210, eNodeB 305, etc., or to eNodeBs 200, 205 and 210 and/or eNodeB 305 themselves), such as a reference cell 320 and one or more neighboring cells 322. In one example, reference cell 320 and/or neighboring cell(s) 322 or other non-reference cells can transmit signals (e.g. PRS signals) that can be received (e.g. measured) by one or more UEs 302. Reference cell 320 and/or one or more of neighboring cell(s) 322 can be a serving network cell for any UE 302 or a non-serving network cell for any UE 302.

In accordance with one aspect, any UE 302 and/or other entities within system 300C (e.g. location server 310) can determine the position of the UE 302 using OTDOA, wherein timing measurements are made by UE 302 for reference signals (e.g. PRS signals) supported by LTE and/or for other highly detectable pilot signals, etc., transmitted by reference cell 320 and/or neighboring cell(s) 322. As used generally herein, a "neighboring cell" or "neighbor cell" is used to refer to a cell that is nearby to a serving network cell for a given UE 302 or is otherwise nearby the UE 302 (e.g., is transmitted by an eNB that is within a few miles of UE 302). However, it should be appreciated that other suitable network cells, such as network cells that border a designated reference cell 320, could additionally be utilized as described herein.

As shown in system 300C, a UE 302 can utilize a position fixing module 332 and/or other suitable means to perform position fixing within system 300C. In one example, a UE 302 can utilize positioning assistance data to help determine a position fix, acquire and measure PRS signals more quickly and/or more reliably, reduce complexity of measurements, improve performance of the UE 302, and/or other suitable ends. In some implementations, the positioning assistance data may include information such as: (i) identification of the reference cells 320 and/or neighboring cells 322 (e.g. using global cell identities and/or local physical cell identities); (ii) identification of PRS signals transmitted by the reference cell 320 and/or neighboring cells 322 (e.g. PRS bandwidth, PRS subframe assignments, PRS encoding); (iii) relative transmit time differences between the PRS signals transmitted by the reference cell 320 and neighboring cells 322; (iv) the approximate RSTD measurements expected (e.g., by location server 310) to be made by UE 302; and/or (v) locations of the eNB antennas for the reference cell 320 and/or neighboring cells 322. The positioning assistance data may further include adaptive PRS scheduling information, as discussed later herein.

As further shown in FIG. 3C, the positioning assistance data can be obtained by a UE 302 from a location server 310 associated with system 300C. The location server 310 can be an E-SMLC, such as E-SMLC 355, an Emergency Services SUPL Location Platform (E-SLP), such as E-SLP 335, an eNB, or any other suitable entity that can provide UE 302 with information to aid in the performance of position fixing module 332. Position fixing module 332 may be a legacy system or can include the ability to decode expanded adaptive PRS as disclosed later herein. Position fixing module 332 may be used by UE 302 to make measurements of PRS signals transmitted by different reference cells 320 and/or neighboring cells 322 (e.g. make RSTD measurements of the PES signal transmitted by one reference cell 320 and each of several different neighboring cells 322) with the measurements being returned by UE 302 to location server 310 to enable location server 310 to compute a location estimate for UE 302. Alternatively, positioning fixing module 332 may be used by UE 302 to make measurements of PRS signals transmitted by different reference cells 320 and/or neighboring cells 322 and compute a location estimate from these measurements (e.g. using positioning assistance data received from location server 310 to help determine the location estimate).

In one example, location server 310 can include a positioning assistance message generator 312 and can coordinate positioning of respective UEs 302 by generating and communicating the adaptive PRS schedule within system 300C. For example, location server 310 can be configured to identify a group of network cells based on which positioning assistance message generator 312 can be utilized to generate the adaptive PRS messaging. A group of identified network cells can include, for example, a serving network cell for one or more network users (e.g., a UE 302), a reference cell 320 (e.g. which may also be a serving network cell for a UE) and one or more neighbor network cells.

In accordance with one aspect, positioning assistance message generator 312 can be utilized to generate positioning assistance data for a given UE 302 in various manners as described in further detail herein. Upon generation of such data, location server 310 can transfer the generated data to the given UE 302 via one or more positioning assistance messages (e.g. LPP or LPP/LPPe positioning assistance messages). In one example, positioning assistance messages generated and transferred by location server 310 can include adaptive PRS scheduling information as described later herein.

In accordance with one aspect, OTDOA positioning assistance data such as that described above in association with FIG. 3C can be provided by location server 310 in the form of messages (e.g. LPP or LPP/LPPe messages), which in one example can be formatted as exemplified in FIG. 3D. FIG. 3D shows OTDOA assistance data in a positioning assistance data message (e.g. an LPP or LPP/LPPe message) as comprising a reference cell information block 380 and a neighbor cell information block list 360. The reference cell information block 380 can be utilized by location server 310 to provide OTDOA related information for a single reference cell such as reference cell 320. The neighbor cell information block list 360 may be utilized by location server 310 to provide OTDOA related information for neighbor cells for the reference cell such as neighbor cells 322. Moreover, the neighbor cell information block list 360 may comprise a neighbor cell information block 369 for each neighbor cell for which information is being provided. In FIG. 3D, for simplification, only one neighbor cell information block 369 is shown (designated neighbor cell information block 1) for just one neighbor cell but similar neighbor cell information blocks 369 (not shown) may be included in the neighbor cell information block list 360. The reference cell 320 (and the information for the reference cell contained in the reference cell information block 380) may be used by a UE as the basis for all OTDOA RSTD measurements, wherein a UE 302 measures the RSTD between the PRS signal received from the reference cell 320 and the PRS signal received from any of the neighbor cells 322 identified and described in the neighbor cell information block list 360.

As shown in FIG. 3D, the reference cell information block 380 can include a physical cell identity (ID) field 381 that specifies the physical cell identity of the reference cell 320, a global Cell ID field 382 that specifies a globally unique identity of the reference cell (e.g., an Evolved Universal Terrestrial Radio Access Network (E-UTRAN) Cell Global Identifier (ECGI)), a frequency identifier 383 that specifies a frequency and channel number on which the PRS is transmitted, a cyclic prefix (CP) length 384 for the PRS signal and a PRS information block 386 that specifies a PRS configuration for the reference cell. The PRS information block 386 can include: (i) a PRS bandwidth field 387 that specifies the bandwidth and corresponding number of resource blocks used by the PRS signal; (ii) a PRS configuration field 388 that specifies a configuration for the PRS signal comprising a periodicity for the PRS signal (e.g. such as a period of 160 ms) and an offset at which the PRS signal first begins in any new sequence of LTE system frames (e.g. an offset of 150 ms); and (iii) a DL frames field 389 that specifies a number of consecutive DL subframes that are configured for PRS transmission in each periodic occurrence (e.g. every 160 ms) of the PRS signal. The reference cell information block 380 can also include other information not shown in FIG. 3D that is applicable to the PRS signal transmitted for the reference cell such as the antenna configuration used by the eNB for transmission and a muting pattern for the PRS signal in the case that PRS is deliberately not sent (i.e. muted) in some periodic occurrences of the PRS signal to avoid interference with PRS transmission in other nearby cells.

As shown in FIG. 3D, a neighbor cell information block 369 can include the same type of information as just described for the reference cell information block 380 but now applicable to a neighbor cell plus some additional information that does not appear in the reference cell information block 380. The same type of information may include a physical cell ID 361, a global cell ID 362, a frequency identifier 363, a CP length 364 and a PRS information block 365 (e.g. comprising a PRS bandwidth, PRS configuration and a DL frames field). The additional information for a neighbor cell information block 369 can include an optional slot number offset field 366a that specifies the slot number offset between the neighbor cell and the reference cell (and may define how LTE radio frames for the neighbor cell align with LTE radio frames for the reference cell), fields for the expected RSTD between the neighbor cell and the reference cell and the uncertainty for the expected RSTD (fields 367 and 368 respectively). The additional information for a neighbor cell information block 369 can also include a PRS subframe offset 366b that may specify the offset between the first PRS subframe for the reference cell and the first PRS subframe in the closest subsequent PRS positioning occasion for the neighbour cell. The information for the reference cell and neighbour cell shown in FIG. 3D is further defined in more detail in 3GPP TS 36.355 and is further clarified herein in association with FIG. 5. In the case that adaptive PRS is being used wherein the PRS configuration in the reference cell and/or in one or more neighbour cells has been adaptively modified (e.g. by the location server 310), the PRS information conveyed in the positioning assistance data exemplified in FIG. 3D may refer to the adaptively modified PRS configuration for the reference cell and/or one or more neighbour cells. For example, if PRS bandwidth and/or number of consecutive DL subframes was increased for the reference cell, the PRS bandwidth field 387 and/or DL frames field 389 in the reference cell information block 380 may convey the increased bandwidth and/or increased number of consecutive DL subframes, respectively. Similar conveyance may occur for any of the neighbour cells in the neighbour cell information block 369.

It is noted that certain information regarding PRS transmission by an eNB in a particular cell may not be explicitly conveyed as assistance data—e.g. may not be included in OTDOA assistance data of the type shown in FIG. 3D. Instead, such information may be implicitly defined using information already known to a UE. One example of this is the cell specific frequency shift (also referred to herein as PRS frequency shift) for PRS transmission defined in 3GPP TS 36.211 which corresponds to the sequence of LTE subcarriers used for PRS transmission during one LTE resource block (which comprises 12 consecutive LTE subcarriers with a transmission period of one slot or 0.5 ms). The PRS frequency shift is determined from the physical cell ID as an integer in the range zero to five. PRS transmission in two different cells with a common frequency assignment and that are synchronized may be non-interfering when different PRS frequency shifts are used for each cell but may be mutually interfering when the same frequency shift is used. For adaptive modification of PRS transmission, a different PRS frequency shift may be assigned to a cell and conveyed in to a UE as part of assistance data. The different PRS frequency shift may help avoid interference with PRS transmission from certain other cells that a target UE needs to measure.

Referring now to FIG. 3E, a system 300E that facilitates position fixing based on positioning assistance data in accordance with various aspects is illustrated. As shown in system 300E, a UE 302 can perform position fixing in order to estimate its current location at least in part by measuring transmission timing differences (e.g., RSTDs for OTDOA) between respective reference signals (e.g., adaptive PRS signals) transmitted by a reference network cell 320, which may be a serving or non-serving cell for the UE 302, and one or more neighboring network cells 322. Further, UE 302 can utilize positioning assistance message(s) transmitted by (and received from) location server 310 and/or another suitable entity within system 300E (e.g., broadcast by an eNB within the reference cell 320) to facilitate positioning. As further shown in system 300E, a UE 302 can utilize an assistance message analyzer 336 to identify information contained within one or more of the received positioning assistance messages, such as information for an adaptive PRS signal. The identified information may correspond to that described in association with FIG. 3D for the reference cell information block 380 in the case of information relating to the PRS signal transmitted by the reference cell 320 and for the neighbor cell information block list 360 in the case of information relating to the PRS signals transmitted by each of the neighbor cells 322. Based on this identified information, a PRS analyzer 334 can be utilized in combination with, or independently of, a position fixing module 332 to make measurements (e.g. RSTD measurements) of received PRS signals and possibly determine the location of UE 302 from these measurements.

The United States Federal Communications Commission (FCC) has mandated a horizontal location accuracy target of 50 meters for E911 calls made indoors. Existing outdoor oriented methods for locating UEs, such as, Assisted Global Navigation Satellite System (A-GNSS) and Enhanced Cell ID (ECID), etc., may not be able to achieve this accuracy indoors. Although using the location of Wireless Local Area Network (WLAN) access points, such as access point 125 in FIG. 1, may achieve this accuracy and better, it may not always be reliable. For example, a WLAN AP detected by a target UE may not have a known location or a known accurate location or the AP may have previously had a known accurate location but may have been moved from that location after the location was obtained. Moreover, there may often be coverage gaps where few or no WLAN APs are detectable and in some severe cases (e.g. a fire, flood, hurricane or earthquake), local power outages may occur that may disable transmissions from nearby WLAN APs that do not have adequate battery backup.

The OTDOA position method for LTE, which is being deployed by some operators initially for outdoor location, may achieve the indoor accuracy requirements with the enhancements described herein. For OTDOA for LTE to achieve indoor accuracy of 50 meters or better for E911 calls, a high PRS duty cycle may need to be used, in which the PRS signal used for OTDOA RSTD measurements is transmitted frequently, and in which a large proportion (e.g., 25% to 100%) of the operator's available licensed downlink bandwidth may need to be used. Such a high PRS duty cycle may need to be significantly more than operators are likely to want to or need to deploy for outdoor location use because most operator licensed bandwidth needs to be used to support normal network operation including support of voice, data and signaling to subscribed UEs. Hence, a problem with a high PRS duty cycle is that significant licensed bandwidth would need to be allocated for the OTDOA PRS, which would reduce network capacity for voice and data traffic.

Accordingly, aspects of the disclosure provide an adaptive PRS duty cycle for indoor location enhancement. In an aspect, the PRS usage of operator bandwidth is adapted in real time to the needs of E911 calls and potentially to other uses of location where it is important to obtain an accurate location of a UE that is or may be indoors (or in some difficult outdoor environment, such as a dense urban area). When no E911 callers near an eNodeB need to be located, cells supported by the eNodeB may operate in a "normal PRS mode" (also referred to as a "non-emergency PRS mode"), in which only a small amount of downlink bandwidth is allocated to the PRS signal. However, when an E911 caller near an eNodeB, and potentially indoors, needs to be located, the eNodeB can switch into an "emergency PRS mode", in which a higher proportion of bandwidth (e.g., an increased frequency range or a larger number of consecutive LTE subframes) and/or a higher transmission power is/are allocated to the PRS signal, thereby improving building penetration, signal acquisition, and measurement accuracy by the UE.

The emergency PRS mode can be backward compatible with a legacy UE that does not support the emergency PRS mode but only supports normal (e.g. fixed) PRS mode if the emergency PRS mode includes PRS positioning occasions that may be used in normal PRS mode. For example, the emergency PRS mode may include up to six consecutive PRS subframes that may be periodically repeated, as described later with reference to FIG. 5, and may be coded and use bandwidth according to the existing definition of PRS for OTDOA in 3GPP TS 36.355 and TS 36.211, in which emergency PRS mode is not included. Legacy UEs may then measure this portion of the emergency PRS transmission and ignore additional PRS subframes or differently encoded PRS subframes that may also be transmitted by an eNB as part of the emergency PRS mode.

In a related aspect, the interference between PRS signals in the described emergency PRS mode can be reduced and an even higher PRS duty cycle for the emergency PRS mode can be enabled by scheduling when different eNodeBs switch between normal and emergency PRS modes. Specifically, the durations of the PRS transmissions for emergency PRS mode in eNodeBs near a target UE can be staggered such that only a few eNodeBs are using the emergency PRS mode at the same time. The scheduling times can be referenced to the serving cell (or other reference cell) for the target UE and made known to the UE in assistance data provided by an E-SMLC or SLP.

Figure 4A:
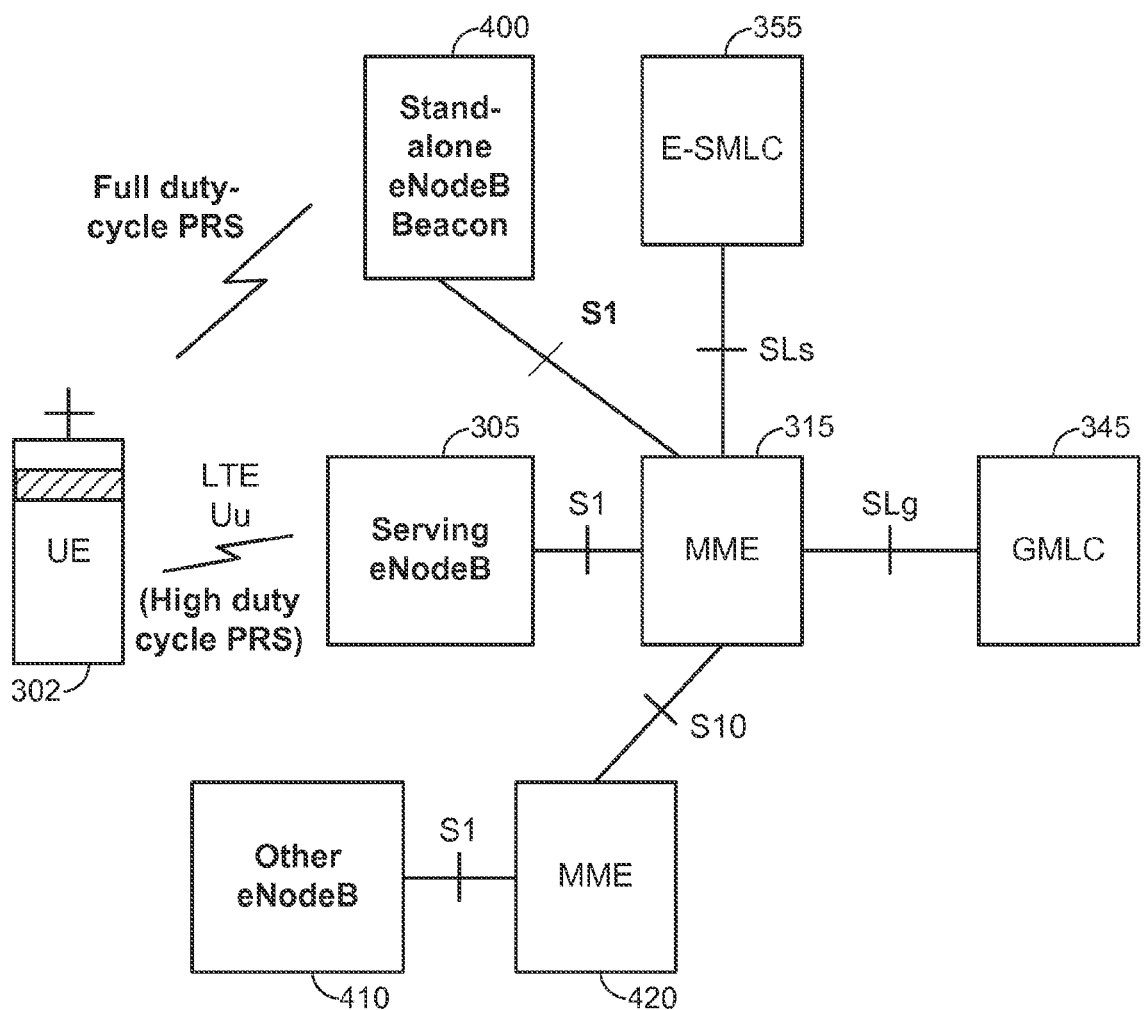
FIG. 4A illustrates an exemplary extension of the LTE architecture for E911 location illustrated in FIGS. 3A and 3B that permits the use of more accurate OTDOA indoors or outdoors.

FIG. 4A illustrates an exemplary extension of the LTE architecture for E911 location illustrated in FIGS. 3A and 3B that permits the use of OTDOA indoors. The architecture illustrated in FIG. 4A applies to the control plane solution. In the LTE architecture illustrated in FIG. 4A, a standalone eNodeB beacon 400 has been added to the LTE E911 location architecture illustrated in FIGS. 3A and 3B. In the example of FIG. 4A, the standalone eNodeB beacon 400 is connected to, for example, the MME 315, possibly over an S1 link, and provides additional coverage for indoor location. The standalone eNodeB beacon 400 can transmit a PRS signal to support positioning of UEs and may also transmit information needed to support UE acquisition and measurement of the PRS such as an LTE master information block (MIB) and one or more LTE system information blocks (SIBs), but may not transmit or receive data, voice or control information to support normal LTE access by UEs (e.g., may not support wireless access by UEs for the purpose of sending and receiving voice and data).

The MME 315 in FIG. 4A may also communicate with a serving eNodeB 305 for a UE 302 over an S1 interface and with an MME 420 over an S10 interface, which may communicate with another eNodeB 410 over an S1 interface. The eNodeBs 305 and 410 (which may correspond to any of eNodeBs 200, 205 and 210 in FIG. 2 and/or to eNodeB 305 in FIGS. 3A and 3B) may each act as normal eNBs in supporting LTE access by UEs for voice and data transfer and may each additionally transmit a PRS signal to support OTDOA positioning of UEs. In the case of an emergency call from the UE 302, the standalone eNodeB beacon 400 may transmit in an emergency PRS mode at a high or full duty cycle and the serving eNodeB 305 and/or other eNodeB 410 may transmit in an emergency PRS mode at a high duty cycle, as will be discussed below. The UE 302 may receive the adaptive PRS signals for the emergency PRS mode from the standalone eNodeB beacon 400, the serving eNodeB 305 and/or the other eNodeB 410 as well possibly as adaptive PRS signals for an emergency PRS mode from other eNBs not shown in FIG. 4A.

Figure 4B:
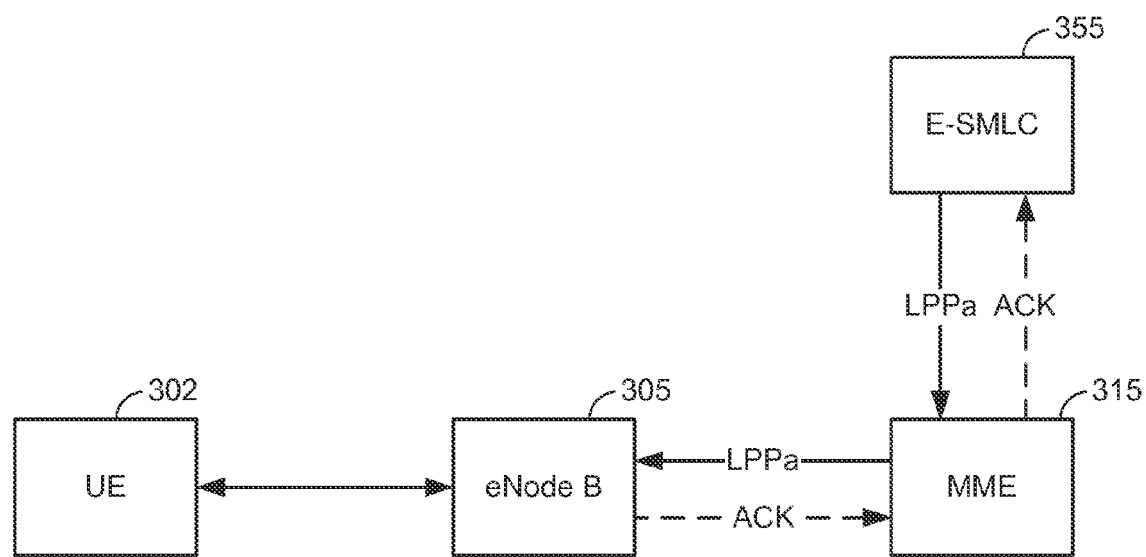
FIG. 4B illustrates an exemplary messaging flow for configuring emergency mode Positioning Reference Signal (PRS) scheduling.

FIG. 4B illustrates an exemplary messaging flow for configuring emergency mode PRS scheduling in the case that a control plane location solution is used such as that shown in FIGS. 3A, 3B and 4A. FIG. 4B illustrates the transfer of LPPa messages from an E-SMLC 355 to one or more eNBs 305 to configure adaptive PRS in the eNBs 305 for certain cells. The eNB 305 in FIG. 4B may not only correspond to the serving eNB 305 in FIG. 4A but may also represent the standalone eNB beacon 400 and the other eNB 410 in FIG. 4A from the point of view of configuring adaptive PRS in these eNBs. The LPPa messages may indicate the start (e.g. the start time or a starting LTE system frame number) for an emergency PRS mode and/or the start (e.g. the start time or a starting LTE system frame number) of adaptive muting of PRS transmission and/or adaptive muting of non-PRS downlink transmission (as described later herein) for a temporary period (e.g., 30 seconds) at the start of an E911 call from some target UE 302, as described herein. The LPPa messages sent by the E-SMLC 355 may be transferred to the eNB 305 (or to each eNB 305) via an MME such as MME 315. The LPPa messages may be, but need not be (as indicated by the dashed lines), acknowledged by the recipient eNBs 305. The LPPa messages can contain detailed PRS transmission parameters and/or PRS muting parameters (e.g., affected subframes, affected frequencies, any new PRS frequency shift or encoding to be used, duration, start time, etc.) for one or more cells supported by a recipient eNB 305 or may simply contain a reference (e.g., a flag indicating "emergency PRS mode" or a numeric label referring to preconfigured PRS transmission and muting parameters in the eNB 305 for one or more cells supported by the eNB 305). The LPPa messages may also or instead indicate a serving cell or approximate location for the target UE 302 with the detailed PRS transmission and muting parameters and/or the cells to which adaptive PRS (e.g. emergency PRS mode) shall apply already being configured in advance in the eNBs 305, such that each eNB 305 may use the serving cell or approximate UE location to lookup or otherwise discover the PRS transmission and muting parameters and the affected cells from the configured data. The detailed PRS transmission and muting parameters may define how PRS transmission and muting shall be modified in one or more cells supported by an eNB and over which time period (or which sequence of LTE system frames) this modification shall persist. In essence, each eNB may support PRS transmission and muting in a normal PRS mode under normal conditions when no locations are needed for nearby UEs due to emergency calls (or other emergency or high priority conditions) but may switch to PRS transmission and muting parameters for an emergency PRS mode temporarily when a location is needed for a nearby UE with an emergency call or other emergency or high priority location related condition.

Figure 5:
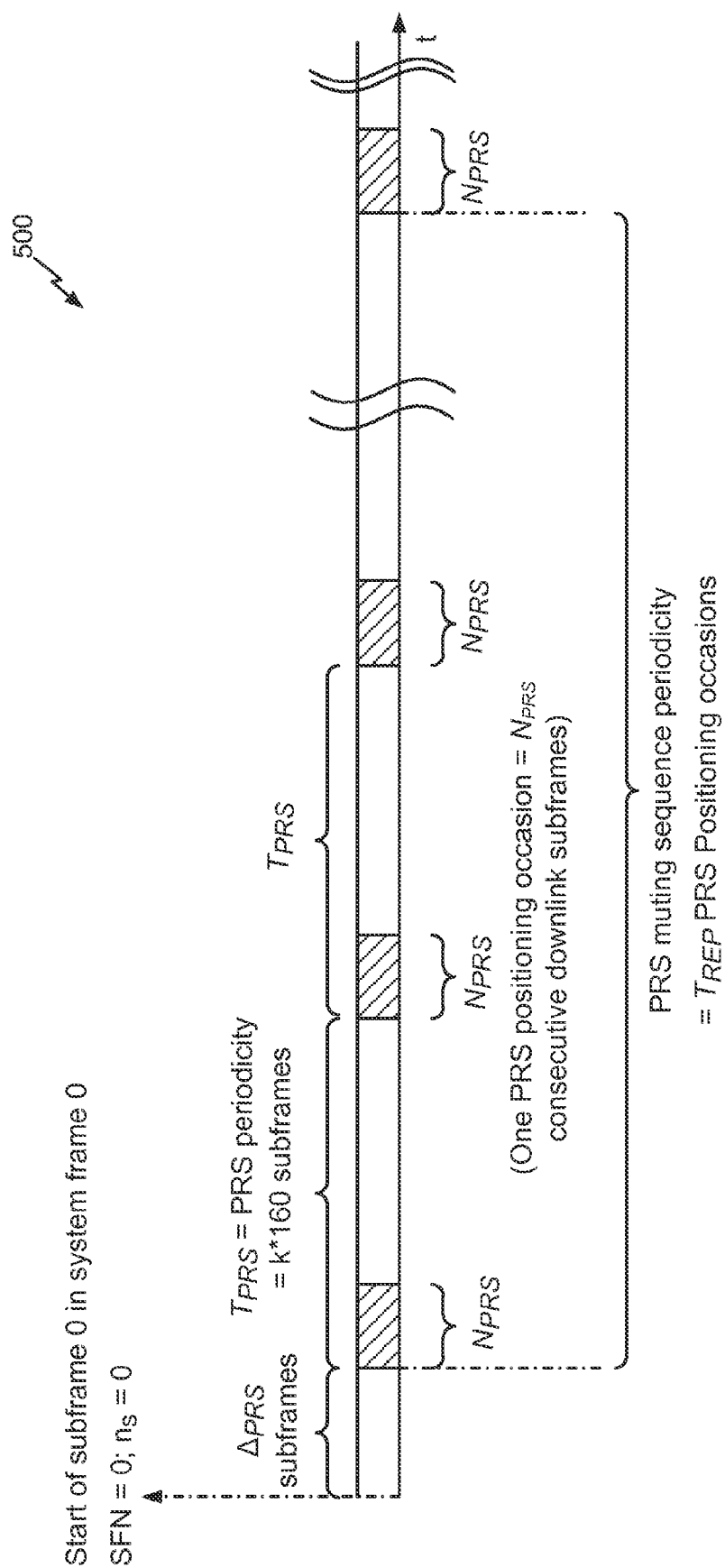
FIG. 5 illustrates a time sequence of an exemplary PRS duty cycle.

FIG. 5 shows a time sequence 500 of an exemplary PRS duty cycle. FIG. 5 illustrates a sequence of LTE subframe transmissions from an eNB in a particular cell starting with transmission at subframe zero in a system frame with system frame number (SFN) zero and extending to transmission from the last subframe of the system frame with SFN equal to 1023. In LTE in FDD mode, each subframe has a duration of one millisecond (ms) and each system frame is composed of 10 subframes and has a duration of 10 ms. Note that system frames can also be referred to as radio frames or simply as frames. Consecutive system frames are numbered from 0 to 1023, after which the numbering restarts again from zero for subsequent system frames. Therefore, FIG. 5 shows transmission over the longest set of subframes that can be individually and distinctly referenced (via subframe and system frame numbering) for LTE. In FIG. 5, increasing time is represented by the horizontal lines going from left to right. Groups of consecutive subframes that are used to transmit PRS, and that are referred to in 3GPP TSs (e.g., in 3GPP TS 36.211 and 36.355) as "PRS positioning occasions", are represented in FIG. 5 by the diagonally striped rectangles.

As defined by 3GPP (e.g., in TS 36.211), the sequence of subframes used to transmit PRS for OTDOA is characterized and defined by a number of parameters comprising: (i) a reserved block of bandwidth (BW) corresponding to the PRS bandwidth parameter 387 shown in FIG. 3D in the case of a reference cell; (ii) a configuration index $I_{PRS}$ (which corresponds to PRS configuration parameter 388 in FIG. 3D in the case of a reference cell and which defines an offset $\Delta_{PRS}$ from the start of subframe zero for SFN zero to the first PRS positioning occasion and a periodicity $T_{PRS}$ in units of subframes for consecutive PRS positioning occasions); (iii) a duration $N_{PRS}$ (defining the number of consecutive PRS subframes in each PRS positioning occasion and which corresponds to DL frames parameter 389 in FIG. 3D in the case of a reference cell); (iv) a muting pattern (defining a sequence of consecutive PRS positioning occasions within which the PRS signal is either transmitted or is muted according to the muting pattern and which corresponds to a possible parameter for the PRS Information Blocks 386 and 365 in FIG. 3D); and (v) a muting sequence periodicity $T_{REP}$ which can be implicitly included as part of the muting pattern in (iv). It should be remarked that in the case of assistance data provided to a UE such as the assistance data illustrated in FIG. 3D, FIG. 5 illustrates a muting pattern sequence for a reference cell but not a neighbor cell: for a neighbor cell the periodic muting pattern sequence conveyed to a UE (e.g. exemplified as part of the PRS Information Block 365 in FIG. 3D) would start in the first PRS positioning occasion for the neighbor cell that begins after subframe zero for system frame zero for the reference cell indicated to the UE. In some cases, $N_{PRS}=1$, $T_{PRS}=160$ subframes (equivalent to 160 ms), and BW=1.4, 3, 5, 10, 15 or 20 MHz. To increase the PRS duty cycle, the $N_{PRS}$ value can be increased to six (i.e., $N_{PRS}=6$) and the BW value can be increased to the LTE system bandwidth (i.e., BW=LTE system bandwidth). An expanded adaptive PRS with a larger $N_{PRS}$ (e.g., greater than six) and a shorter $T_{PRS}$ (e.g., less than 160 ms), up to the full duty cycle (i.e., $N_{PRS}=T_{PRS}$), could also be used by modifying the existing definition of OTDOA, for example, in 3GPP TS 36.355.

For the case of LTE using TDD, system frames are again each of duration 10 ms and each comprise eight available subframes for uplink or downlink transmission. The PRS parameters described above for FDD are then used to define in which downlink subframes PRS transmission occurs. Specifically, the offset $\Delta_{PRS}$ provides the number of downlink subframes from the first downlink subframe in system frame zero to the first PRS subframe; the duration $N_{PRS}$ provides the number of consecutive downlink PRS subframes in each PRS positioning occasion; and the periodicity $T_{PRS}$ provides the number of downlink subframes between the start of consecutive PRS positioning occasions FIGS. 6A and 6B illustrate PRS overhead examples for LTE in FDD mode with a network bandwidth of 10 MHz (FIG. 6A, table 600A) and a network bandwidth of 20 MHz (FIG. 6B, table 600B) where $T_{PRS}=160$ ms. In each case, when a high PRS duty cycle is used employing all available network bandwidth for PRS transmission and six consecutive subframes for PRS positioning occasions, around 3.75% of overall available downlink network bandwidth would be used to transmit PRS. If the number of consecutive PRS subframes was higher than six, more network bandwidth would be used, up to a maximum of 100% of bandwidth reached when all subframes are used to transmit PRS. Adaptive PRS as described later herein provides a means to reduce network bandwidth use while still providing a high PRS duty cycle for location of a UE using OTDOA.

Where the PRS usage of the operator's bandwidth is adapted to the needs of E911 calls, the PRS duty cycle and PRS power (per cell or per sector) can be adapted based on whether E911 location services are needed by a nearby UE. An operator could configure PRS parameters, including duty cycle (e.g., bandwidth BW, offset $\Delta_{PRS}$, duration $N_{PRS}$, periodicity $T_{PRS}$) and muting for two (or more) PRS modes in each eNodeB. Configuration parameters could also include information on use of transmit diversity as described later herein with reference to FIG. 12B. For example, the operator could configure PRS parameters for a "normal mode" (or "normal PRS mode") and an "emergency mode" (or "emergency PRS mode"). Configuration parameters could further include information on use of PRS frequency shifting—e.g. a new PRS frequency shift to be used or a pseudo-random sequence of different PRS frequency shifts may be used across consecutive PRS subframes or consecutive PRS positioning occasions.

Standalone eNodeBs (e.g. standalone eNodeB beacon 400 exemplified in FIG. 4A) can also be adaptive to reduce interference and power usage. Configuration of PRS for normal mode may be used for location of UEs outdoors or for low priority uses of location where a UE may be indoors and may configure PRS parameters such that the fraction of downlink operator bandwidth that is used is small (e.g., 2% or less). Configuration of PRS for emergency mode may be used for location of UEs that are known to be or may be indoors or in a difficult outdoor environment where location priority is high (e.g., such as for an E911 call) and may use a higher proportion of downlink operator bandwidth (e.g., more than 2% and up to 100%).

Switching between normal and emergency PRS mode for any cell by an eNodeB can be instructed by any of (i) the MME that is serving a target UE (i.e., a UE to be located) using the S1-AP protocol defined in 3GPP TS 36.413, (ii) the E-SMLC that is attempting to locate the target UE using the LPPa protocol, or (iii) the serving eNodeB for the target UE using the X2 protocol. The serving MME and the serving eNodeB control can be used for both the control plane and the SUPL location solutions in the case of location for an emergency call. This is because the serving MME and serving eNodeB can each be aware that a UE is instigating an emergency call due to the UE obtaining what is known in LTE as an emergency PDN connection or emergency bearer for the LTE emergency call. Hence, the serving MME or serving eNodeB may send information to other eNodeBs to configure emergency PRS mode in cells near the target UE in advance of the location being obtained by either an E-SMLC in the case of control plane location or an E-SLP in the case of SUPL location. However, E-SMLC control may have the added benefit of allowing the E-SMLC (or an SLP associated with an E-SMLC) to send the adapted PRS parameters applicable to emergency PRS mode to the target UE (e.g. PRS parameters as exemplified and described in association with FIG. 3D), thereby enabling the target UE to know which subframes in each cell will be used to transmit PRS and how the PRS signal will be transmitted (e.g. the bandwidth, cyclic prefix length and PRS frequency shift). For a UE that establishes an emergency call using GSM, WCDMA or cdma2000 1× CS (Circuit Switched) access, a location server (in this case an SMLC, SAS or PDE) may interact with an associated E-SMLC to cause the associated E-SMLC to send emergency mode configuration changes to nearby eNodeBs and the location server may also forward the emergency PRS mode parameters to the UE using a positioning protocol supported by the location server and UE such as RRLP for GSM, RRC for WCDMA or 3GPP2 ($3^{rd}$ Generation Partnership Project 2) TS C.S0022 for cdma2000 1× CS.

An operator could configure mode changes in eNodeBs based on the UE serving cell (e.g., use normal mode in the serving cell and possibly other cells supported by the serving eNodeB and emergency mode in cells supported by other nearby eNodeBs). For example, an operator might determine either via calculation or actual measurement or both, which nearby cells may be able to transmit PRS that can be acquired and accurately measured by most UEs that are within a particular serving cell. The particular nearby cells may be chosen so that a sufficient number will be available to be measured (e.g., 20 to 80 cells) to enable accurate OTDOA location calculation and to enable measurement of cells in all directions from a target UE (as opposed to one direction or a few directions only from a target UE) to avoid reduction in location accuracy due to geometric dilution of precision. The optimal configuration may be evaluated by crowdsourcing PRS measurements of nearby cells from UEs with known serving cells to a network server with the cells configured to transmit normal PRS mode at certain known times and emergency PRS mode at certain other known times (e.g., during off peak hours). The crowdsourced PRS measurements may reveal which cells using normal or emergency PRS mode a UE may typically effectively measure when served by any particular serving cell and may thereby guide configuration of emergency PRS mode based on a known serving cell.

For example, UEs accessing a particular serving network may be instructed by the network to perform 3GPP Minimization of Drive Test (MDT) measurements in which the UE measures characteristics (e.g., signal strength, signal quality and/or RSTD) for PRS transmission from nearby cells and in addition reports the UE serving cell, UE location and/or UE location related measurements (e.g., RSTD measurements) to an MDT server in the network. This may be done during off peak hours (e.g. between 8:00 pm and 6:00 am local time) when some or all cells are using emergency PRS mode. An operator can then evaluate the results to determine for which cells emergency PRS transmission can be accurately measured in each cell of the network. An operator may then adjust emergency PRS mode configuration parameters to find an optimum (or near optimum) configuration that typically enables accurate measurements by UEs in each serving cell of PRS transmission from a sufficient number of nearby cells to enable accurate OTDOA location. This trial and error measurement and adjustment may not only optimize PRS transmission bandwidth (e.g., avoid assigning more power, bandwidth and subframes for normal and emergency PRS modes than is needed) but may also reduce interference by establishing muting sequences and/or PRS frequency offsets for different cells in which interference to reception and measurement of PRS transmission for any one cell by a UE is reduced by muting and/or use of a different PRS frequency offset for PRS transmission for certain other nearby cells.

When many E911 calls occur together over the same small area (e.g., in the case of a serious accident or a disaster), a third PRS configuration mode could be useful (in addition to normal and emergency PRS modes) in which the PRS duty cycle is increased in a large number of cells spanning an area larger than that typically affected when only a single UE is being located. The E-SMLC (or SLP) may be in the best position to infer that a widespread emergency situation has occurred since it would receive a large number of location requests for E911 calls associated with UEs in the same cell or in nearby cells. In the case that many E911 related locations were needed for the same cell or a set of nearby cells, an E-SMLC (or SLP) could invoke the third PRS mode in cells that could be measured over all serving cells for the target UEs. The third PRS mode might have a lower PRS duty cycle than that for emergency PRS mode to reduce interference between cells or might employ additional muting in some cells during PRS transmission from other cells.

Configuration of emergency PRS mode in different cells (e.g. by an E-SMLC or SLP) to locate a target UE using OTDOA could also be based on which cells the target UE reports as being receivable, for example, using the 3GPP ECID position method. As an example, cells known to be receivable by a target UE (e.g. from ECID measurements reported by the target UE to an E-SMLC or SLP) might continue to use normal PRS mode or a lower PRS duty cycle for emergency PRS mode while nearby cells not known to be receivable (e.g., a cell that is not usable as a serving cell) might switch to emergency PRS mode at a higher PRS duty cycle.

Figure 7A:
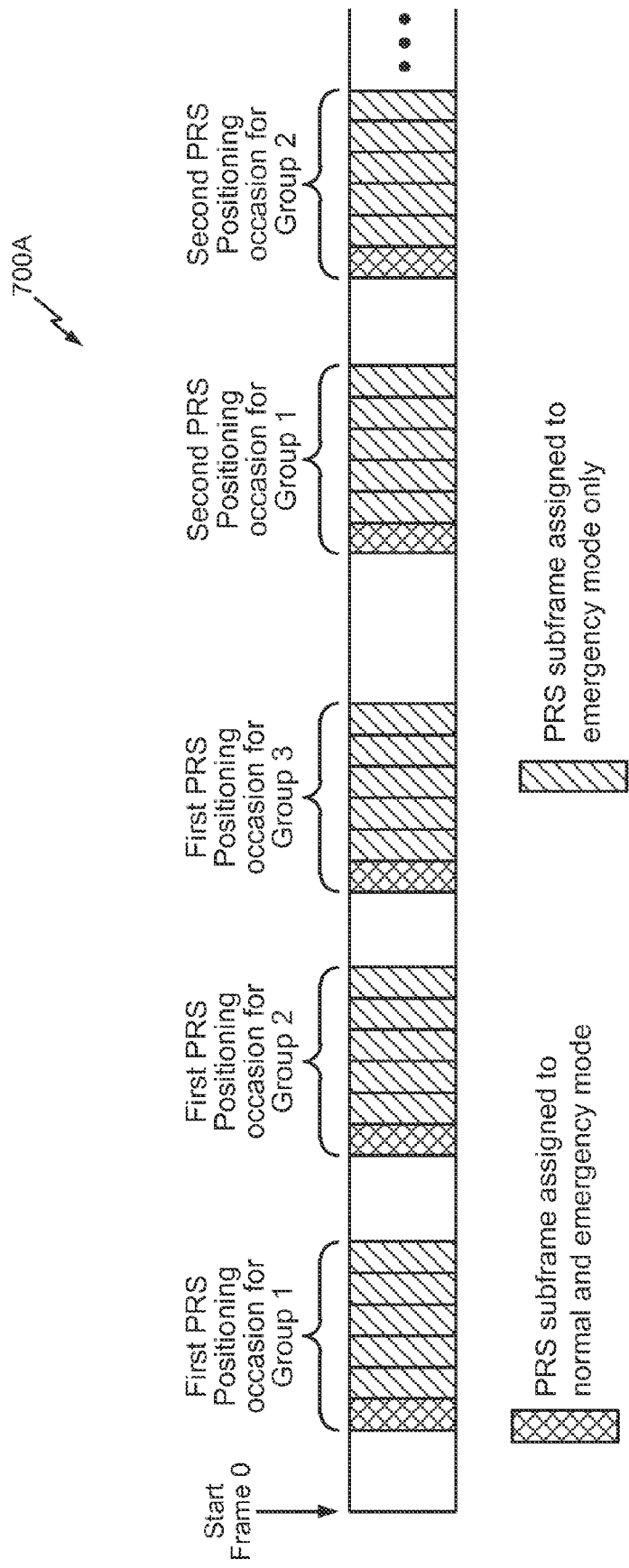
FIG. 7A illustrates an exemplary subframe sequence for an adaptive PRS configuration.

FIG. 7A illustrates an exemplary subframe sequence 700A for an adaptive PRS configuration. To simplify configuration of normal and emergency PRS modes for any possible combination of PRS modes in different cells, cells may be partitioned into groups in which each group uses the same PRS offset, PRS periodicity and PRS muting sequence periodicity parameter values (i.e. the same $I_{PRS}$ and $T_{REP}$ parameter values but with possibly different muting patterns), and where the number of consecutive PRS subframes $N_{PRS}$ for each group has a lower value for normal PRS mode and a higher value for emergency PRS mode. The subframe sequence 700A illustrated in FIG. 7A may apply when LTE transmission is synchronized in all network cells such that the same subframes (e.g. subframe 0 of system frame 0 and each subsequent subframe) are transmitted at exactly the same times in all cells.

FIG. 7A illustrates subframe usage for PRS transmitted in different cells over a sequence of subframes starting at subframe 0 in system frame 0 on the left and progressing towards the last subframe in system frame 1023 on the far right (not shown in FIG. 7A). Subframes that are used for PRS in normal mode and for PRS in emergency mode are highlighted for different groups. Three groups of cells are shown in this example and the PRS occasions for each group are distinguished. Since transmission is synchronized, FIG. 7A illustrates that the PRS positioning occasions for the three groups of cells can occur at different times (in different sets of subframes) and that when one group of cells is transmitting PRS subframes, the two other groups of cells are not transmitting PRS. As illustrated in FIG. 7A, interference between the PRS positioning occasions for the three groups of cells can be avoided provided there are no overlaps between positioning occasions for the emergency mode for the three groups of cells with $N_{PRS}$ values (in this example) of one (1) for normal mode and six (6) for emergency mode.

Note that the transmission arrangement shown in FIG. 7A does not necessarily avoid interference between PRS transmission by any one group of cells and non-PRS transmission by either of the two other groups of cells (though as described later herein, this interference can be avoided). Thus, in some implementations, all or most cells in a network may belong to one group (e.g. Group 1) with the other two groups not being present.

Figure 7B:
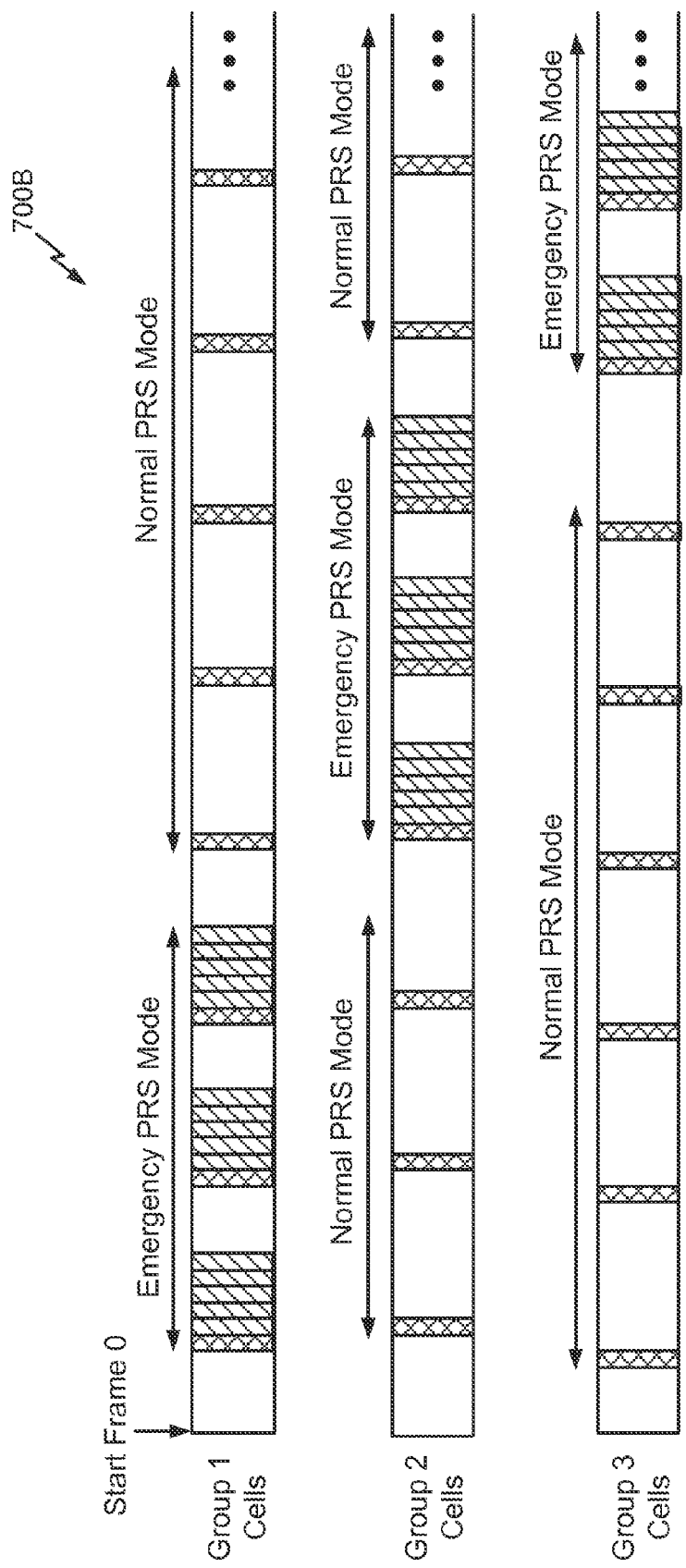
FIG. 7B illustrates exemplary subframe sequences for scheduling an emergency PRS mode.

FIG. 7B illustrates exemplary subframe sequences 700B for scheduling the emergency PRS mode. With scheduling, emergency PRS mode can be used by different groups of cells during different (e.g. non-overlapping) time periods to reduce the impact on operator bandwidth usage. For example, one group of cells (e.g. which may comprise only one cell or more than one cell) can be switched into emergency PRS mode from a time T (according to some time system such as UTC time or local time) to a time T+t (e.g., where T corresponds to the start of attempting to locate a target UE and t is some fraction of the overall time period available to locate the UE such as 10 seconds in the case that 30 seconds is available overall). A second group of cells may then be switched into emergency PRS mode between time T+t and T+2t and a third group of cells may be switched into emergency PRS mode from a time T+2t to T+3t. At times other than those scheduled for emergency PRS mode, each group of cells may be transmitting PRS in normal PRS mode. In this example, each group of cells is only using emergency PRS mode for a time t, although the overall period of location is 3t (or more). Therefore, the impact to operator bandwidth is reduced for each group of cells compared to the case where each group of cells transmits emergency PRS mode for the entire duration of UE location (e.g., for a period of 3t or more).

Furthermore, because each group of cells transmits emergency PRS during a different time period t than the other groups of cells, interference between PRS transmission by the different groups is avoided. The target UE may be informed (e.g., by an E-SMLC or SLP) when each group of cells will be transmitting emergency PRS, thereby allowing the UE to make measurements of PRS for each cell only while that cell is transmitting emergency PRS mode (as opposed to normal PRS mode).

The example in FIG. 7B shows the timing of PRS transmission by cells in each group using the convention shown in FIG. 7A to distinguish PRS subframes assigned to both normal and emergency PRS modes from PRS subframes assigned only to emergency PRS mode. In this example, emergency PRS mode for each group of cells consists of three consecutive PRS positioning occasions each containing six consecutive downlink PRS subframes which occur at different times to the emergency PRS positioning occasions for the other two groups. When any cell is not transmitting emergency PRS mode, it is transmitting normal PRS mode (in this example positioning occasions each comprising one PRS subframe). The emergency PRS mode in cells near a target UE can thus be staggered, as illustrated in FIG. 7B, by having only a fraction of the cells (e.g. a third of the cells) transmit using emergency PRS mode at the same time. This may reduce the impact to normal traffic (e.g., by reducing the amount of operator bandwidth used for PRS), may reduce interference between the PRS transmission of neighbor cells (e.g., between cells in groups 1, 2 and 3 in FIG. 7B), and may improve OTDOA measurement accuracy and the number of cells for which OTDOA measurements can be made due to the increased PRS duty cycle during emergency PRS mode (e.g. the extra number of PRS subframes and possibly higher bandwidth and higher transmit power). An E-SMLC (or an MME) can schedule the time at which each cell switches from normal to emergency PRS mode and back again to normal mode and can inform the UE. Time scheduling information provided to a UE can be relative to the OTDOA reference cell, the UE serving cell or the cell for which scheduling information is provided.

When network cells are synchronized and are partitioned into groups with each group of cells sharing a common PRS configuration for normal PRS mode and a common PRS configuration for emergency PRS mode and with different groups possibly using non-overlapping PRS positioning occasions for normal PRS mode, scheduling can be inter-group or intra-group. With inter-group scheduling, emergency PRS mode is scheduled for all cells in the same group over the same time period which is different and possibly non-overlapping with the time period during which emergency PRS mode is scheduled for all cells in other groups. FIG. 7B provides an example of inter-group scheduling in which the period of emergency PRS mode for each group (i.e. Groups 1, 2 and 3 in FIG. 7B) is different and non-overlapping with the period of emergency PRS mode scheduled for the other groups.

With intra-group scheduling, cells in each group still share a common PRS configuration for normal PRS mode and a common PRS configuration for emergency PRS mode, but each group of cells is partitioned into two or more subgroups with each subgroup of cells in the same group being scheduled to transmit emergency PRS mode at different and possibly non-overlapping times to other subgroups of cells in the same group. In addition, emergency PRS mode for different groups may be scheduled during the same time period. Intra-group scheduling is illustrated in FIG. 8 and uses the same conventions to show PRS positioning occasions as in FIG. 7A and FIG. 7B.

Figure 8:
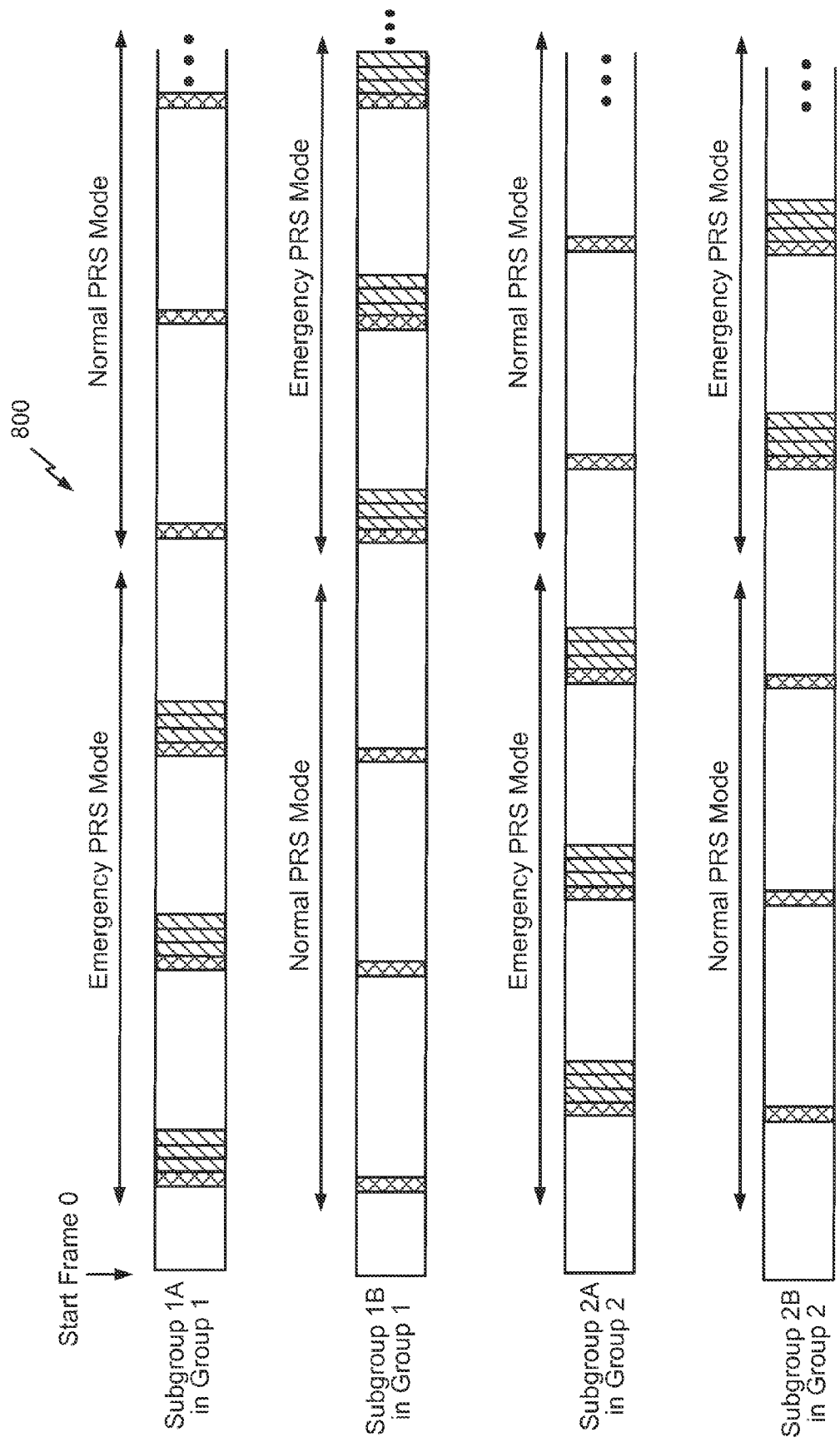
FIG. 8 illustrates exemplary subframe sequences for two groups of cells.

FIG. 8 shows a sequence 800 of normal and emergency PRS subframes for cells in each of two groups of cells starting from subframe 0 in system frame 0 (shown on the extreme left for each group) and extending towards the last subframe on system frame 1023 (shown on the far right and beyond the confines of FIG. 8). FIG. 8 shows PRS scheduling for two groups of cells, labelled Group 1 and Group 2, where each group of cells is divided into two subgroups comprising subgroups 1A and 1B for Group 1 and subgroups 2A and 2B for Group 2. FIG. 8 shows that cells in Group 1 share the same PRS positioning configuration for each of normal PRS mode and emergency PRS mode (e.g. same offset $\Delta_{PRS}$, same periodicity $T_{PRS}$, same duration $N_{PRS}$ and same muting sequence periodicity $T_{REP}$)) but that cells in subgroup 1A are scheduled to transmit emergency PRS mode in a different and, in this case, non-overlapping time period, to cells in subgroup 1B. The same applies to cells in Group 2 with respect to subgroups 2A and 2B. In addition, the time period during which emergency PRS mode is scheduled is the same in this example for subgroups 1A and 2A for Groups 1 and 2 and is the same for subgroups 1B and 2B for Groups 1 and 2.

Inter-group scheduling (as in FIG. 7B) may allow a higher PRS duty cycle than intra-group scheduling (as in FIG. 8) because the emergency PRS mode for each group can occur during a different interval of time than for other groups, thereby making available more subframes for transmission of emergency PRS during which all other groups are only transmitting normal PRS. However, there may also be higher interference between cells in the same group because all cells in the same group transmit PRS in the same set of subframes. With intra-group scheduling, fewer cells in the same group may transmit emergency PRS mode in the same subframes (due to scheduling emergency PRS mode at different time periods for different subgroups of cells in the same group) so there can be less interference between cells transmitting emergency PRS. However, because subgroups from different groups are allowed to transmit emergency PRS during the same time period, there may be fewer subframes available to each subgroup to transmit PRS assuming that PRS transmission by subgroups from different groups at the same time is to be avoided, which may result in a lower PRS duty cycle. It should also be noted that partitioning of cells into different groups with a distinct and common normal PRS and emergency PRS configuration for each group may be fixed and therefore applicable to scheduling emergency PRS mode to locate any UE. In contrast, the division of each group of cells into different subgroups in the case of intra-group scheduling may not be fixed but may depend on the target UE that is being located: for example, may be based on the approximate location or serving cell of the target UE which may allow subgroups to be chosen and scheduled to transmit emergency PRS mode in a manner that can improve OTDOA measurement accuracy by the particular target UE. In addition, for both inter-group scheduling and intra-group scheduling, a group of cells may comprise cells over a large area including an entire coverage area of a network, but only a subset of the group of cells (e.g. cells in group that are nearby to a target UE) may be scheduled into transmitting emergency PRS mode to a help locate a particular target UE.

FIG. 9 is a listing 900 of exemplary ASN.1 code illustrating adaptive PRS scheduling supported by the 3GPP LPP positioning protocol. An indoor mode parameter (designated "indoorMode-r13" in FIG. 9) can be added to the PRS-Info ASN.1 data type that is defined in the LPP specification (3GPP TS 36.355) as shown underlined in FIG. 9. This can define which PRS positioning occasions use normal mode versus emergency mode. In this example, the bandwidth BW, offset $\Delta_{PRS}$ and periodicity $T_{PRS}$ for PRS positioning occasions for both normal and emergency modes may be the same and defined by the ASN.1 parameters prs-Bandwidth and prs-ConfigurationIndex shown in FIG. 9. However, the duration $N_{PRS}$ (i.e., number of consecutive downlink PRS subframes) and muting sequence for normal and emergency modes may be different. For normal PRS mode, the duration $N_{PRS}$ and muting sequence may continue to be defined by the numDL-Frames and prs-MutingInfo-r9 ASN.1 parameters shown in FIG. 9. This may enable an existing (e.g., legacy) UE to continue to use normal PRS mode for OTDOA positioning. For emergency PRS mode, a new ASN.1 parameter, numDL-Frames-r13 parameter, can define the number of consecutive PRS subframes in each positioning occasion for emergency PRS mode. Another new ASN.1 parameter, scheduling-r13, can define the scheduling and muting sequence for PRS positioning occasions for emergency PRS mode.

The scheduling and muting for emergency PRS mode may be defined as follows using the ASN.1 parameters shown in FIG. 9. First, the prs-MutingInfo-r9 ASN.1 parameter (which may be replaced by a binary string of all ones if muting is not used) and the scheduling-r13 ASN.1 parameter may both be included as bit strings of equal length N bits (where N equals 2, 4, 8, or 16). The two strings may be combined (e.g. by a UE that receives the PRS-Info ASN.1 parameter as assistance data for OTDOA) such that bits in the same bit position in each bit string are combined into a bit pair <B1, B2>, where B1 is a bit from the bit string prs-MutingInfo-r9 and B2 is the corresponding bit (i.e., a bit at the same bit position) from the bit string scheduling-r13. The combination of the two bit strings may produce a sequence of N bit pairs, where the order of bit pairs is the same as the order of the component bits (e.g. with the n.th bit pair being a combination of the n.th bits in the bit strings prs-MutingInfo-r9 and scheduling-r13). The sequence of N bit pairs may be used to determine the usage of each PRS positioning occasion for a particular cell starting with the first PRS positioning occasion after the start of system frame zero whose usage is defined by the first bit pair in the sequence and proceeding to the Nth PRS positioning occasion whose usage is defined by the Nth (i.e. last) bit pair. If there are more PRS positioning occasions after the Nth occasion, the sequence of N bit pairs may be reapplied to the N+1$^{st}$ occasion and so on starting at the first bit pair again.

The application of each bit pair to determine scheduling and muting of each PRS positioning occasion may be as follows: a "11" bit pair may indicate emergency PRS mode (e.g. where a number, given by numDL-Frames-r13, of consecutive PRS subframes are transmitted), a "10" may indicate normal PRS mode (e.g. where a number, given by numDL-Frames, of consecutive PRS subframes are transmitted), a "01" may indicate muting of emergency PRS mode (e.g. where a number, given by numDL-Frames-r13, of consecutive subframes are muted), and a "00" may indicate muting of normal PRS mode (e.g. where a number, given by numDL-Frames, of consecutive subframes are muted). If the indoorMode-r13 parameter is included but the scheduling-r13 parameter is absent, all PRS positioning occasions (e.g. defined by the prs-ConfigurationIndex ASN.1 parameter) may use emergency PRS mode (e.g. with the bandwidth defined by the numDL-Frames-r13 ASN.1 parameter and with muting, if present, defined by the prs-MutingInfo-r9 ASN.1 parameter).

In an alternative implementation, the scheduling-r13 parameter could be omitted from FIG. 9 since it may be effective to make all PRS positioning occasions (muted and non-muted) use emergency PRS mode for the duration of positioning a UE. The ASN.1 exemplified in FIG. 9 can be backward compatible with a UE (also known as a legacy UE) that does not support or recognize the underlined parameters in FIG. 9, provided the numDL-Frames-r13 parameter equals or exceeds the numDL-Frames parameter, since in that case, although an eNB could be transmitting emergency PRS positioning occasions as well as or instead of normal PRS position occasions in a particular cell, the emergency PRS positioning occasions will include all PRS subframes used for normal PRS mode (as well as additional PRS subframes possibly used for emergency PRS mode but not normal PRS mode). Thus, a UE that can only recognize information for normal PRS mode will assume that all PRS positioning occasions use normal PRS mode and will be able to measure the subframes for normal PRS mode since they will still be transmitted by an eNodeB as part of positioning occasions for emergency PRS mode. This will also apply for PRS positioning occasions where muting is applied where the number of muted PRS subframes for emergency PRS mode will likewise include muted PRS subframes for normal PRS mode.

PRS scheduling for normal and/or emergency mode may not be supportable by current 3GPP LTE standards across multiple sets of system frames where each set of system frames has a duration of 10.24 seconds. Instead, the current definition of PRS positioning occurrences for LTE (e.g., as defined in 3GPP TS 36.211 and TS 36.355 and as illustrated in FIG. 5) is restricted to a set of 1024 system frames each of duration 10 ms, and hence, extending over a period of 10.24 seconds. This restriction is due to a convention in LTE to number each system frame using a 10 bit System Frame Number (SFN) that has a range of 0 to 1023. After 1024 frames have been sent, SFN numbering for subsequent frames restarts from zero.

The SFN numbering restriction means that any distinctive scheduling and/or muting for emergency PRS mode can extend only over a period of 10.24 seconds and must thereafter repeat the same pattern over each subsequent interval of 10.24 seconds. This may restrict an ability to schedule emergency PRS in different cells at different times over some longer interval such as 20 or 30 seconds, which may be a period available for OTDOA positioning. In order to schedule emergency PRS in a distinct way over periods longer than 10.24 seconds, LTE system frame numbering may be extended, for example, using one or two extra bits in the LTE Master Information Block (MIB) or one or two (or more) bits in other LTE SIBs to extend the existing 10 bit SFN. This extension could allow more flexible scheduling of concentrated PRS positioning bursts at high bandwidth for emergency PRS mode from a small proportion of eNodeBs with other eNodeBs muted. For E911 calls, up to 30 seconds can sometimes be allowed for positioning of the calling UE. Hence, scheduling emergency PRS over two sets or even four sets of SFNs could be useful.

In order to reduce interference at a target UE for PRS positioning occasions transmitted from more distant eNodeBs, eNodeBs near to a target UE can mute downlink (DL) transmissions in one or more of their cell sectors during these positioning occasions. Such muting is referred to herein as "adaptive muting" and may be configured as for emergency PRS by an E-SMLC, MME, or eNB. The muting may occur during normal or emergency mode PRS positioning occasions, in which case, for the cell that is being muted, the eNB would not transmit the PRS signal in the assigned PRS subframes and within the assigned PRS bandwidth and would instead not transmit anything (i.e., would be muted). This type of muting can be supported as described in association with FIG. 9 and needs to be made known to both the eNB that is being muted and the target UE (so that the UE knows when PRS will and will not be transmitted within a particular cell supported by this eNB).

However, muting does not need to occur only during PRS positioning occasions, but can also or instead be scheduled during other DL subframes (e.g., subframes normally used to send data, voice or control information not associated with positioning). This additional muting of normal DL subframes can reduce interference to PRS transmission from other cells and can be scheduled to occur only during a limited period (e.g., 30 seconds), as for scheduling of emergency PRS mode, in order to restrict the effective reduction in operator DL bandwidth to a short period. By muting normal DL transmission from eNodeBs near a target UE in addition to (or instead of) muting some of the PRS positioning occasions of these eNodeBs, it may be possible to increase the number of distant eNodeBs whose PRS positioning occasions will encounter reduced interference and can thus be acquired and accurately measured by a target UE. It is noted that when PRS positioning occasions for all or most eNBs in a network are synchronized to occur at exactly or nearly the same times, then PRS subframes for different cells may occur at the same or nearly the same times and may not occur during other normal DL subframes. In that case, muting of normal DL subframes may not be needed. However, when some eNBs are scheduled (e.g. by an MME or E-SMLC) to use emergency PRS mode in one or more cells using a greater number of PRS subframes in each PRS positioning occasion and/or a different periodicity $T_{PRS}$ or different offset $\Delta_{PRS}$ than is used for normal PRS mode, then some or all PRS subframes in these cells may coincide with the occurrence of normal DL subframes in other cells (e.g. which may remain in normal PRS mode). In this case, muting of some of the normal DL subframes in some of the other cells may be beneficial to reduce interference to the PRS subframes for the cells that use emergency PRS mode.

In an extreme case, one or more eNodeBs nearby to a target UE could each transmit at least one PRS positioning occasion in at least one cell every 10.24 seconds (or every 20.48 or 40.96 seconds with system frame numbering extension) during which all other eNBs near a target UE would be muted in cells that the target UE can receive. Such adaptive muting can be backward compatible with legacy UEs because the adaptive muting of normal DL transmission only needs to be provided to eNodeBs and need not be known by a target UE because the adaptive muting does not affect the PRS positioning occasions that the target UE needs to measure. Adaptive muting may be seen as an extension of existing PRS muting that impacts eNodeBs but not UEs.

Figure 10A:
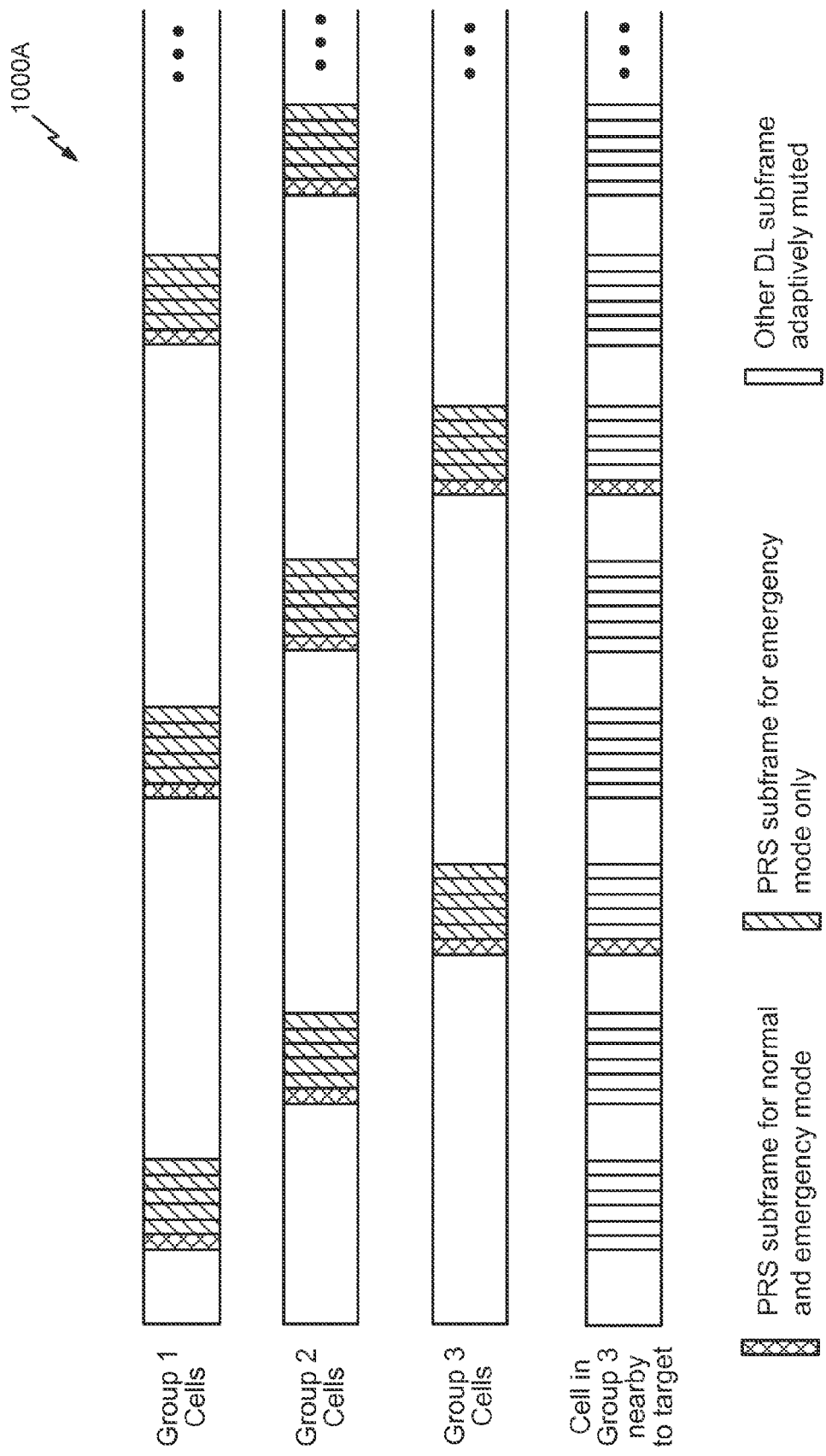
FIG. 10A illustrates exemplary subframe sequences showing adaptive muting among three groups of cells.

FIG. 10A illustrates exemplary frame sequences 1000A showing adaptive muting among three groups of cells. In the example shown in FIG. 10A, all cells may be approximately or exactly synchronized to the same subframe and system frame timing. FIG. 10A then shows PRS positioning occasions used for normal and emergency PRS mode from three groups of cells, where time is represented horizontally with time increasing from left to right and with the start of system frame zero for each group of cells shown on the extreme left and the end of system frame 1023 shown on the extreme right beyond the confines of FIG. 10A. Adaptive muting may be used to increase the frequency of PRS positioning occasions while reducing interference.

Referring to FIG. 10A, PRS positioning occasions for normal PRS mode each comprise one subframe, but for emergency PRS mode each comprise six consecutive subframes. The first subframe in each group of six consecutive PRS subframes (for each of the three groups of cells) for emergency PRS mode comprises the single PRS subframe that would be transmitted during normal PRS mode. The next five PRS subframes are transmitted only when the eNodeB/cell is in the emergency PRS mode, for a total of six PRS subframes in emergency mode. As illustrated in FIG. 10A, the cells in the three groups transmit the six PRS subframes (for each of their emergency PRS positioning occasions) at different non-overlapping times. This means that although the cells in a particular group may interfere with each other with regard to non-PRS transmission, they would not interfere with the cells in the other groups with respect to transmitting PRS occasions at the same time.

Since PRS may be transmitted at higher power and with a more easily acquired sequence of symbols, transmitting PRS from certain cells while other cells transmit non-PRS signals may not encounter significant interference as long as the other cells are not near a target UE. However, in the case of cells near a target UE (e.g. a serving cell), normal transmission (e.g., of data, voice, or control information) may interfere with PRS transmission from more distant cells. Adaptive muting can then be used to mute normal transmissions from these nearby cells during PRS transmission from one or more distant cells.

This is illustrated in FIG. 10A in the example case of a cell in group 3 that is near a target UE. For this cell (as shown by the lowest of the four transmission sequences in FIG. 10A), the cell can mute its downlink transmissions when the other cells are transmitting PRS. The muted cell would (in this example) only transmit PRS in the normal mode, and would mute its downlink transmissions when the other cells are transmitting PRS in the emergency mode. The eNB for the muted cell would need to receive a muting schedule (e.g., defining subframes in which normal DL transmission is to be muted) from the network entity controlling the PRS scheduling, such as the E-SMLC, the MME, or the serving eNodeB (unless the eNB being muted is the serving eNB and the serving eNB controls the muting and emergency PRS scheduling). Note that the muting for the example cell in Group 3 in the example shown in FIG. 10A only needs to occur within the frequency and bandwidth range assigned to PRS transmission from other cells and thus the cell may be able to transmit within muted subframes using other frequencies and bandwidth if not all operator available bandwidth was assigned to PRS transmission.

In some cases, an emergency PRS schedule and a muting schedule could be preconfigured in an eNB for each cell that the eNB supports and an E-SMLC, MME, or eNB may just refer to the preconfigured information (e.g., using a flag or a number) without needing to provide all the parameters defining the emergency PRS schedule and muting schedule. In some cases, preconfiguration could be dependent on the serving cell for a target UE or an approximate location for a target UE such that the schedule and other parameters (e.g. power, bandwidth, frequency) for emergency PRS mode and an adaptive muting sequence may be different (e.g., configured differently) depending on the serving cell or approximate UE location.

Figure 10B:
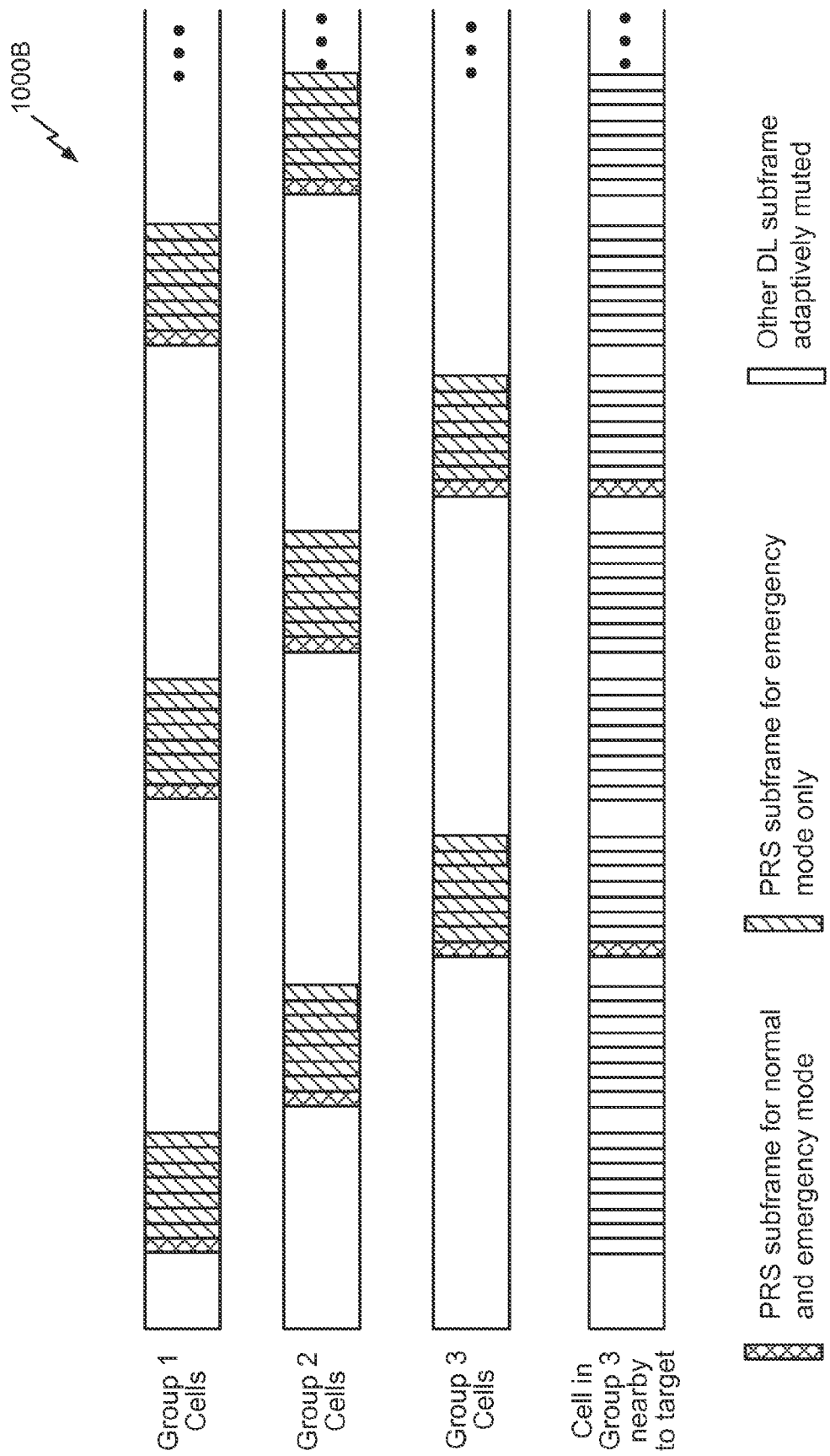
FIG. 10B illustrates exemplary subframe sequences showing expanded adaptive PRS and muting among three groups of cells.

FIG. 10B illustrates exemplary frame sequences 1000B showing expanded adaptive PRS and muting among three groups of cells using the same conventions as in FIG. 10A to show transmission over a sequence of subframes. The example in FIG. 10B is similar to the example in FIG. 10A except that more than six consecutive subframes are used for the emergency PRS positioning occasions. In the example of FIG. 10B, groups of eight consecutive subframes are used for each emergency PRS positioning occasion. As in FIG. 10A, the first subframe in each group of eight PRS subframes is the only PRS subframe that would be transmitted during normal PRS mode. The next seven PRS subframes are only transmitted when the eNodeB/cell is in the emergency PRS mode, for a total of eight consecutive PRS subframes in emergency mode. Again as illustrated in FIG. 10A, the cells in the three groups transmit the eight PRS subframes at non-overlapping times. In the illustrated example, two additional emergency PRS subframes are added for each group compared to the example in FIG. 10A, but it will be appreciated that it can be any number. For the nearby example cell in Group 3, muting now occurs over groups of seven or eight consecutive subframes corresponding with PRS transmission from the three groups of cells and allowing normal PRS transmission in certain single subframes.

Using a PRS occurrence of up to six subframes may not require any changes to the UE. However, for a UE to be able to use a PRS occurrence of more than six subframes, such as the eight subframes illustrated in FIG. 10B, the UE's position fixing module 332 (e.g., FIG. 3C) would need to be configured to detect and process the longer PRS occurrence.

It is noted that while FIGS. 10A and 10B show three different groups of cells using different (non-overlapping) PRS position occasions, the muting of certain cells during normal DL subframes such as that shown for the example cell in Group 3 in FIGS. 10A and 10B, can be just as applicable for a larger or smaller number of cell Groups and/or when one or more groups use PRS positioning occasions that occur at the same times or at overlapping times.

Figure 11:
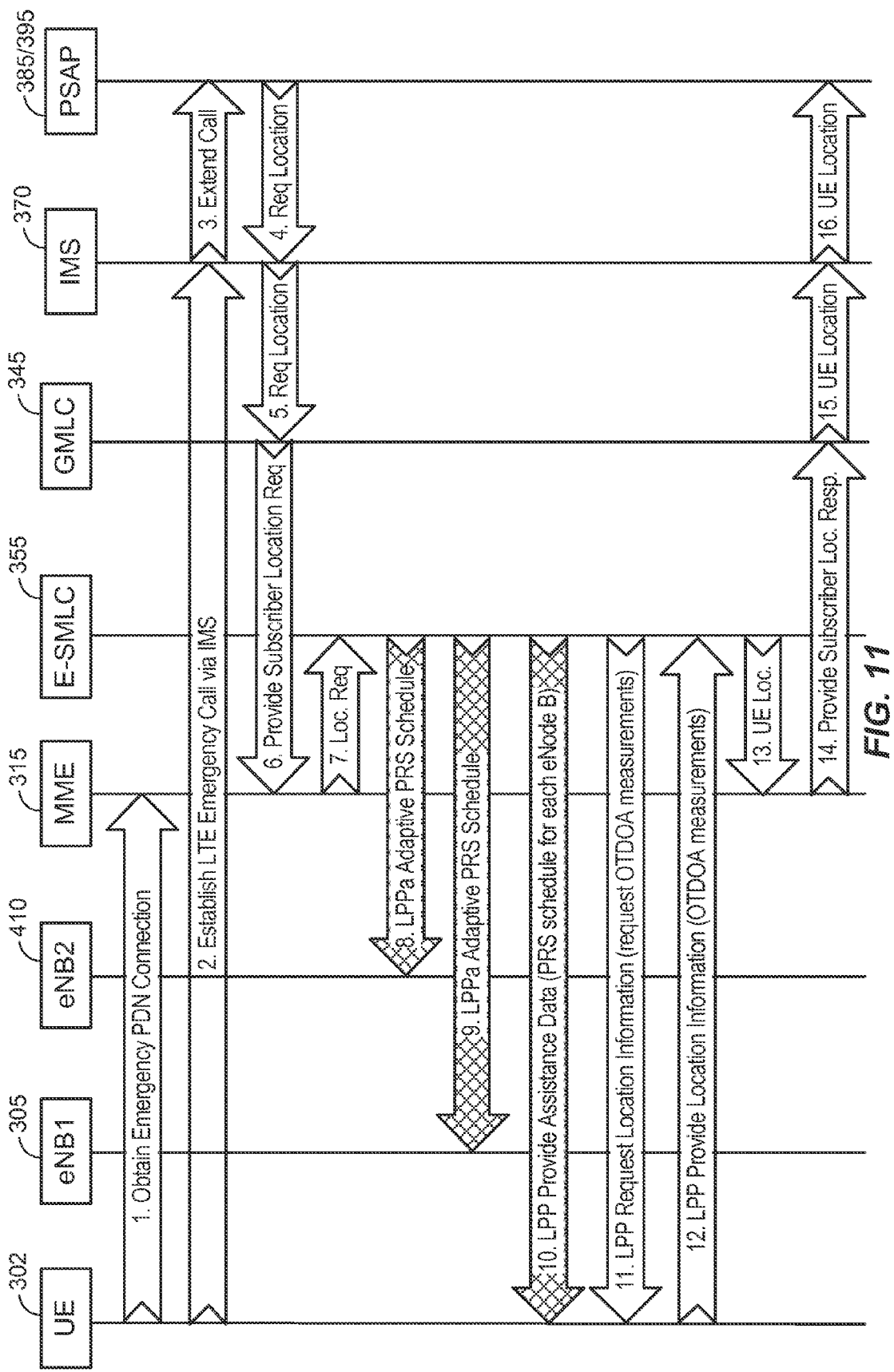
FIG. 11 illustrates an exemplary signaling and message flow for OTDOA with adaptive PRS.

FIG. 11 illustrates an exemplary message flow for OTDOA with adaptive PRS performed in association with the 3GPP control plane location solution for LTE. In FIG. 11, existing messages and sequences of messages that may not need to be modified or added to support adaptive PRS are illustrated as light (unshaded) arrows whereas new and/or modified messages are illustrated as shaded arrows. Each arrow may represent more than one message being exchanged. In this example, MME 315 is the serving MME for UE 302 and eNB1 305 is the serving eNB.

Although not illustrated, the flow begins with a user making an emergency call (e.g., dialing 9-1-1). At step 1 in FIG. 11, the UE 302 obtains an emergency PDN connection to a PDG (e.g. PDG 235 in FIG. 2 or FIG. 3A but not shown in FIG. 11). At this point, the serving eNB 305 and the serving MME 315 are aware that the UE 302 has initiated an emergency call since both are involved in providing an emergency PDN connection and an emergency bearer to UE 302. The MME 315 may also notify the GMLC 345 that the UE 302 has initiated an emergency call (not shown in FIG. 11) so that the GMLC 345 knows to which MME to send the message at step 6. In some implementations, MME 315 may instigate location of UE 302 after step 1 in which case steps 7 to 13 may occur earlier than shown in FIG. 11.

At step 2, the UE 302 sends a SIP INVITE message to the IMS 370 (e.g. the IMS 370 illustrated in FIG. 3A) to start the establishment of an emergency call. At step 3, the call is forwarded by the IMS 370 to the PSAP 385/395 using a SIP INVITE message if the PSAP 385/395 is IP-capable, or as a CS call if the PSAP 385/395 is not IP-capable. The forwarding at step 3 may involve forwarding and/or routing through intermediate entities not shown in FIG. 11 (e.g. a SIP routing proxy in the case of IP forwarding or a Selective Router in the case of CS call forwarding). At the end of steps 2 and 3, the emergency call has been established between the UE 302 and the PSAP 385/395.

At step 4, after the emergency call is established between the UE 302 and the PSAP 385/395, the PSAP 385/395 can request the location of the UE 302 from the IMS 370 (e.g., from an LRF 375 in the IMS 370 whose address or identification may have been included with call related information transferred to PSAP 385/395 from IMS 370 as part of step 3). The IMS 370 (e.g., an LRF 375 in IMS 370) forwards the request to the GMLC 345 at step 5. At step 6, the GMLC 345 sends a Provide Subscriber Location request to the MME 315 and includes an identification for UE 302 (e.g. an IMSI or IMEI). In response, the MME 315 sends a location request for UE 302 to the E-SMLC 355 at step 7.

At this time, the E-SMLC 355 begins positioning the UE 302. At step 8 and step 9, the E-SMLC 355 sends the emergency mode PRS scheduling for one or more cells nearby to UE 302 (e.g., duration, bandwidth, power, frequencies, in which subframe(s) to transmit and/or mute PRS, other downlink time slots to mute, PRS frequency shift, etc.) to involved eNodeBs 305 and 410 using LPPa messaging, instructing them to switch to (or when to switch to) the emergency PRS mode. "Involved" eNodeBs may include the serving eNodeB 305, nearby eNodeBs, and perhaps more distant eNodeBs. Although FIG. 11 only illustrates two eNodeBs, it is apparent that there may be any number of involved eNodeBs. Moreover, the involved eNodeBs may include the serving eNodeB 305 as in FIG. 11 or may omit the serving eNB 305 (not shown in FIG. 11). The involved eNodeBs may further include standalone eNodeB beacons such as eNodeB beacon 400 described in association with FIG. 4A.

In response, the involved eNodeBs 305 and 410 will begin transmitting PRS and/or muting downlink transmissions according to the received adaptive PRS schedules. This may occur immediately the messages in steps 8 and 9 are received or sometime after the messages are received—e.g. may begin only after a new sequence of 1024 subframes starting at SFN zero begin to be transmitted or following some delay period included in or referred to by the messages sent at steps 8 and 9. The messages sent to the eNBs at steps 8 and 9 may be according to the LPPa positioning protocol (e.g., may be new or modified LPPa messages).

The emergency PRS mode scheduling information sent to each eNB at steps 8 and 9 may be detailed and define all parameters related to PRS transmission, PRS muting, normal DL transmission muting, start and stop time, use of transmit diversity, use of a different PRS frequency shift, etc. The information conveyed at steps 8 and 9 may also indicate the cell or cells for which the emergency PRS mode scheduling information applies at an eNodeB (e.g. in the case that an eNodeB supports more than one cell) and may provide different emergency PRS mode scheduling information for each cell supported by an eNB. Alternatively, the emergency PRS mode scheduling information may be a reference to information that is already configured in eNBs 305/410 defining particular types of PRS emergency transmission, muting, and start and stop times. The reference may make use of a flag or a number to refer to a specific set of preconfigured parameters and possibly an indication of a particular cell. Alternatively or in addition, provided information may include characteristics of the target UE, such as the current serving cell identification and/or approximate UE location. A recipient eNB may then map the information (e.g., a serving cell ID or approximate UE location) to a particular configured set of emergency PRS and adaptive muting parameters.

The emergency mode PRS signals transmitted by a first eNodeB such as eNodeB 305 for a particular cell, as a consequence of receiving the information at step 8 or step 9 may be at least partly orthogonal to the PRS signals transmitted by a second eNodeB, such as eNodeB 410, for a second cell in the time domain, the frequency domain, and/or the code domain. As a consequence, the PRS signals transmitted by the first eNodeB for the first cell and the PRS signals transmitted by the second eNodeB for the second cell may be transmitted at different times, using different PRS frequency shifts, or using different PRS code sequences. The orthogonality may also apply to PRS transmission from the same eNodeB for two different cells supported by the eNodeB.

Transmitting PRS signals in one cell that are partly or completely orthogonal to PRS signals transmitted in another cell may reduce or eliminate interference between the PRS signals and assist in PRS signal acquisition and accurate measurement by the target UE (e.g. UE 302 in the example of FIG. 11). For example, PRS signals that are orthogonal in the frequency domain may not interfere with one another even when transmitted at the same time, although they may prevent a UE from measuring both PRS signals at the same time. PRS signals that are orthogonal in the time domain may be transmitted at different times and will then be non-interfering and may both be measured by a target UE. PRS signals that use different code sequences of symbols may be transmitted at the same time and using the same frequencies but may encounter reduced interference if the UE acquires and measures only one of the code sequences.

An operator may preconfigure emergency PRS parameters (e.g., PRS bandwidth, PRS power, PRS frequency shifts, PRS code sequence, PRS subframes, muted subframes, etc.) in a controlling entity such as an E-SMLC or in recipient eNBs such that emergency PRS transmission in different cells from different eNBs (e.g., between a nearby eNB and a more distant eNB) or from the same eNB is partly or completely orthogonal relative to the frequency domain, time domain, and/or code domain.

Returning to FIG. 11, at step 10, the E-SMLC 355 sends assistance data to the UE 302 in the form of an LPP and/or LPPe Provide Assistance Data message. The assistance data includes, in addition to the typical assistance data for OTDOA (e.g. such as the identities of a reference cell and neighbor cells for which OTDOA measurements are needed), at least part of the PRS schedule of each cell the UE 302 will need to measure (e.g. the cells of eNodeBs 305 and 410 in the example of FIG. 11). The PRS schedule provided to UE 302 may include the scheduling and/or muting sequence for emergency PRS mode from each cell UE 302 may need to attempt to measure (e.g., may include the parameters discussed in association with FIG. 9 and/or may include other parameters such as PRS frequency shifts and/or PRS transmit diversity). Additional information may also be sent to UE 302 at step 10 such as eNB location coordinates and eNB transmission timing relative to other eNBs. Some or all of the information transferred at step 10 may be conveyed in some implementations using an LPPe message embedded in an LPP message. In some implementations, the LPP and/or LPPe Provide Assistance Data message sent at step 10 may provide assistance data for other position methods in addition to OTDOA—e.g. may provide assistance data to UE 302 for A-GNSS, ECID and/or WLAN positioning.

At step 11, the E-SMLC 355 sends the UE 302 an LPP and/or LPPe Request Location Information message, which instructs the UE 302 to begin making OTDOA measurements making use of the assistance data received at step 10. The LPP and/or LPPe Request Location Information message sent at step 11 may provide additional information to UE 302 (e.g., concerning PRS emergency mode transmission from nearby cells) and may include an embedded LPPe massage when both LPP and LPPe are used. In some implementations, the LPP and/or LPPe Request Location Information message sent at step 11 may request UE 302 to make other measurements in addition to OTDOA measurements—e.g. may request UE 302 to make A-GNSS measurements, ECID measurements and/or WLAN measurements. Following step 11 (and not shown in FIG. 11), UE 302 performs some or all of the measurements requested at step 11 and may compute a location estimate—e.g. if requested at step 11. At step 12, the UE 302 sends an LPP and/or LPPe Provide Location Information message to the E-SMLC 355. The LPP and/or LPPe Provide Location Information message may include a location estimate of the UE (if the UE 302 was able to compute this based on information received at step 10 and/or step 11 and based on OTDOA and any other measurements made by the UE 302). The LPP and/or LPPe Provide Location Information message may also or instead include the OTDOA measurements (and any other measurements) made by UE 302 as instructed by the message transferred at step 11. The E-SMLC 355 can use the received measurements to compute the location of the UE 302.

At step 13, the E-SMLC 355 sends the UE 302's location to the MME 315. At step 14, the MME 315 sends the UE 302's location to the GMLC 345, which forwards the location to the IMS 370 at step 15. The IMS 370 (e.g. an LRF 375 in IMS 370) then forwards the location to the PSAP 385/395 at step 16.

If a user plane SUPL solution was being used to obtain the location of the UE 302 instead of a control plane solution as shown in and described above for FIG. 11, then steps 1 to 4 described previously for FIG. 11 may continue to be valid. However, at step 5, instead of the IMS 370 sending the location request to the GMLC 345, the IMS 370 would send the location request to an E-SLP, such as the E-SLP 335 shown and described with reference to FIG. 3A, and steps 6, 7, 13, 14 and 15 would not occur. Instead of steps 6 and 7, the E-SLP could notify the E-SMLC 355 of the location request received from the IMS 370 (e.g., notify a physically separate E-SMLC 355 or notify a function within the E-SLP able to perform some of the functions of a physically separate E-SMLC 355). The E-SMLC 355 would then send the messages shown in steps 8 and 9 to eNBs nearby to UE 302.

The E-SLP would then initiate a SUPL session with the UE 302 (e.g., by sending a SUPL INIT message to the UE 302 using UDP and IP via the PDN Gateway 235 and Serving Gateway 230 in the case of FIG. 3A). As part of this SUPL session, steps 10, 11 and 12 in FIG. 11 would now occur between the UE 302 and the E-SLP (i.e. with the E-SLP replacing the E-SMLC 355 shown in FIG. 11 for these 3 steps) wherein the LPP and/or LPPe messages transferred at steps 10, 11 and 12 in FIG. 11 would be transported inside SUPL ULP messages (e.g., inside a SUPL POS message). The E-SLP would then receive the location of UE 302 at step 12 or OTDOA (and possibly other) measurements enabling the SLP to compute a location for UE 302 at step 12, and would send the location to the IMS 370. The IMS 370 would then forward the location to the PSAP 385/395 as at step 16 in FIG. 11.

In another aspect, one or more eNodeBs, such as eNodeB 305 and/or 410, can autonomously initiate the emergency PRS mode upon receiving or intercepting a request to support an emergency call associated with UE 302 (e.g., such as a request to obtain an emergency PDN connection at step 1 of FIG. 11, a request for an emergency attach at step 1 or a request to establish an emergency related bearer which may form part of step 1 in FIG. 11). The eNodeB(s) may have been preconfigured with an emergency PRS schedule that it (or they) can switch to in response to receiving (or intercepting) the request to support the emergency call. Each eNodeB in a given area may have been preconfigured with the same or complimentary emergency PRS mode schedules, thereby permitting the coordination of PRS scheduling described herein (e.g., with reference to FIGS. 7A-B, 8 and 10A-B). The eNodeBs may still receive additional emergency PRS scheduling information from the E-SMLC 355 at steps 8 and 9 in FIG. 11. In the case that only a single eNodeB receives or intercepts the request to support the emergency call (e.g. the serving eNB 305), the eNodeB can advise other nearby eNBs of the emergency call using the 3GPP X2 interface and can in addition indicate the serving cell for the UE 302 to the other eNBs if the eNB is the serving eNB 305. An indication of a serving cell may be used by eNBs to select among different emergency PRS schedules and other different configuration information as described previously.

The one or more eNodeBs may also provide assistance data to UE 302 similarly to step 10 of FIG. 11 (e.g. instead of step 10 or in addition to step 10). In that case, each eNodeB may provide its own emergency PRS schedule as the assistance data. Each eNodeB may provide the assistance data point-to-point to UE 302 or may provide assistance data containing its normal PRS schedule and/or emergency PRS schedule via broadcast (e.g., using eMBMS or LTE SIBs) and not need to interact point-to-point with UE 302. Where multiple eNodeBs are preconfigured with the same or complimentary emergency PRS schedules, only one eNodeB may need to transmit a PRS schedule to the UE 302. For example, only one eNodeB may provide the emergency PRS schedule for itself and for other eNodeBs and may send messages to these other eNodeBs (e.g., using the LTE X2 interface) containing an emergency PRS schedule to enable these other eNodeBs to switch to emergency PRS.

Regarding inter-radio access technology (inter-RAT) OTDOA, a UE accessing a network with a radio technology different than LTE (e.g., a UE accessing a network or AP supporting cdma2000, GSM, WCDMA, or WiFi) could be positioned by a location server within or associated with this network (e.g., a location server that is an SMLC, SAS, PDE, SLP, or of some other type). The location server may still make use of OTDOA to locate the UE if there is an LTE network providing LTE radio coverage at the location of the UE (e.g., an LTE network belonging to the operator for the network that the UE is currently accessing). The location server may then redirect the UE to make OTDOA measurements (e.g., RSTD measurements of PRS signals transmitted by eNBs in the LTE network). The redirection may be accomplished if the location server sends assistance data and/or a measurement request to the UE indicating cells in the LTE network that the UE should measure (e.g., to obtain OTDOA measurements) and providing information (e.g., concerning LTE radio frequency, PRS positioning occasions, expected PRS timing) to the UE to enable the UE to acquire and measure PRS signals transmitted within these cells. The information sent by the location server to the UE to enable the redirection may be similar to or the same as the information sent at steps 10 and 11 in FIG. 11.

The information may be sent within a positioning protocol (e.g., RRLP, RRC, IS-801, LPP/LPPe) that is used between the location server and the UE and is particular to the network the UE is currently accessing. The UE may then tune to the frequency or frequencies used by the LTE network and make OTDOA measurements (e.g., RSTD measurements) for cells in the LTE network and may then return the OTDOA measurements or a computed location based on these measurements to the location server using the positioning protocol (e.g., RRLP, RRC, IS-801 or LPP/LPPe) used between the location server and the UE.

To reduce changes to this positioning protocol and UE and location server impacts to support these changes, the information sent by the location server to the UE and the information returned by the UE to the location server may be conveyed by embedding LPP or LPP/LPPe messages (e.g., LPP and/or LPP/LPPe messages similar to or the same as those described for steps 10-12 in FIG. 11) inside messages for this positioning protocol in the case that the positioning protocol is not LPP or LPP/LPPe. This may avoid the need to define a set of new parameters and/or new messages for the positioning protocol. The embedding may be accomplished by embedding an octet string containing an LPP or LPP/LPPe message (e.g., embed an LPP Provide Assistance Data to send PRS information to a UE for nearby eNBs as at step 10 in FIG. 11). Alternatively, new parameters (e.g. new ASN.1 parameters) can be added to the positioning protocol that are either imported from LPP and/or LPPe or based on LPP and/or LPPe to enable reuse of LPP and/or LPPe parameters.

Furthermore, in order to switch certain cells in the LTE network from normal PRS mode to emergency PRS mode and/or in order to schedule emergency PRS mode and adaptive PRS muting for these cells, the location server may send messages to eNBs in the LTE network to provide instructions regarding switchover to emergency PRS mode and information for emergency PRS scheduling and/or adaptive PRS muting. The messages may be sent as LPPa messages and may be sent by an E-SMLC (e.g., as in steps 8 and 9 in FIG. 11) if the location server contains E-SMLC capability or can instruct a separate E-SMLC to send these messages.

Figure 12A:
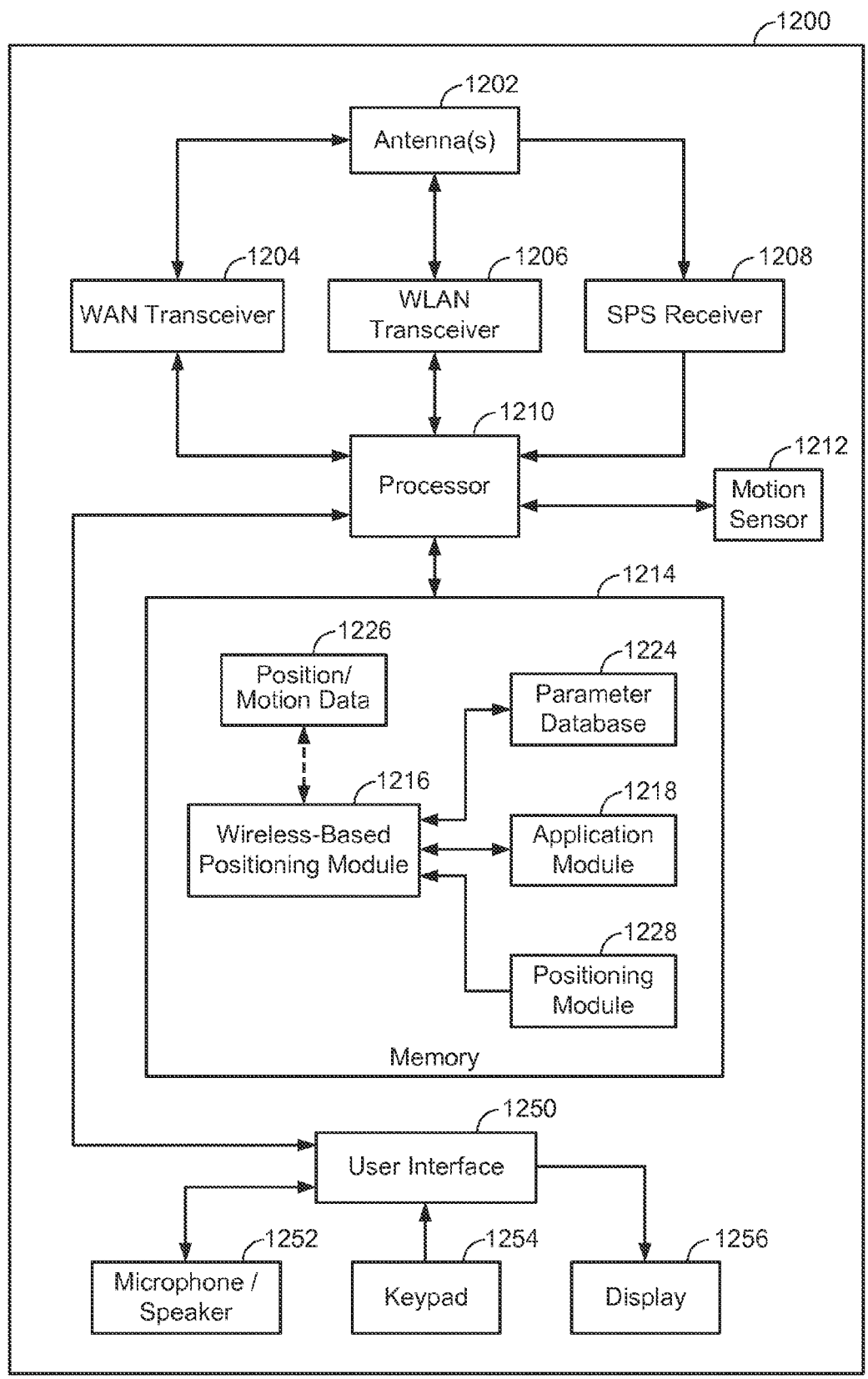
FIG. 12A illustrates an exemplary mobile device that may be used in an operating environment that can determine position using wireless techniques, according to one aspect of the disclosure.

FIG. 12A is a block diagram illustrating various components of an exemplary mobile device 1200. The various features and functions illustrated in the box diagram of FIG. 12A are connected together via a processor 1210 which forms a focal point of the architecture. Those skilled in the art will recognize that other connections, mechanisms, features, functions, or the like, may be provided and adapted as necessary to operatively couple and configure an actual portable wireless device. As an example, many or all of the separate elements shown in FIG. 12A could be interconnected via a common bus. Further, it is also recognized that one or more of the features or functions illustrated in the example of FIG. 12A may be further subdivided or two or more of the features or functions illustrated in FIG. 12A may be combined. For example, mobile device 1200 may contain a modem that may be separate hardware chipset in mobile device 1200 and may comprise a subset of the elements shown in FIG. 12 such as the WAN transceiver 1204, the WLAN transceiver 1206 and/or the SPS receiver 1208. Mobile device 1200 may be an example of UEs 1-N in FIG. 1, of UEs 250-254 in FIG. 2, and of UE 302 in FIGS. 3A, 3B, 3C, 3E, 4A, 4B and 11.

The mobile device 1200 may include one or more wide area network (WAN) transceiver(s) 1204 that may be connected to one or more antennas 1202. The WAN transceiver 1204 comprises suitable devices, hardware, and/or software for communicating with and/or detecting signals to/from WAN access points and base stations, such as eNodeBs 200-210 in FIG. 2, eNodeB 305 in FIGS. 3A, 3B, 4A, 4B and 11 and eNodeB 410 in FIGS. 4A and 11, and/or directly with other wireless devices within a network. In one aspect, the WAN transceiver 1204 may be suitable for communicating with an LTE system, LTE-U system, WCDMA system, CDMA2000 system, TDMA, GSM or any other type of wide area wireless networking technologies. The mobile device 1200 may also include one or more wireless local area network (WLAN) transceivers 1206 that may be connected to one or more antennas 1202. The WLAN transceiver 1206 comprises suitable devices, hardware, and/or software for communicating with and/or detecting signals to/from WLAN APs, and/or directly with other wireless devices within a network. In one aspect, the WLAN transceiver 1206 may comprise a Wi-Fi (802.11x) communication system suitable for communicating with one or more wireless access points; however in other aspects, the WLAN transceiver 1206 may comprise another type of WLAN communication system (e.g., Bluetooth). Additionally, any other type of wireless networking technologies may be used, for example, Ultra Wide Band, ZigBee, wireless USB, etc.

An SPS receiver 1208 may also be included in the mobile device 1200 to support positioning using GNSS or A-GNSS. The SPS receiver 1208 may be connected to the one or more antennas 1202 for receiving satellite signals. Note that antennas 1202 may provide different and/or common antennas to each of WAN transceiver 1204, WLAN transceiver 1206 and SPS receiver 1208. The SPS receiver 1208 may comprise any suitable hardware and/or software for receiving and processing SPS signals received from one or more GNSS systems. The SPS receiver 1208 may request information and operations as appropriate from the other systems, and may perform the calculations necessary to determine the mobile device's 1200 position using measurements obtained by any suitable SPS algorithm. Alternatively, the SPS receiver may just acquire and measure GNSS signals and provide the signal measurements to another element or function in mobile device 1200 such as processor 1210 which may compute a location for mobile device 1200 based on or partly on the GNSS measurements.

A motion sensor 1212 may be coupled to a processor 1210 to provide movement and/or orientation information which is independent of motion data derived from signals received by the WAN transceiver 1204, the WLAN transceiver 1206 and the SPS receiver 1208.

The processor 1210 may be connected to the WAN transceiver 1204, the WLAN transceiver 1206, the SPS receiver 1208 and the motion sensor 1212. The processor 1210 may include one or more microprocessors, microcontrollers, and/or digital signal processors that provide processing functions, as well as other calculation and control functionality. The processor 1210 may be connected to or contain memory 1214 for storing data and software instructions for executing programmed functionality within the mobile device 1200. The memory 1214 may be on-board the processor 1210 (e.g., within the same integrated circuit package), and/or the memory may be external memory to the processor and functionally coupled over a data bus.

A number of software modules and data tables may reside in memory 1214 and be utilized by the processor 1210 in order to manage both communications and positioning determination functionality. As illustrated in FIG. 12A, memory 1214 may include and/or otherwise receive a wireless-based positioning module 1216, an application module 1218, a positioning module 1228 and a parameter database 1224. One should appreciate that the organization of the memory contents as shown in FIG. 12A is merely exemplary, and that the functionality of the modules and/or data structures may be combined, separated, and/or be structured in different ways depending upon the implementation of the mobile device 1200.

The application module 1218 may be a process running on the processor 1210 of the mobile device 1200, which requests position information from the wireless-based positioning module 1216 (e.g. in order to provide location related services to a user of mobile device 1200). Applications typically run within an upper layer of the software architectures. The wireless-based positioning module 1216 may correspond to or may contain position fixing module 332 as described in FIG. 3E. Wireless-based positioning module 1216 may also store and/or access information that may comprise position/motion data 1226, signal measurements received (e.g. via processor 1210) from WAN transceiver 1204, WLAN transceiver 1206 and/or SPS receiver 1208 and parameter data stored in parameter database 1224 and may derive the position of the mobile device 1200 using this information. For example, the information may include OTDOA RSTD measurements obtained by WAN transceiver 1204 for signals received from a plurality of base stations and APs, such as eNodeBs 200-210, 305, and 410. The received signals may include transmission of a PRS according to a normal PRS mode or an emergency PRS mode as disclosed herein. The parameter database 1224 may contain information related to normal PRS mode and/or emergency PRS mode such as the information described in association with FIGS. 3D and 9 and the information described in association with FIG. 11 for steps 10 and 11. This information may be received from a location server—e.g. as described in FIG. 11 for steps 10 and 11.

While the modules 1216-1228 shown in FIG. 12A are illustrated in the example as being contained in the memory 1214, it is recognized that in certain implementations such elements may be provided for or otherwise operatively supported using other or additional mechanisms. For example, all or part of the wireless-based positioning module 1216 and/or the application module 1218 may be provided in firmware. Additionally, while in this example the wireless-based positioning module 1216 and the application module 1218 are illustrated as being separate elements, it is recognized, for example, that such elements may be combined together as one element or combined with other elements, or otherwise further divided into a plurality of smaller elements.

The processor 1210 may include any form of logic suitable for performing at least the techniques provided herein. For example, the processor 1210 may be operatively configurable based on instructions in the memory 1214 to receive data from one or more entities (e.g. an E-SMLC, SLP and/or eNodeB) related to emergency PRS mode transmission from one or more eNodeBs and to perform, or to instruct other elements in mobile device 1200 to perform, OTDOA RSTD measurements of PRS transmission from the one or more eNodeBs and in some cases compute a location estimate for mobile device 1200 from these measurements, as described elsewhere herein (e.g. in association for FIG. 11 and FIG. 16).

For example, in an embodiment, where the mobile device 1200 is configured to use an emergency PRS mode of at least one cell of at least one base station, the processor 1210 in conjunction with the memory 1214, WAN transceiver 1204, and/or SPS receiver 1208 may be configured to initiate an emergency call, to receive positioning assistance data from a server, the positioning assistance data including an emergency PRS mode schedule for the at least one cell of at least one base station, the emergency PRS mode schedule comprising one or more parameters indicating additional PRS positioning occasions for a cell, additional bandwidth, a higher frequency of PRS positioning occasions, different PRS coding compared to a non-emergency PRS mode schedule, a start time, stop time and/or duration, to perform terrestrial radio location positioning measurements based on the received positioning assistance data, and to provide the terrestrial radio location positioning measurements or a location computed from the terrestrial radio location positioning measurements to the server.

The mobile device 1200 may include a user interface 1250 which provides any suitable interface systems, such as a microphone/speaker 1252, keypad 1254, and display 1256 that allows user interaction with the mobile device 1200. The microphone/speaker 1252 provides for voice communication services using the WAN transceiver 1204 and/or the WLAN transceiver 1206. The keypad 1254 comprises any suitable buttons for user input. The display 1256 comprises any suitable display, such as, for example, a backlit LCD display, and may further include a touch screen display for additional user input modes.

Figure 12B:
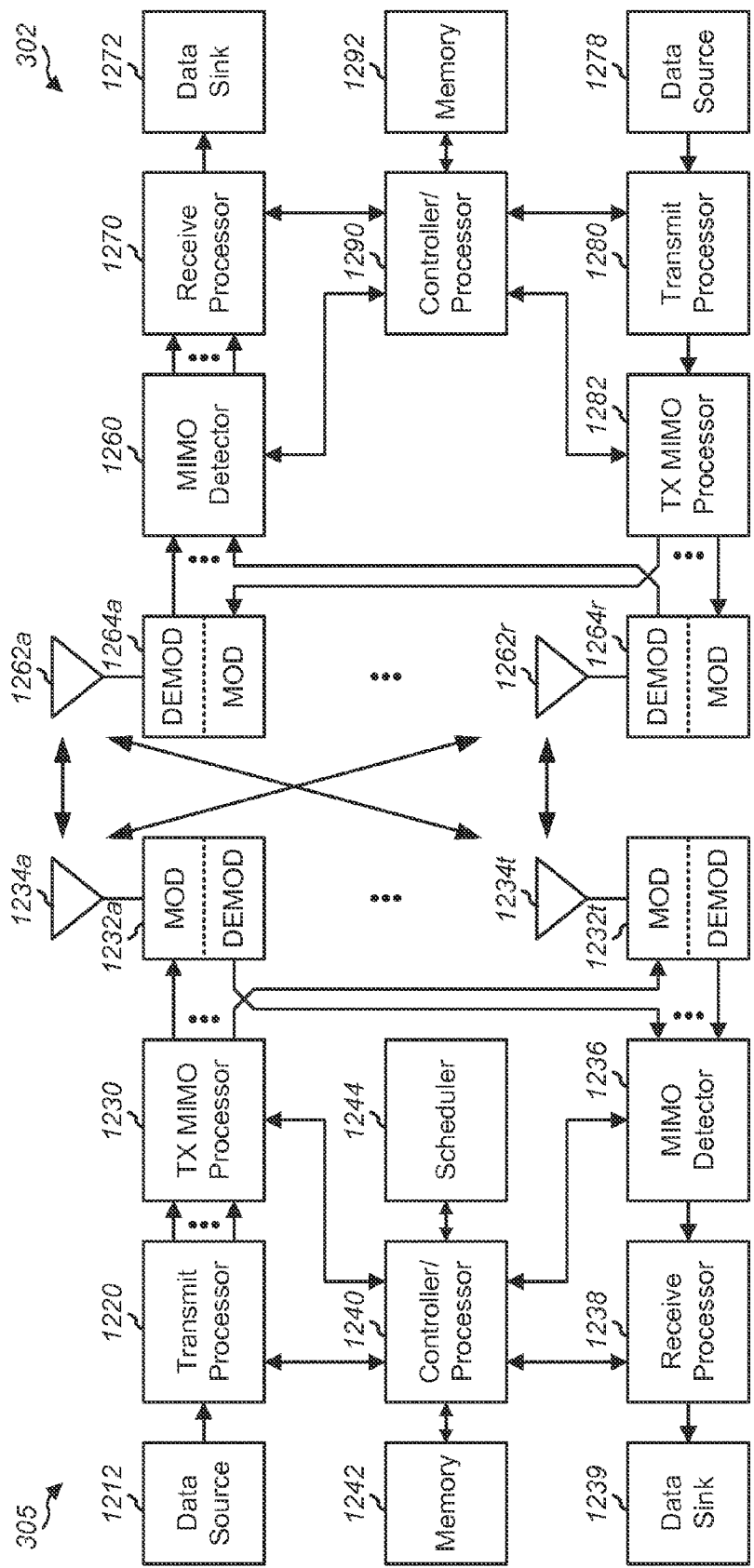
FIG. 12B illustrates an exemplary block diagram of a design of an eNodeB and a user equipment (UE) according to one aspect of the disclosure.

FIG. 12B illustrates a block diagram of an exemplary design of an eNodeB 305 and UE 302, which may be one of the eNBs 305 and 410 and one of the UEs (e.g. UE 302) discussed herein in relation to the various embodiments. In this design, eNodeB 305 is equipped with T antennas 1234a through 1234t, and UE 302 is equipped with R antennas 1262a through 1262r, where T and R are generally greater than or equal to 1.

At eNodeB 305, a transmit processor 1220 may receive data representing a PRS schedule from a data source 1212 (e.g., which may contain pre-configured data or data received directly or indirectly from a location server such as E-SMLC 355 or E-SLP 335). Transmit processor 1220 may process the data for each service to obtain data symbols. Transmit processor 1220 may also receive scheduling information, configuration information, control information, system information and/or other overhead information from a controller/processor 1240 and/or a scheduler 1244. Transmit processor 1220 may process the received overhead information and provide overhead symbols. A transmit (TX) multiple-input multiple-output (MIMO) processor 1230 may multiplex the data and overhead symbols with pilot symbols, process (e.g., precode) the multiplexed symbols, and provide T output symbol streams to T modulators (MOD) 1232a through 1232t. Each modulator 1232 may process a respective output symbol stream (e.g., for OFDM used with LTE) to obtain an output sample stream. Each modulator 1232 may further process (e.g., convert to analog, amplify, filter, and upconvert) the output sample stream to obtain a downlink signal, such as a PRS signal to support OTDOA positioning. T downlink signals from modulators 1232a through 1232t may be transmitted via T antennas 1234a through 1234t, respectively. Transmission via T antennas 1234a through 1234t may employ transmit diversity whereby each PRS subframe (or part of each PRS subframe) is transmitted from only one antenna or a subset of antennas and not from all antennas. For example, the transmit diversity may alternate transmission of consecutive whole PRS subframes from each of two different antennas.

At UE 302, antennas 1262a through 1262r may receive the downlink signals from eNodeB 305 and provide received signals to demodulators (DEMOD) 1264a through 1264r, respectively. Each demodulator 1264 may condition (e.g., filter, amplify, downconvert, and digitize) a respective received signal to obtain received samples and may further process the received samples (e.g., for OFDM) to obtain received symbols. A MIMO detector 1260 may receive and process the received symbols from all R demodulators 1264a through 1264r and provide detected symbols. A receive processor 1270 may process the detected symbols, provide decoded data for UE 302 and/or desired services to a data sink 1272, and provide decoded overhead information to a controller/processor 1290. In general, the processing by MIMO detector 1260 and receive processor 1270 is complementary to the processing by TX MIMO processor 1230 and transmit processor 1220 at eNodeB 305.

On the uplink, at UE 302, data from a data source 1278 and overhead information from a controller/processor 1290 may be processed by a transmit processor 1280, further processed by a TX MIMO processor 1282 (if applicable), conditioned by modulators 1264a through 1264r, and transmitted via antennas 1262a through 1262r. At eNodeB 305, the uplink signals from UE 302 may be received by antennas 1234, conditioned by demodulators 1232, detected by a MIMO detector 1236, and processed by a receive processor 1238 to obtain the data and overhead information transmitted by UE 302.

Controllers/processors 1240 and 1290 may direct the operation at eNodeB 305 and UE 302, respectively. Scheduler 1244 may schedule UEs for downlink and/or uplink transmission, schedule transmission of PRS signals, and provide assignments of radio resources for the scheduled UEs and services. Controller/processor 1240 and/or scheduler 1244 may generate scheduling information (e.g. scheduling information for normal and/or emergency PRS mode) and/or other overhead information for the PRS signals.

Controller/processors 1240 and 1290 may implement processes for the techniques described herein. Memories 1242 and 1292 may store data and program codes for eNodeB 305 and UE 302, respectively. Accordingly, adaptive PRS scheduling can be accomplished in accordance with the various embodiments disclosed herein, while still remaining compliant with the existing standards.

For example, in an embodiment, the controller/processor 1240 in conjunction with the memory 1242, receive processor 1238, transmit processor 1220, and/or one or more antennas 1234 may be configured to establish a PRS schedule, to switch to an emergency PRS mode, and to transmit PRS signals in accordance with the PRS schedule.

Further, in an embodiment, the controller/processor 1290 in conjunction with the memory 1292, receive processor 1270, transmit processor 1280, and/or one or more antennas 1262 may be configured to initiate an emergency call, to receive positioning assistance data from a server, the positioning assistance data including an emergency PRS mode schedule for at least one cell of at least one base station, the emergency PRS mode schedule comprising one or more parameters indicating additional PRS positioning occasions for a cell, additional bandwidth, a higher frequency of PRS positioning occasions, different PRS coding compared to a non-emergency PRS mode schedule, a start time, stop time and/or duration, to perform terrestrial radio location positioning measurements based on the received positioning assistance data, and to provide the terrestrial radio location positioning measurements or a location computed from the terrestrial radio location positioning measurements to the server.

Figure 13:
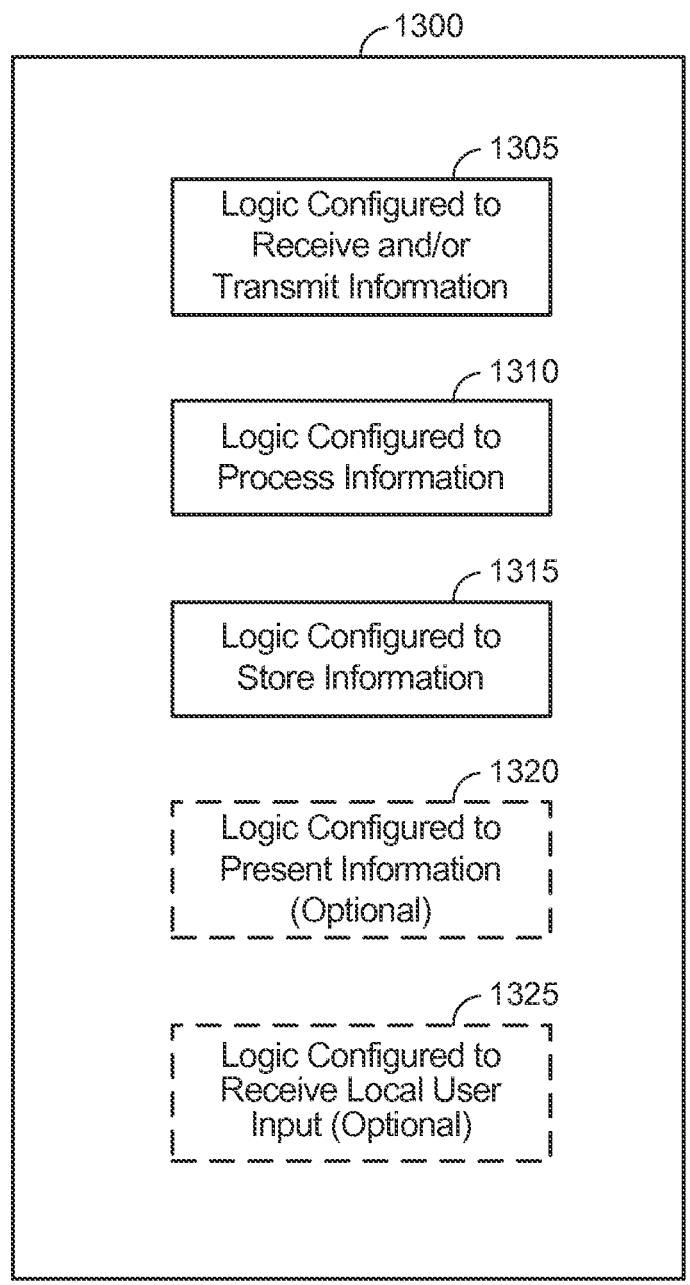
FIG. 13 illustrates a communication device that includes logic configured to perform functionality in accordance with an aspect of the disclosure.

FIG. 13 illustrates a communication device 1300 that includes logic configured to perform functionality. The communication device 1300 can correspond to any of the above-noted communication devices, including but not limited to UEs 302 or 1200, any component of the RAN 120 (e.g., eNodeBs 200 through 210, eNodeB 305, eNodeB 410 etc.), any component of the core network 140 (e.g., MME 215 or 220, HSS 225, SGW 230, PDG 235), any components of the IMS 370, any components coupled with the core network 140 and/or the Internet 175 (e.g., the location server 170), and so on. Thus, communication device 1300 can correspond to any electronic device that is configured to communicate with (or facilitate communication with) one or more other entities over the wireless communications system 100 of FIG. 1 and the systems/architectures illustrated in FIGS. 2-4.

Referring to FIG. 13, the communication device 1300 includes logic configured to receive and/or transmit information 1305. In an example, if the communication device 1300 corresponds to a wireless communications device (e.g., mobile device 1200, UE 302, one of eNodeBs 200 through 210, any of eNBs 305 and 410 etc.), the logic configured to receive and/or transmit information 1305 can include a wireless communications interface (e.g., Bluetooth, WiFi, 2G, CDMA2000, WCDMA, 3G, 4G, LTE, etc.) such as a wireless transceiver and associated hardware (e.g., an RF antenna, a MODEM, a modulator and/or demodulator, etc.). In another example, the logic configured to receive and/or transmit information 1305 can correspond to a wired communications interface (e.g., a serial connection, a USB or Firewire connection, an Ethernet connection, packet cable connection, DSL connection, SONET connection through which the Internet 175 and/or other network entities can be accessed, etc.). Thus, if the communication device 1300 corresponds to some type of network-based server or other network element (e.g., eNodeB, SGW, PDG, MME, HSS, E-SMLC, E-SLP, the location server 170, etc.), the logic configured to receive and/or transmit information 1305 can correspond to an Ethernet card, in an example, that connects the network-based server to other communication entities via an Ethernet protocol. In a further example, the logic configured to receive and/or transmit information 1305 can include sensory or measurement hardware by which the communication device 1300 can monitor its local environment (e.g., an accelerometer, a temperature sensor, a light sensor, an antenna for monitoring local RF signals, etc.). The logic configured to receive and/or transmit information 1305 can also include software that, when executed, permits the associated hardware of the logic configured to receive and/or transmit information 1305 to perform its reception and/or transmission function(s). However, the logic configured to receive and/or transmit information 1305 does not correspond to software alone, and the logic configured to receive and/or transmit information 1305 relies at least in part upon hardware to achieve its functionality.

Referring to FIG. 13, the communication device 1300 further includes logic configured to process information 1310. In an example, the logic configured to process information 1310 can include at least a processor. Example implementations of the type of processing that can be performed by the logic configured to process information 1310 includes but is not limited to performing determinations, establishing connections, making selections between different information options, performing evaluations related to data, interacting with sensors coupled to the communication device 1300 to perform measurement operations, converting information from one format to another. For example, the processor included in the logic configured to process information 1310 can correspond to a general purpose processor, a digital signal processor (DSP), an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The logic configured to process information 1310 can also include software that, when executed, permits the associated hardware of the logic configured to process information 1310 to perform its processing function(s). However, the logic configured to process information 1310 does not correspond to software alone, and the logic configured to process information 1310 relies at least in part upon hardware to achieve its functionality.

Referring to FIG. 13, the communication device 1300 further includes logic configured to store information 1315. In an example, the logic configured to store information 1315 can include at least a non-transitory memory and associated hardware (e.g., a memory controller, etc.). For example, the non-transitory memory included in the logic configured to store information 1315 can correspond to RAM, flash memory, ROM, EPROM, EEPROM, registers, hard disk, a removable disk, a CD-ROM, or any other form of storage medium known in the art. The logic configured to store information 1315 can also include software that, when executed, permits the associated hardware of the logic configured to store information 1315 to perform its storage function(s). However, the logic configured to store information 1315 does not correspond to software alone, and the logic configured to store information 1315 relies at least in part upon hardware to achieve its functionality.

In an embodiment, where the communication device 1300 corresponds to a server configured to adapt PRS transmissions of one or more base stations, such as location server 170, the eNodeB 305 or 410, the E-SMLC 355, the SGW 230, the PDG 235, the E-SLP 335, the LRF 375, a PDE, SMLC, SAS or other SLP etc., the logic configured to process information 1310, cooperatively with the logic configured to store information 1315 and/or the logic configured to receive and/or transmit information 1305, may be configured to receive a request to support an emergency call associated with a UE, such as UE 302, and to send a first PRS schedule to a first base station, the first PRS schedule configured to enable the first base station to switch to a first emergency PRS mode and to transmit PRS signals according to the first PRS schedule.

In an embodiment, where the communication device 1300 corresponds to a UE using an emergency PRS mode of at least one cell of at least one base station, such as UE 302, the logic configured to process information 1310, cooperatively with the logic configured to store information 1315 and/or the logic configured to receive and/or transmit information 1305 may be configured to initiate an emergency call, to receive positioning assistance data from a server, the positioning assistance data including an emergency PRS mode schedule for the at least one cell of at least one base station, the emergency PRS mode schedule comprising one or more parameters indicating additional PRS positioning occasions for a cell, additional bandwidth, a higher frequency of PRS positioning occasions, different PRS coding compared to a non-emergency PRS mode schedule, a start time, stop time and/or duration, to perform terrestrial radio location positioning measurements based on the received positioning assistance data, and to provide the terrestrial radio location positioning measurements or a location computed from the terrestrial radio location positioning measurements to the server.

In an embodiment, where the communication device 1300 corresponds to a base station, such as eNode B 305, the logic configured to process information 1310, cooperatively with the logic configured to store information 1315 and/or the logic configured to receive and/or transmit information 1305 may be configured to establish a PRS schedule, to switch to an emergency PRS mode, and to transmit PRS signals in accordance with the PRS schedule.

Referring to FIG. 13, the communication device 1300 further optionally includes logic configured to present information 1320. In an example, the logic configured to present information 1320 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 1300. For example, if the communication device 1300 corresponds to mobile device 1200 as shown in FIG. 12A, the logic configured to present information 1320 can include the display 1256 of mobile device 1200. In a further example, the logic configured to present information 1320 can be omitted for certain communication devices, such as network communication devices that do not have a local user (e.g., network switches or routers, remote servers, etc.). The logic configured to present information 1320 can also include software that, when executed, permits the associated hardware of the logic configured to present information 1320 to perform its presentation function(s). However, the logic configured to present information 1320 does not correspond to software alone, and the logic configured to present information 1320 relies at least in part upon hardware to achieve its functionality.

Referring to FIG. 13, the communication device 1300 further optionally includes logic configured to receive local user input 1325. In an example, the logic configured to receive local user input 1325 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 1300. For example, if the communication device 1300 corresponds to mobile device 1200 as shown in FIG. 12A, the logic configured to receive local user input 1325 can include the microphone 1252, the keypad 1254, the display 1256, etc. In a further example, the logic configured to receive local user input 1325 can be omitted for certain communication devices, such as network communication devices that do not have a local user (e.g., network switches or routers, remote servers, etc.). The logic configured to receive local user input 1325 can also include software that, when executed, permits the associated hardware of the logic configured to receive local user input 1325 to perform its input reception function(s). However, the logic configured to receive local user input 1325 does not correspond to software alone, and the logic configured to receive local user input 1325 relies at least in part upon hardware to achieve its functionality.

Referring to FIG. 13, while the configured logics of 1305 through 1325 are shown as separate or distinct blocks in FIG. 13, it will be appreciated that the hardware and/or software by which the respective configured logic performs its functionality can overlap in part. For example, any software used to facilitate the functionality of the configured logics of 1305 through 1325 can be stored in the non-transitory memory associated with the logic configured to store information 1315, such that the configured logics of 1305 through 1325 each performs their functionality (i.e., in this case, software execution) based in part upon the operation of software stored by the logic configured to store information 1315. Likewise, hardware that is directly associated with one of the configured logics can be borrowed or used by other configured logics from time to time. For example, the processor of the logic configured to process information 1310 can format data into an appropriate format before being transmitted by the logic configured to receive and/or transmit information 1305, such that the logic configured to receive and/or transmit information 1305 performs its functionality (i.e., in this case, transmission of data) based in part upon the operation of hardware (i.e., the processor) associated with the logic configured to process information 1310.

Generally, unless stated otherwise explicitly, the phrase "logic configured to" as used throughout this disclosure is intended to invoke an aspect that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the aspects described below in more detail.

Figure 14:
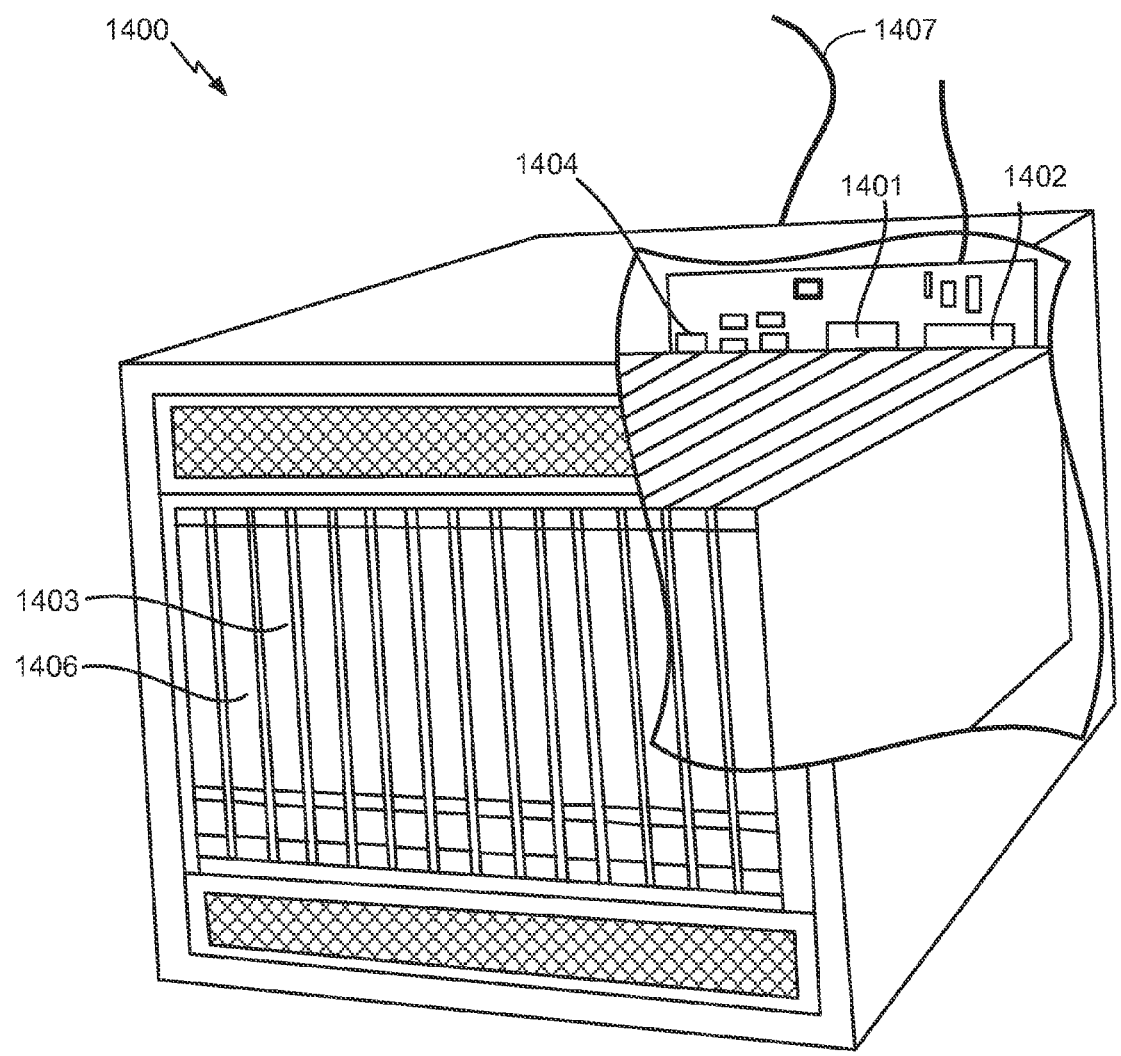
FIG. 14 illustrates a server in accordance with an aspect of the disclosure.

The various aspects may be implemented on any of a variety of commercially available server devices, such as server 1400 illustrated in FIG. 14. In an example, the server 1400 may correspond to one example configuration of the location server 170, the eNodeB 305 or 410, the E-SMLC 355, the SGW 230, the PDG 235, the E-SLP 335, the LRF 375, a PDE, SMLC, SAS or other SLP etc. described above. In FIG. 14, the server 1400 includes a processor 1401 coupled to volatile memory 1402 and a large capacity nonvolatile memory, such as a disk drive 1403. The server 1400 may also include a floppy disc drive, compact disc (CD) or DVD disc drive 1406 coupled to the processor 1401. The server 1400 may also include network access ports 1404 coupled to the processor 1401 for establishing data connections with a network 1407, such as a local area network coupled to other broadcast system computers and servers or to the Internet. In context with FIG. 13, it will be appreciated that the server 1400 of FIG. 14 illustrates one example implementation of the communication device 1300, whereby the logic configured to transmit and/or receive information 1305 corresponds to the network access ports 1404 used by the server 1400 to communicate with the network 1407, the logic configured to process information 1310 corresponds to the processor 1401, and the logic configuration to store information 1315 corresponds to any combination of the volatile memory 1402, the disk drive 1403 and/or the disc drive 1406. The optional logic configured to present information 1320 and the optional logic configured to receive local user input 1325 are not shown explicitly in FIG. 14 and may or may not be included therein. Thus, FIG. 14 helps to demonstrate that the communication device 1300 may be implemented as a server, in addition to a mobile device implementation as in FIG. 12A.

For example, in an embodiment, where the server 1400 is configured to adapt PRS transmissions of one or more base stations, the network access ports 1404, in conjunction with processor 1401, the disk drive 1403, and/or the disc drive 1406, may be configured to receive a request to support an emergency call associated with a UE, and to send a first PRS schedule to a first base station, the first PRS schedule configured to enable the first base station to switch to a first emergency PRS mode and to transmit PRS signals according to the first PRS schedule.

Figure 15:
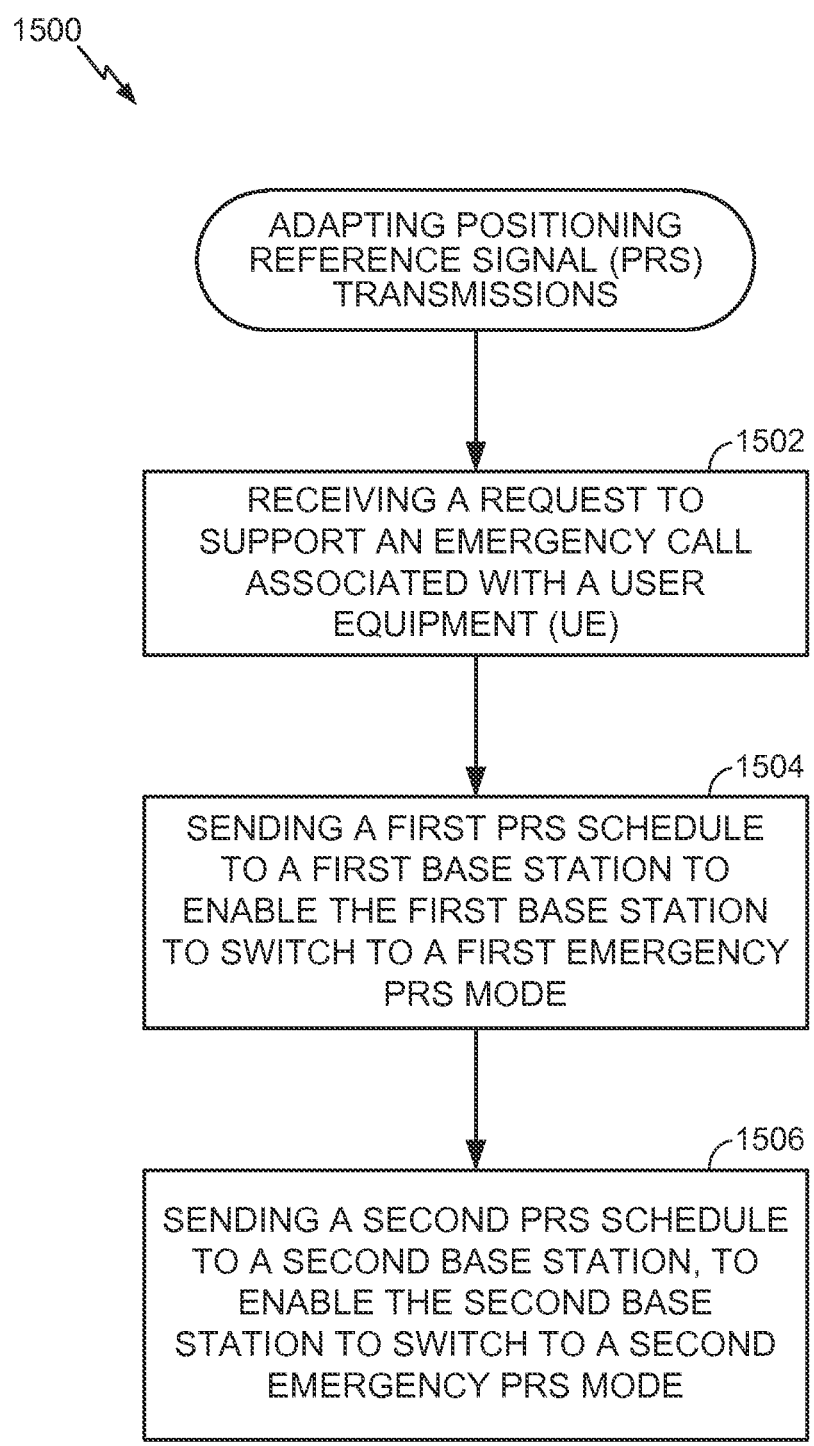
FIGS. 15-17 illustrate flowcharts of several sample methods in accordance with various aspects of the disclosure.

In view of the foregoing disclosure, it will be appreciated that various methods, sequences and/or algorithms are described in connection with the aspects disclosed herein. FIG. 15 illustrates a flowchart of an example method for adapting positioning reference signal (PRS) transmissions of one or more base stations as disclosed herein. For example, at 1502, a request to support an emergency call associated with a UE can be received by a location server or other network element (e.g., MME such as MME 315, an E-SMLC such as E-SMLC 355, an E-SLP such as E-SLP 335, or a base station such as eNodeB 305). The request to support the emergency call can include a request to assist establishing the emergency call, a request to establish a connection or bearer for an emergency call or a request to locate the UE for an emergency call or for some other purpose.

At 1504, the location server or other network element can send a first PRS schedule to a first base station, to enable the first base station to switch to a first emergency PRS mode (e.g. for at least one cell supported by the first base station) and to transmit PRS signals (e.g. in at least one cell supported by the first base station) according to the first PRS schedule based on the first PRS schedule. At 1506, the location server or other network element can send a second PRS schedule to a second base station, to configure the second base station to switch to a second emergency PRS mode (e.g. for at least one cell supported by the second base station) and to transmit PRS signals (e.g. in at least one cell supported by the second base station) according to the second PRS schedule based on receiving the second PRS schedule.

The first PRS schedule can be at least partly orthogonal to the second PRS schedule in the time domain, frequency domain and/or code domain. The first PRS schedule and the second PRS schedule cause PRS signals to be transmitted by the first and second base stations in certain cells at different times, using different frequencies and/or using different PRS code sequences. In some implementations, the times, frequencies and/or PRS code sequences may be varied on a pseudo-random basis differently by the first and second base stations (e.g. as defined by the first and second PRS schedules) such that one or more of the PRS transmission times (or muting times), PRS frequencies and PRS code sequences are sometimes or commonly different (i.e. orthogonal) in one or more cells for the first base station compared to one or more cells for the second base station. At least one of the first PRS schedule or the second PRS schedule can include a muting schedule. The muting can cease transmission by the first base station during some or all PRS transmission by the second base station and/or cease transmission by the second base station during some or all PRS transmission by the first base station. It will be appreciated that the process can continue for multiple base stations and that some base stations can be grouped, as discussed above, so that they may have shared PRS schedules and/or specific muting schedules. As discussed above, the switching to emergency PRS mode includes switching to emergency PRS mode for a limited duration.

Figure 16:
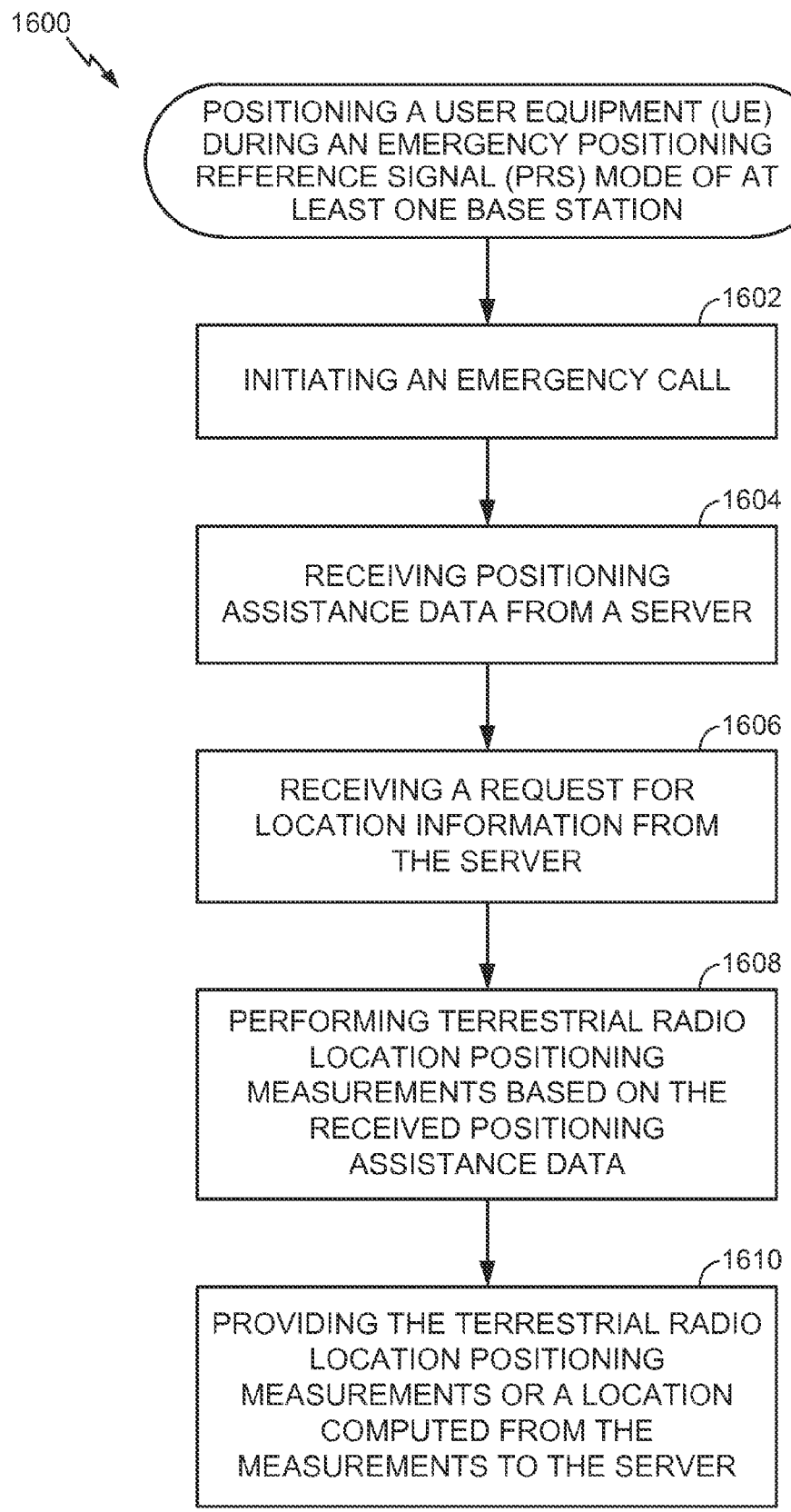

Also in view of the foregoing disclosure, it will be appreciated that various methods, sequences and/or algorithms are described in connection with the aspects disclosed herein. FIG. 16 illustrates a flowchart of an example method for positioning a UE during an emergency PRS mode of at least one base station. For example, at 1602, a UE, such as UE 302, can initiate an emergency call via interaction with network elements such as an eNodeB (e.g. eNodeB 305 in FIG. 3A), an MME (e.g. MME 315 in FIG. 3A) or a PDG (e.g. PDG 235 in FIG. 3A). At 1604, the UE can receive positioning assistance data from a server. The positioning assistance data may include an emergency PRS mode schedule for at least one cell of at least one base station (e.g. eNB 305). The emergency PRS mode schedule may include one or more parameters indicating additional PRS positioning occasions for a cell, additional bandwidth, a higher frequency of PRS positioning occasions, different PRS coding and/or different PRS frequencies or frequency shift compared to a non-emergency PRS mode schedule, a start time, stop time and/or duration as described herein. Additionally, the emergency PRS mode schedule may indicate a pseudo-random variation of one or more of PRS frequency shift, PRS muting, PRS coding such that the UE is able to determine the PRS frequency, PRS muting and/or PRS coding for each PRS positioning occasion and possibly each PRS subframe.

At 1606, the UE may receive a request for location information from the server. The request for location information may include a request for terrestrial radio location positioning measurements (e.g. OTDOA RSTD measurements), as described herein. At 1608, the UE performs terrestrial radio location positioning measurements based on the received positioning assistance data. At 1610, the UE provides either the terrestrial radio location positioning measurements or a location computed from these measurements to the server.

As described herein, at least one of the one or more parameters received at 1604 may indicate a number of consecutive PRS subframes in each PRS positioning occasion for the emergency PRS mode. Alternatively or additionally, at least one of the one or more parameters may indicate a scheduling sequence and/or muting sequence for PRS positioning occasions for the emergency PRS mode.

Also as described herein, the server may comprise an E-SMLC, such as E-SMLC 355, an E-SLP, such as E-SLP 335, an MME, such as MME 315, an eNodeB, such as eNodeB 305 or some other location server (e.g. an SMLC, SAS or PDE) and the terrestrial radio location positioning measurements may comprise OTDOA measurements.

Figure 17:
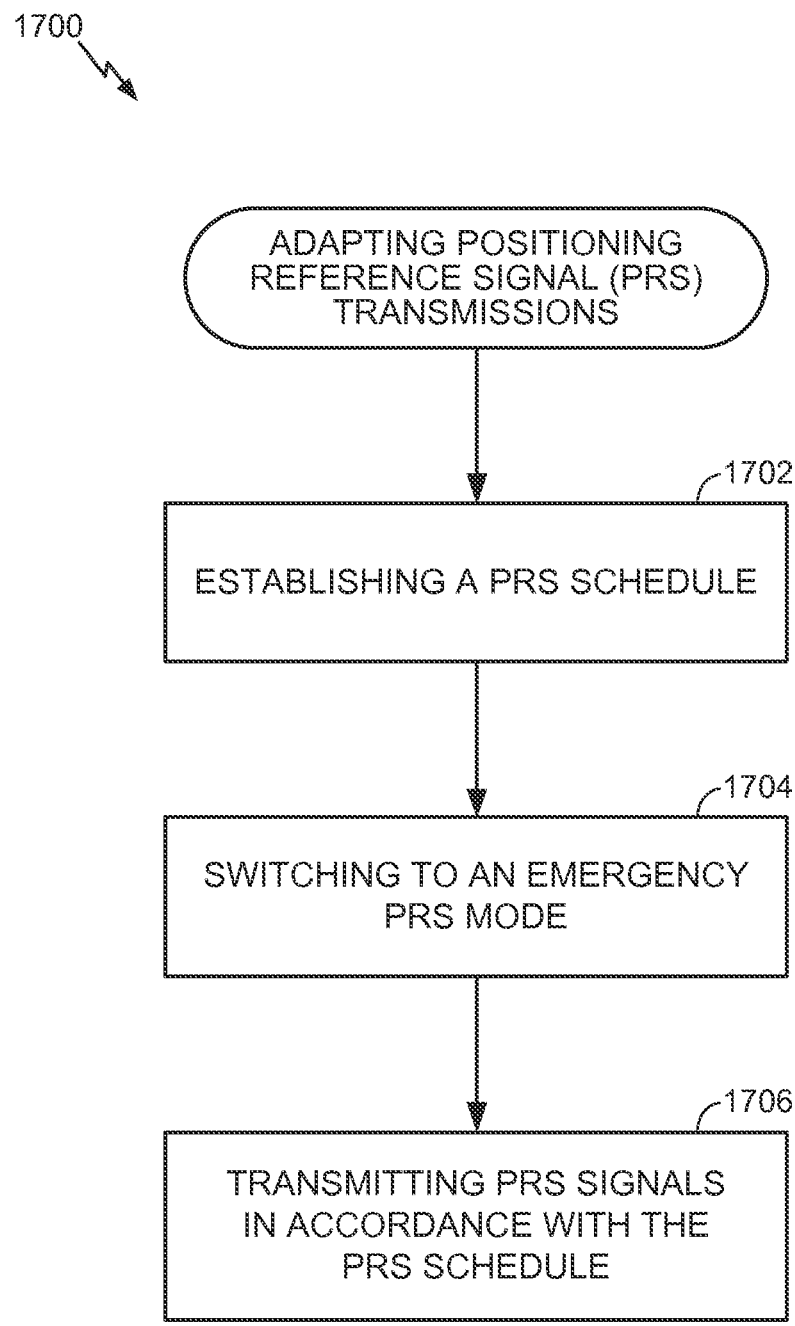

Also in view of the foregoing disclosure, it will be appreciated that various methods, sequences and/or algorithms are described in connection with the aspects disclosed herein. FIG. 17 illustrates a flowchart of an example a method for adapting PRS transmissions of a base station, such as eNodeB 305 in FIGS. 3A, 3B, 4A, 4B and 11, or a standalone base station such as standalone eNodeB beacon 400 in FIG. 4A. As described herein, the functionality performed at the base station may be similar to the functionality performed at the E-SMLC 355. At 1702, the base station determines a PRS schedule (e.g. for one or more cells supported by the base station). The PRS schedule may be determined solely at the base station, as discussed above (e.g. may be pre-configured in the base station), or may be based on a PRS schedule being received from a MME, an E-SMLC, an E-SLP, or other base station.

At 1704, in response to establishing the PRS schedule, the base station switches to an emergency PRS mode (e.g. for transmitting PRS in one more cells supported by the base station). Switching to the emergency PRS mode may include switching to the emergency PRS mode for a predetermined period of time and may include a delay (e.g., a start time) in performing the switching. Switching to the emergency PRS mode may include switching to the emergency PRS mode in at least one cell of the base station. Switching to the emergency PRS mode may include increasing a bandwidth and/or a transmission power allocated to PRS transmissions in the at least one cell compared to a non-emergency PRS mode. Increasing the bandwidth and/or the transmission power allocated to the PRS transmissions may include increasing a frequency range and/or increasing a number of subframes assigned to the emergency PRS mode compared to a non-emergency PRS mode. Increasing the number of subframes may include increasing the number of subframes to six subframes, or to a number of subframes greater than six. Increasing the bandwidth and/or the transmission power allocated to the PRS transmissions may include increasing a duty cycle of the PRS transmissions and/or a duration of the PRS transmissions. Switching to the emergency PRS mode may also include employing transmit diversity (as discussed for FIG. 12B) or employing a different form of transmit diversity to that used for normal PRS mode. Switching to the emergency PRS mode may include changing and/or varying (e.g. according to a pseudo-random sequence) PRS muting, PRS frequency or PRS frequency shift and/or PRS coding.

At 1706, the base station transmits PRS signals in accordance with the PRS schedule. Transmitting the PRS signals in accordance with the PRS schedule may include transmitting the PRS signals in accordance with the PRS schedule in at least one cell of the base station. The at least one cell may be a cell that is not usable as a serving cell by a UE being positioned by the PRS transmissions or may be a cell that is a serving cell for the UE or a cell that is usable as a serving cell for the UE.

It may be noted that the various procedures and techniques described herein (e.g. in association with FIGS. 3A-3E, 4A, 4B, 5, 7A, 7B, 8, 9, 10A, 10B, 11) have normally assumed that location of a target UE may be needed in association with an emergency call from the UE. However, it will be appreciated by those versed in the art that the same or similar procedures and techniques may be used to locate a target UE using OTDOA for other reasons not associated with an emergency call. In addition, while only two modes of PRS transmission have normally been assumed herein, namely normal PRS mode and emergency PRS mode, it will be appreciated that more than two modes of PRS transmission may be used—e.g. more than two PRS modes may be configured for any cell at the eNodeB that supports the cell and/or more than two PRS modes may be used by a location server (e.g. E-SMLC) when sending instructions (e.g. using LPPa) to an eNodeB to schedule PRS transmission for a cell or cells supported by the eNodeB. In addition, in some implementations there may be no formal definition or identification of PRS mode and instead a location server may send PRS scheduling information to one or more eNodeBs to configure different PRS transmission for one or more cells supported by each of the eNodeBs to enable more accurate OTDOA location of one or more target UEs over some temporary or permanent period. The different PRS transmission may include use of different (e.g. higher or lower) PRS bandwidth, different (e.g. higher or lower PRS transmission power), a different frequency (or a different pseudo-random varying frequency), a different PRS frequency shift (or a different pseudo-random varying PRS frequency shift), a different muting sequence (or a different pseudo-random varying muting sequence), a different duty cycle (e.g. a higher or lower number of subframes per PRS positioning occasion and/or a higher or lower periodicity of PRS positioning occasions). The different PRS transmission may not be associated with a particular PRS mode but may instead be dynamically determined by a location server—e.g. based on attributes for the one or more target UEs being located such as their approximate locations, serving cells, OTDOA capabilities and/or on the importance of achieving accurate location estimates (e.g. as associated with a particular location service or particular client for the locations).

Figure 18:
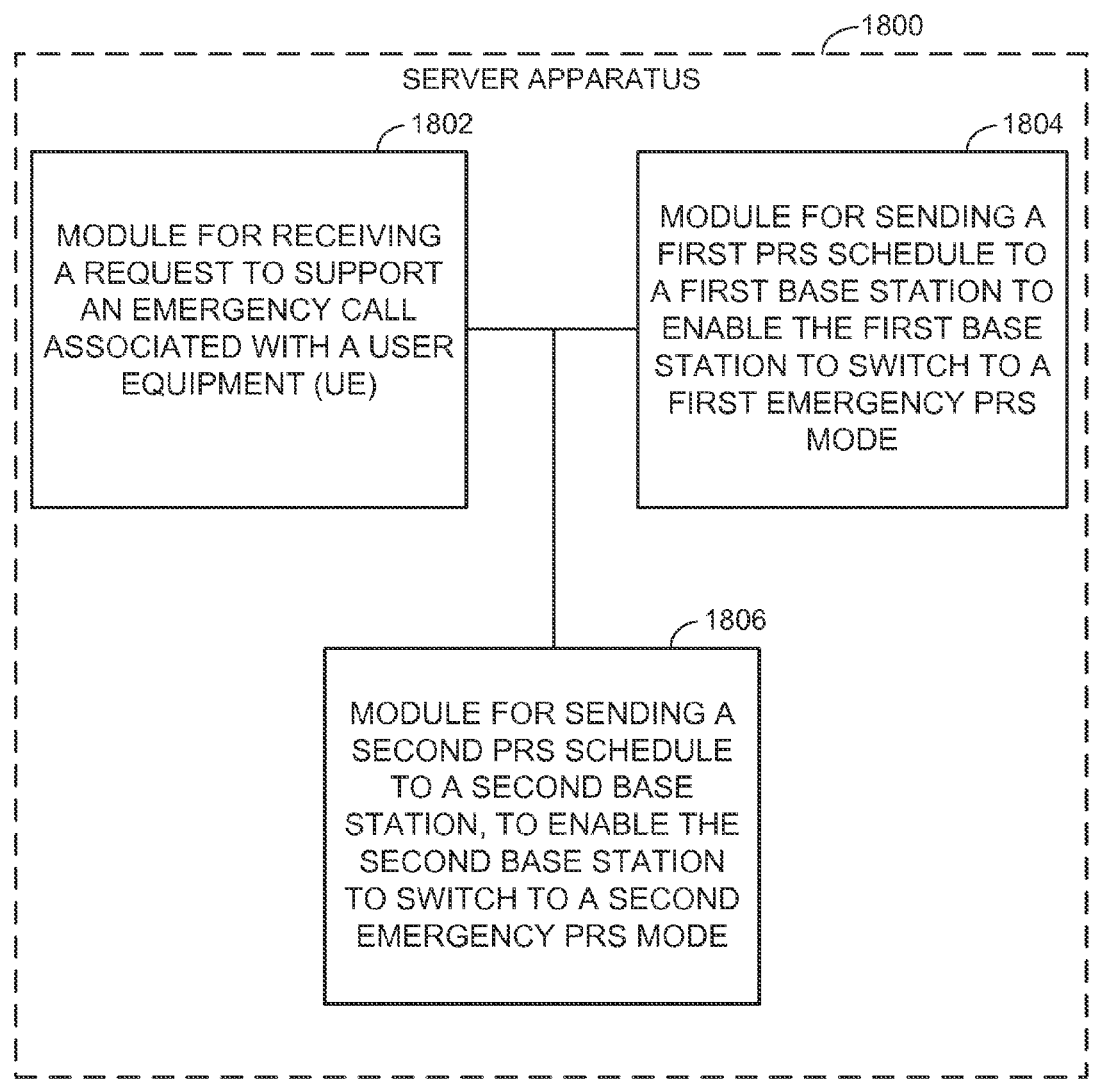
FIGS. 18-20 are other simplified block diagrams of several sample aspects of apparatuses configured to support communication as taught herein.

FIG. 18 illustrates an example server apparatus 1800 represented as a series of interrelated functional modules. A module for receiving 1802 may correspond at least in some aspects to, for example, a communication device, such as network access ports 1404 in FIG. 14, as discussed herein. A module for sending 1804 may correspond at least in some aspects to, for example, a communication device, such as network access ports 1404 in FIG. 14, as discussed herein. A module for sending 1806 may correspond at least in some aspects to, for example, a communication device, such as network access ports 1404 in FIG. 14, as discussed herein.

Figure 19:
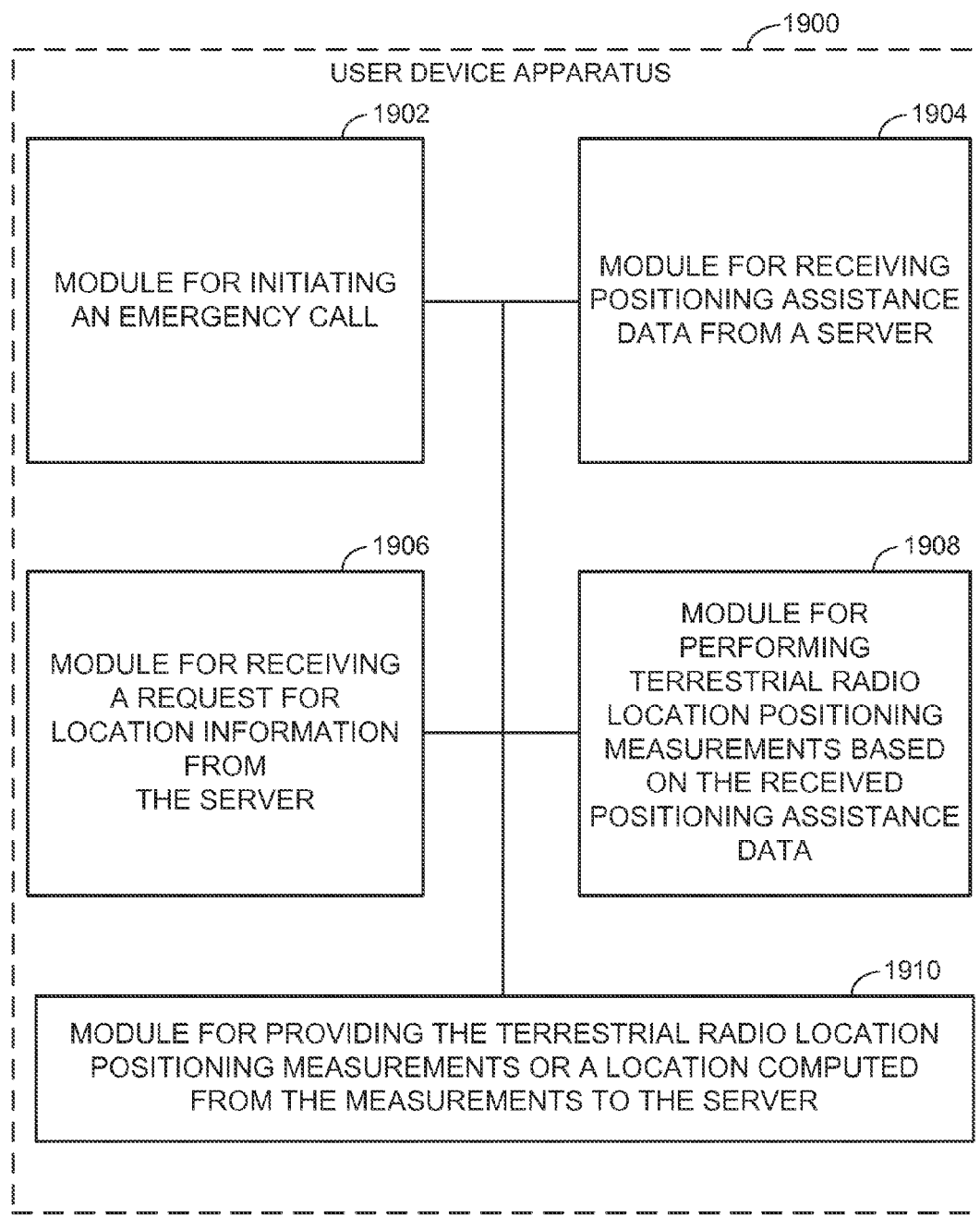

FIG. 19 illustrates an example user device apparatus 1900 represented as a series of interrelated functional modules. A module for initiating 1902 may correspond at least in some aspects to, for example, a processing system, such as processor 1210 in FIG. 12A, in conjunction with a communication device, such as WAN transceiver 1204 in FIG. 12A, as discussed herein. A module for receiving 1904 may correspond at least in some aspects to, for example, a communication device, such as WAN transceiver 1204 in FIG. 12A, as discussed herein. A module for receiving 1906 may correspond at least in some aspects to, for example, a communication device, such as WAN transceiver 1204 in FIG. 12A, as discussed herein. A module for performing 1908 may correspond at least in some aspects to, for example, a processing system, such as processor 1210 in FIG. 12A, in conjunction with a communication device, such as WAN transceiver 1204 in FIG. 12A, as discussed herein. A module for providing 1910 may correspond at least in some aspects to, for example, a processing system, such as processor 1210 in FIG. 12A, in conjunction with a communication device, such as WAN transceiver 1204 in FIG. 12A, as discussed herein.

Figure 20:
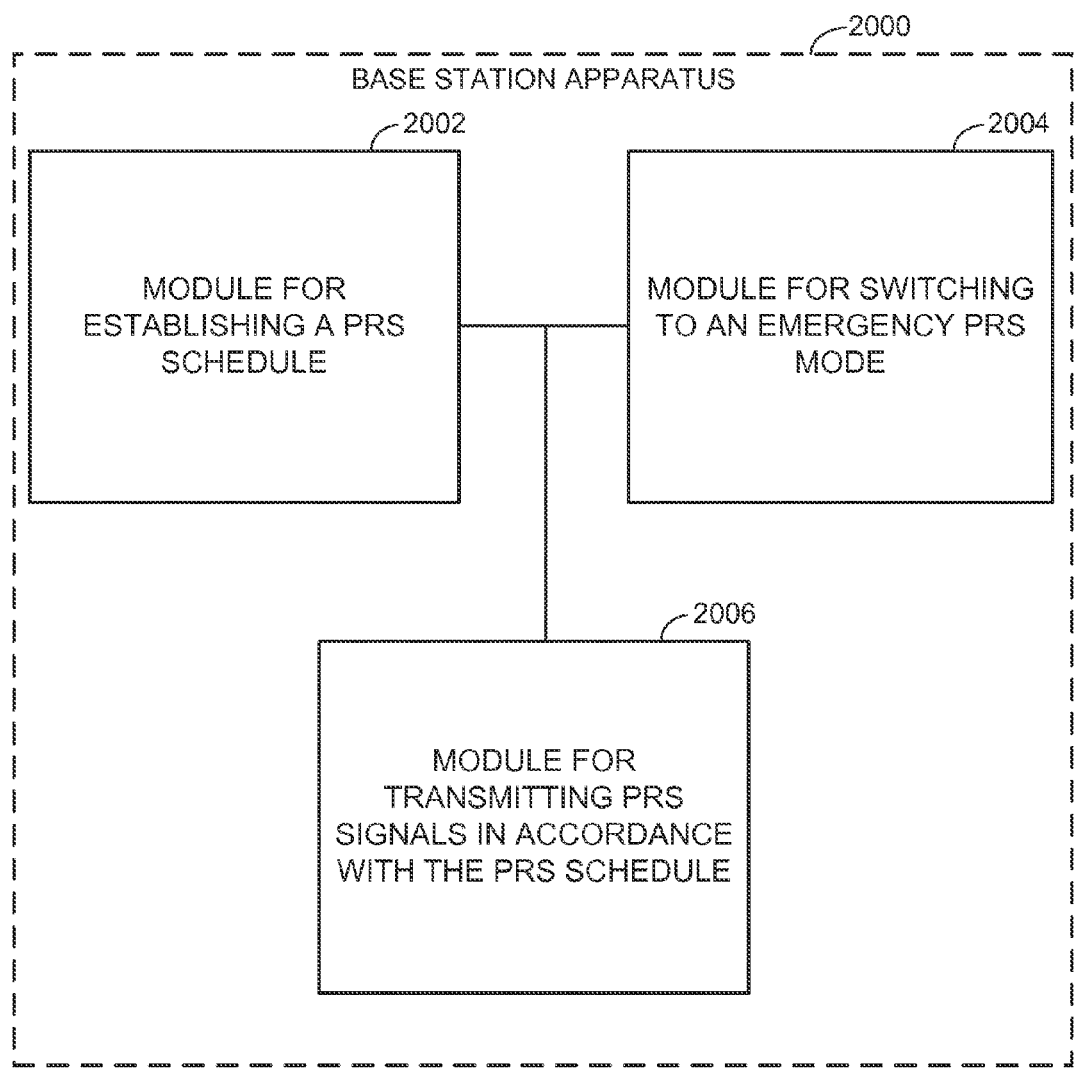

FIG. 20 illustrates an example base station apparatus 2000 represented as a series of interrelated functional modules. A module for establishing 2002 may correspond at least in some aspects to, for example, a processing system, such as controller/processor 1240 and/or transmit processor 1220 in FIG. 12B, in conjunction with a communication device, such as one or more antennas 1234 in FIG. 12B, as discussed herein. A module for switching 2004 may correspond at least in some aspects to, for example, a processing system, such as controller/processor 1240 and/or transmit processor 1220 in FIG. 12B, in conjunction with a communication device, such as one or more antennas 1234 in FIG. 12B, as discussed herein. A module for transmitting 2006 may correspond at least in some aspects to, for example, a processing system, such as controller/processor 1240 and/or transmit processor 1220 in FIG. 12B, in conjunction with a communication device, such as one or more antennas 1234 in FIG. 12B, as discussed herein.

The functionality of the modules of FIGS. 18-20 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIGS. 18-20, as well as other components and functions described herein, may be implemented using any suitable means. Such means also may be implemented, at least in part, using corresponding structure as taught herein. For example, the components described above in conjunction with the "module for" components of FIGS. 18-20 also may correspond to similarly designated "means for" functionality. Thus, in some aspects one or more of such means may be implemented using one or more of processor components, integrated circuits, or other suitable structure as taught herein.

Those of skill in the art will appreciate that information and signals as referred to herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method for adapting positioning reference signal (PRS) transmissions of one or more base stations, comprising:
   receiving a request to support an emergency call associated with a user equipment (UE);
   sending a first PRS schedule to a first group of base stations including a first base station, the first PRS schedule configured to enable at least the first base station to switch to a first emergency PRS mode and to transmit PRS signals according to the first PRS schedule; and
   sending a second PRS schedule to a second group of base stations including a second base station, the second PRS schedule configured to enable the second base station to transmit PRS signals according to the second PRS schedule,
   wherein the first group of base stations transmits PRS signals according to the first emergency PRS mode based on the first PRS schedule while the second group of base stations transmits PRS signals according to a non-emergency PRS mode based on the second PRS schedule.

2. The method of claim 1, wherein sending the first PRS schedule comprises sending the first PRS schedule from a Mobility Management Entity (MME), an Enhanced Serving Mobile Location Center (E-SMLC), an Emergency Services SUPL (Secure User Plane Location) Location Platform, or a base station.

3. The method of claim 1, wherein switching to the first emergency PRS mode causes the first base station to increase a bandwidth and/or a transmission power allocated to PRS transmissions in at least one cell compared to a non-emergency PRS mode.

4. The method of claim 3, wherein increasing the bandwidth and/or the transmission power allocated to the PRS transmissions comprises increasing a frequency range and/or increasing a number of subframes assigned to the first emergency PRS mode compared to a non-emergency PRS mode.

5. The method of claim 3, wherein increasing the bandwidth and/or the transmission power allocated to the PRS transmissions comprises increasing a duty cycle of the PRS transmissions and/or a duration of the PRS transmissions.

6. The method of claim 3, wherein the at least one cell comprises a cell that is not usable as a serving cell by the UE.

7. The method of claim 1,
wherein the second PRS schedule is further configured to enable the second base station to switch to a second emergency PRS mode and to transmit PRS signals according to the second emergency PRS mode based on the second PRS schedule.

8. The method of claim 1, wherein the PRS signals transmitted according to the first PRS schedule are at least partly orthogonal to the PRS signals transmitted according to the second PRS schedule in a time domain, a frequency domain, a code domain, or a combination thereof.

9. The method of claim 1, wherein the PRS signals transmitted according to the first PRS schedule and the PRS signals transmitted according to the second PRS schedule are transmitted at different times, using different frequencies, using different PRS code sequences, or a combination thereof.

10. The method of claim 1, wherein the at least one of the first PRS schedule or the second PRS schedule comprises a muting schedule, and
wherein the muting schedule identifies ceasing of transmission by the first base station during PRS transmission by the second base station and/or ceasing of transmission by the second base station during PRS transmission by the first base station.

11. The method of claim 1, further comprising:
sending at least part of the first PRS schedule to the UE as location assistance data for use by the UE in performing observed time difference of arrival (OTDOA) measurements.

12. The method of claim 11, further comprising:
receiving location information from the UE based on the UE performing the OTDOA measurements based, at least in part, on the first PRS schedule.

13. The method of claim 1, further comprising:
sending a plurality of PRS schedules to a plurality of base stations, the plurality of base stations including the first base station and the second base station.

14. The method of claim 13, further comprising:
generating a plurality of groups of base stations including the first group of base stations and the second group of base stations, wherein the first group of base stations of the plurality of groups of base stations transmits the PRS signals according to the emergency PRS mode while other groups of the plurality of base stations transmit PRS signals according to the non-emergency PRS mode.

15. The method of claim 1, wherein the first base station comprises a standalone base station providing additional indoor location coverage.

16. The method of claim 1, wherein the first PRS schedule is backward compatible with a legacy UE.

17. A method for positioning a user equipment (UE) using an emergency positioning reference signal (PRS) mode of at least one cell of at least one base station, comprising:
initiating, by the UE, an emergency call;
receiving, by the UE, positioning assistance data from a server, the positioning assistance data including an emergency PRS mode schedule for the at least one cell of the at least one base station, the emergency PRS mode schedule comprising: one or more parameters indicating one or more additional PRS positioning occasions for a cell, additional bandwidth, a higher frequency of PRS positioning occasions, a different PRS coding compared to a non-emergency PRS mode schedule, a start time, a stop time, a duration, or a combination thereof;
performing, by the UE, terrestrial radio location positioning measurements based on the received positioning assistance data; and
providing, by the UE, the terrestrial radio location positioning measurements or a location computed from the terrestrial radio location positioning measurements to the server,
wherein the emergency PRS mode schedule corresponds to a first emergency PRS mode of a first group of base stations, and wherein the first group of base stations transmits PRS signals according to the first emergency PRS mode while a second group of base stations transmit PRS signals according to a non-emergency PRS mode.

18. The method of claim 17, wherein at least one of the one or more parameters indicates a number of consecutive PRS subframes in each PRS positioning occasion for the emergency PRS mode schedule.

19. The method of claim 17, wherein at least one of the one or more parameters indicates a scheduling sequence and/or muting sequence for PRS positioning occasions for the emergency PRS mode schedule.

20. A method for adapting positioning reference signal (PRS) transmissions of a base station, comprising:
establishing, at the base station, a PRS schedule;
switching, at the base station, to an emergency PRS mode based on the PRS schedule; and
transmitting, at the base station, PRS signals in accordance with the PRS schedule,
wherein the base station belongs to a first group of base stations, wherein the emergency PRS mode corresponds to a first emergency PRS mode of the first group of base stations, and wherein the first group of base stations transmits PRS signals according to the first emergency PRS mode while a second group of base stations transmit PRS signals according to a non-emergency PRS mode.

21. The method of claim 20, wherein switching to the emergency PRS mode comprises increasing a bandwidth, a transmission power, or both allocated to PRS transmissions in at least one cell compared to a non-emergency PRS mode.

22. The method of claim 21, wherein increasing the bandwidth and/or the transmission power allocated to the PRS transmissions comprises increasing a frequency range, increasing a number of subframes, or both assigned to the first emergency PRS mode compared to a non-emergency PRS mode.

23. The method of claim 21, wherein increasing the bandwidth and/or the transmission power allocated to the PRS transmissions comprises increasing a duty cycle of the PRS transmissions, a duration of the PRS transmissions, or both.

24. The method of claim 20, wherein the switching comprises switching to the emergency PRS mode in at least one cell of the base station.

25. The method of claim 24, wherein the at least one cell comprises a cell that is not usable as a serving cell by a user equipment (UE) being positioned by the PRS transmissions.

26. The method of claim 24, wherein the at least one cell comprises a cell that is a serving cell or is usable as a serving cell for a user equipment (UE) being positioned by the PRS transmissions.

27. The method of claim 20, wherein the base station comprises a standalone base station providing additional indoor location coverage.

28. The method of claim 20, wherein the PRS signals transmitted according to the PRS schedule are backward compatible with a legacy UE.

29. The method of claim 20, wherein establishing the PRS schedule comprises:
establishing the PRS schedule at the base station after receiving a request to support an emergency call associated with a user equipment (UE).

30. An apparatus for adapting positioning reference signal (PRS) transmissions of one or more base stations, comprising:
a transceiver configured to receive a request to support an emergency call associated with a user equipment (UE); and
a processor configured to cause the transceiver to send a first PRS schedule to a first group of base stations including a first base station, the first PRS schedule configured to enable at least the first base station to switch to a first emergency PRS mode and to transmit PRS signals according to the first PRS schedule, and to cause the transceiver to send a second PRS schedule to a second group of base stations including a second base station, the second PRS schedule configured to enable the second base station to transmit PRS signals according to the second PRS schedule,
wherein the first group of base stations transmits PRS transmissions according to the first emergency PRS mode based on the first PRS schedule while the second group of base stations transmit PRS transmissions according to a non-emergency PRS mode based on the second PRS schedule.

31. The apparatus of claim 30, wherein switching to the first emergency PRS mode causes the first base station to increase a bandwidth and/or a transmission power allocated to PRS transmissions in at least one cell compared to a non-emergency PRS mode.

32. The apparatus of claim 30, wherein the processor is further configured to cause the transceiver to send a plurality of PRS schedules to a plurality of base stations, the plurality of base stations including the first base station.

33. An apparatus for positioning a user equipment (UE) using an emergency positioning reference signal (PRS) mode of at least one cell of at least one base station, comprising:
a transceiver of the UE configured to initiate an emergency call and to receive positioning assistance data from a server, the positioning assistance data including an emergency PRS mode schedule for the at least one cell of the at least one base station, the emergency PRS mode schedule comprising: one or more parameters indicating one or more additional PRS positioning occasions for a cell, additional bandwidth, a higher frequency of PRS positioning occasions, a different PRS coding compared to a non-emergency PRS mode schedule, a start time, a stop time, a duration, or a combination thereof; and
a processor of the UE configured to cause the transceiver to perform terrestrial radio location positioning measurements based on the received positioning assistance data, and to cause the transceiver to provide the terrestrial radio location positioning measurements or a location computed from the terrestrial radio location positioning measurements to the server,
wherein the emergency PRS mode schedule corresponds to a first emergency PRS mode of a first group of base stations, and wherein the first group of base stations transmits PRS signals according to the first emergency PRS mode while a second group of base stations transmit PRS signals according to a non-emergency PRS mode.

34. The apparatus of claim 33, wherein at least one of the one or more parameters indicates a number of consecutive PRS subframes in each PRS positioning occasion for the emergency PRS mode schedule.

35. The apparatus of claim 33, wherein at least one of the one or more parameters indicates a scheduling sequence and/or muting sequence for PRS positioning occasions for the emergency PRS mode schedule.

36. An apparatus for adapting positioning reference signal (PRS) transmissions of a base station, comprising:
a processor of the base station configured to establish a PRS schedule, and to switch to an emergency PRS mode based on the PRS schedule; and
a transceiver of the base station configured to transmit PRS signals in accordance with the PRS schedule,
wherein the base station belongs to a first group of base stations, wherein the emergency PRS mode corresponds to a first emergency PRS mode of the first group of base stations, and wherein the first group of base stations transmits PRS signals according to the first emergency PRS mode while a second group of base stations transmit PRS signals according to a non-emergency PRS mode.

37. The apparatus of claim 36, wherein the processor being configured to switch comprises the processor being configured to switch to the emergency PRS mode in at least one cell of the base station.

38. The apparatus of claim 37, wherein the at least one cell comprises a cell that is not usable as a serving cell by a user equipment (UE) being positioned by the PRS transmissions.

* * * * *